US010732587B2

(12) United States Patent
Namie et al.

(10) Patent No.: US 10,732,587 B2
(45) Date of Patent: Aug. 4, 2020

(54) MODEL PREDICTIVE CONTROL DEVICE, METHOD OF CONTROLLING MODEL PREDICTIVE CONTROL DEVICE, INFORMATION PROCESSING PROGRAM, AND RECORDING MEDIUM

(71) Applicant: OMRON Corporation, Kyoto (JP)

(72) Inventors: Masaki Namie, Takatsuki (JP); Yukio Iname, Kyoto (JP)

(73) Assignee: OMRON Corporation, Kyoto (JP)

( * ) Notice: Subject to any disclaimer, the term of this patent is extended or adjusted under 35 U.S.C. 154(b) by 77 days.

(21) Appl. No.: 16/190,149

(22) Filed: Nov. 14, 2018

(65) Prior Publication Data
US 2019/0250572 A1    Aug. 15, 2019

(30) Foreign Application Priority Data
Feb. 13, 2018    (JP) .................................. 2018-023422

(51) Int. Cl.
*G05B 13/00*    (2006.01)
*G05B 13/04*    (2006.01)
(52) U.S. Cl.
CPC ......... *G05B 13/048* (2013.01); *G05B 13/042* (2013.01); *G05B 2219/37434* (2013.01); *G05B 2219/50041* (2013.01)
(58) Field of Classification Search
None
See application file for complete search history.

(56) References Cited

U.S. PATENT DOCUMENTS

| 5,408,406 A * | 4/1995 | Mathur ................ G05B 13/027 700/38 |
| 7,826,956 B2 | 11/2010 | Ide |
| 2014/0039694 A1 | 2/2014 | Yamaguchi et al. |
| 2016/0218652 A1* | 7/2016 | Yamaguchi ............ G05B 13/02 |

FOREIGN PATENT DOCUMENTS

| EP | 3291032 | 3/2018 |
| JP | 2008198064 | 8/2008 |

OTHER PUBLICATIONS

Ping Zhou et al., "DOB Design for Nonminimum-Phase Delay Systems and its Application in Multivariable MPC Control," IEEE Transactions on Circuits and Systems II: Express Briefs, vol. 59, No. 8, Aug. 2012, pp. 1-5.
"Search Report of Europe Counterpart Application", dated Jul. 17, 2019, pp. 1-9.

\* cited by examiner

*Primary Examiner* — Paul B Yanchus, III
(74) *Attorney, Agent, or Firm* — JCIPRNET

(57) ABSTRACT

Compensation for an external disturbance can be applied without requiring a model of the external disturbance, and, particularly, the amount of control can be accurately predicted even when the amplitude of a waveform representing changes in a predicted error with respect to time is not constant with respect to time in a case in which the predicted error that is an error between an actually-measured value of the amount of control of a control target and a predicted value periodically changes. A controller compensates a predicted value of the current amount of control using a predicted error of a previous period by taking changes in the amplitude of a waveform representing a predicted error that is an error between an actually-measured value of the amount of control and a predicted value into account.

6 Claims, 25 Drawing Sheets

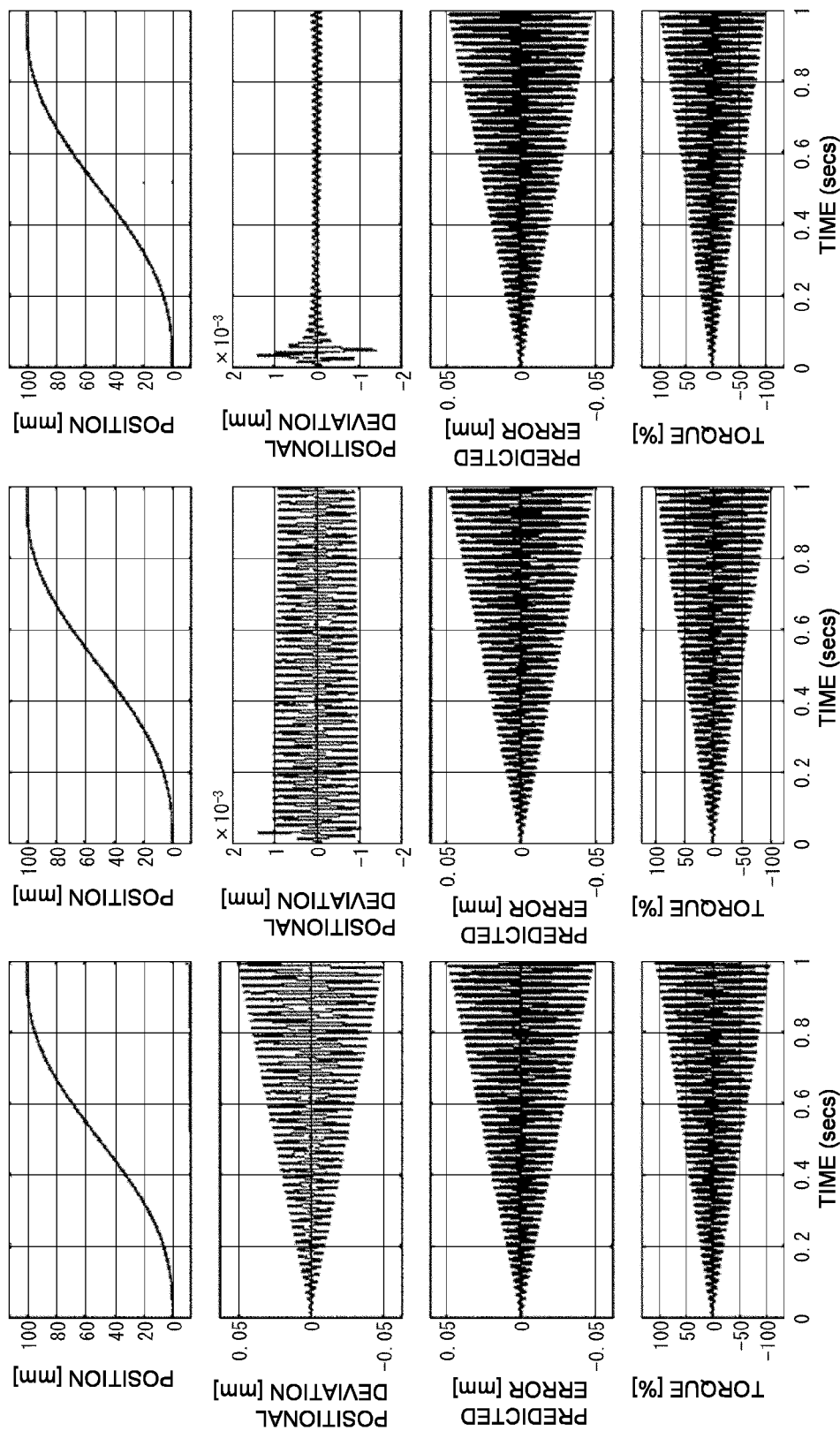

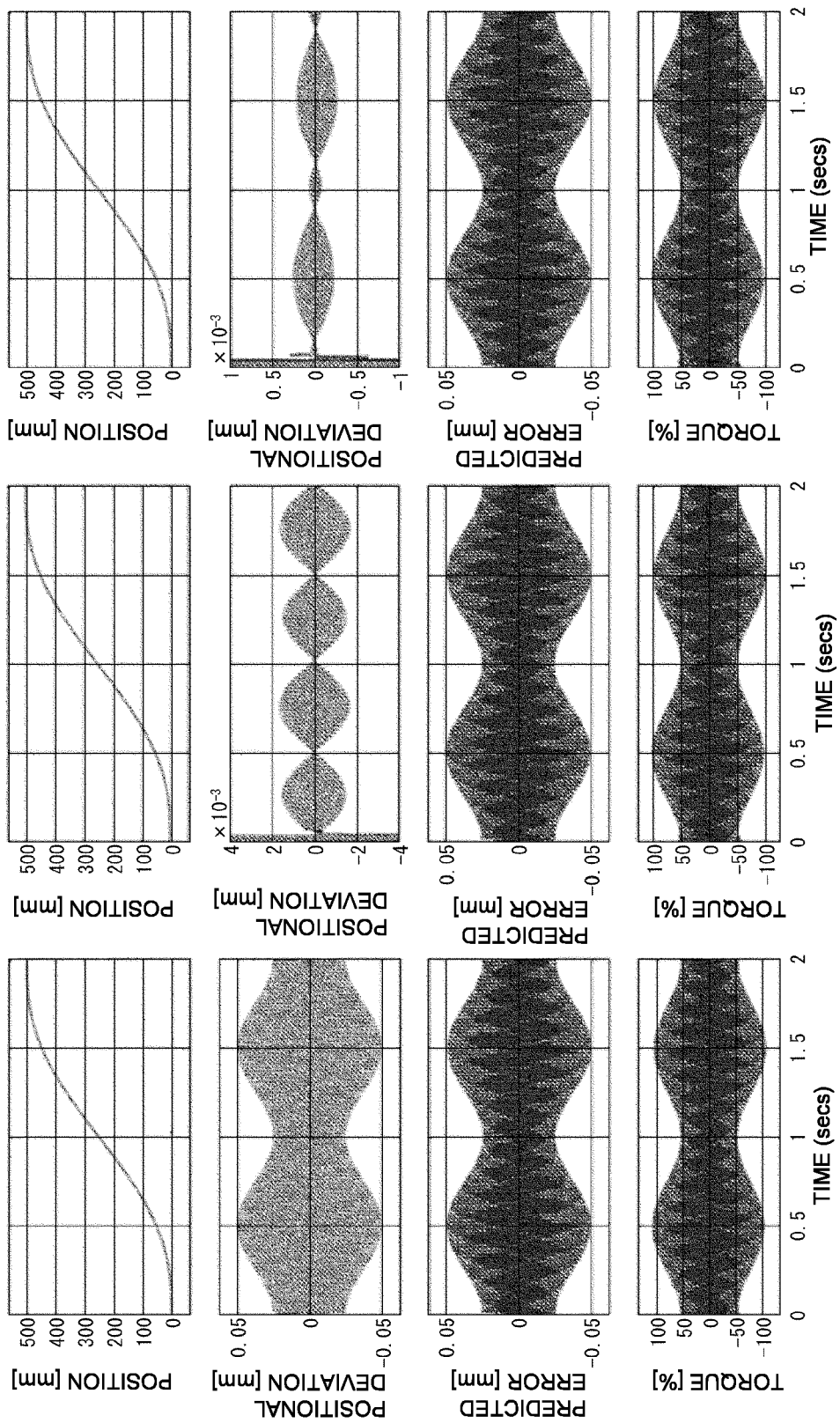

MODEL PREDICTIVE CONTROL DEVICE, METHOD OF CONTROLLING MODEL PREDICTIVE CONTROL DEVICE, INFORMATION PROCESSING PROGRAM, AND RECORDING MEDIUM

CROSS-REFERENCE TO RELATED APPLICATION

This application claims the priority benefit of Japan application serial no. 2018-023422, filed on Feb. 13, 2018. The entirety of the above-mentioned patent application is hereby incorporated by reference herein and made a part of this specification.

BACKGROUND

Technical Field

The disclosure relates to a model predictive control device which uses a model of a control target to predict the amount of control.

Description of Related Art

Conventionally, for example, various attempts for maintaining control performance in a case in which external disturbances such as vibrations exited in accordance with an acceleration or deceleration of a tool or a table, vibrations received from machines disposed on the vicinity thereof, and the like occur in a processing machine are known.

For example, in Patent Document 1 (Japanese Laid-Open No. 2008-198064, published on Aug. 28, 2008) disclosed below, a process control device is described which includes a plug-in external disturbance eliminating controller that is added to a feedback loop and is designed using an internal model principle such that external disturbances applied to the feedback loop are eliminated using a measurement value of a control target. However, in the conventional technology as described above, it is necessary to prepare a model equation of an external disturbance generator in advance. Generally, it is more difficult to model external disturbances than to model a control target, and thus, the conventional technology as described above requires a high degree of model generating capability, and machines and devices to which the technology can be applied are restricted.

SUMMARY

According to one aspect of the disclosure, there is provided a model predictive control device that predicts an amount of control of a control target corresponding to a command value generated for each control period from a target track using a model of the control target. The model predictive control device includes: a determination unit that determines presence/absence of periodicity of changes in a predicted error, which is an error between an actually-measured value of the amount of control of the control target and a predicted value of the amount of control predicted using the model, with respect to time; a deriving unit that derives an equation representing changes in an amplitude with respect to time in a waveform representing changes in the predicted error with respect to time in a case in which the presence of periodicity is determined by the determination unit; and a predicted value correcting unit that corrects the predicted value in a current period using the equation derived by the deriving unit and the predicted error in a period previous to the current period in the waveform.

The model predictive control device may further include a ratio calculating unit that calculates an amplitude variation ratio for each period up to the period previous to the current period in the waveform, wherein the deriving unit may derive the equation representing changes in the amplitude with respect to time in the waveform as a sum of values respectively acquired by multiplying amplitude variation ratios for periods up to the period previous to the current period, which are calculated by the ratio calculating unit, by coefficients for the periods.

The model predictive control device may calculate the amplitude variation ratio in a certain period using a ratio between (1) an absolute value of a difference between a first extreme value that is an extreme value in the certain period in the waveform and a second extreme value that is an extreme value a half period before the first extreme value in the waveform and (2) an absolute value of a difference between a third extreme value that is an extreme value one period before the first extreme value in the waveform and a fourth extreme value that is an extreme value a half period before the third extreme value in the waveform or an absolute value of a difference between the second extreme value and the third extreme value.

In the model predictive control device, the ratio calculating unit may calculate a latest amplitude variation ratio as a ratio between (1) an absolute value of a difference between a latest extreme value in the waveform determined until now and an extreme value that is an extreme value a half period before the latest extreme value in the waveform and (2) an absolute value of a difference between an extreme value that is an extreme value one period before the latest extreme value in the waveform and an extreme value that is 1.5 period before the latest extreme value in the waveform or an absolute value of a difference between an extreme value that is an extreme value a half period before the latest extreme value in the waveform and an extreme value that is an extreme value one period before the latest extreme value in the waveform, and the deriving unit may derive the latest amplitude variation ratio calculated by the ratio calculating unit as an equation representing a change in the amplitude with respect to time in the waveform.

In addition, according to one aspect of the disclosure, there is provided a method of controlling a model predictive control device that predicts an amount of control of a control target corresponding to a command value generated for each control period from a target track using a model of the control target. The method includes: a determination step of determining presence/absence of periodicity of changes in a predicted error, which is an error between an actually-measured value of the amount of control of the control target and a predicted value of the amount of control predicted using the model, with respect to time; a deriving step of deriving an equation representing changes in an amplitude with respect to time in a waveform representing changes in the predicted error with respect to time in a case in which the presence of periodicity is determined in the determination step; and a predicted value correcting step of correcting the predicted value in a current period using the equation derived in the deriving step and the predicted error in a period previous to the current period in the waveform.

BRIEF DESCRIPTION OF THE DRAWINGS

FIGS. 19(A) to 19(C) are diagrams illustrating an effect of an external disturbance compensating process executed by the controller illustrated in FIG. 15 in a case in which the external disturbance illustrated in FIG. 18 is applied.

FIGS. 23(A) to 23(C) are diagrams illustrating effects of an external disturbance compensating process executed by the controller illustrated in FIG. 15 in a case in which the external disturbance illustrated in FIG. 22 is applied.

DESCRIPTION OF THE EMBODIMENTS

Figure 1:
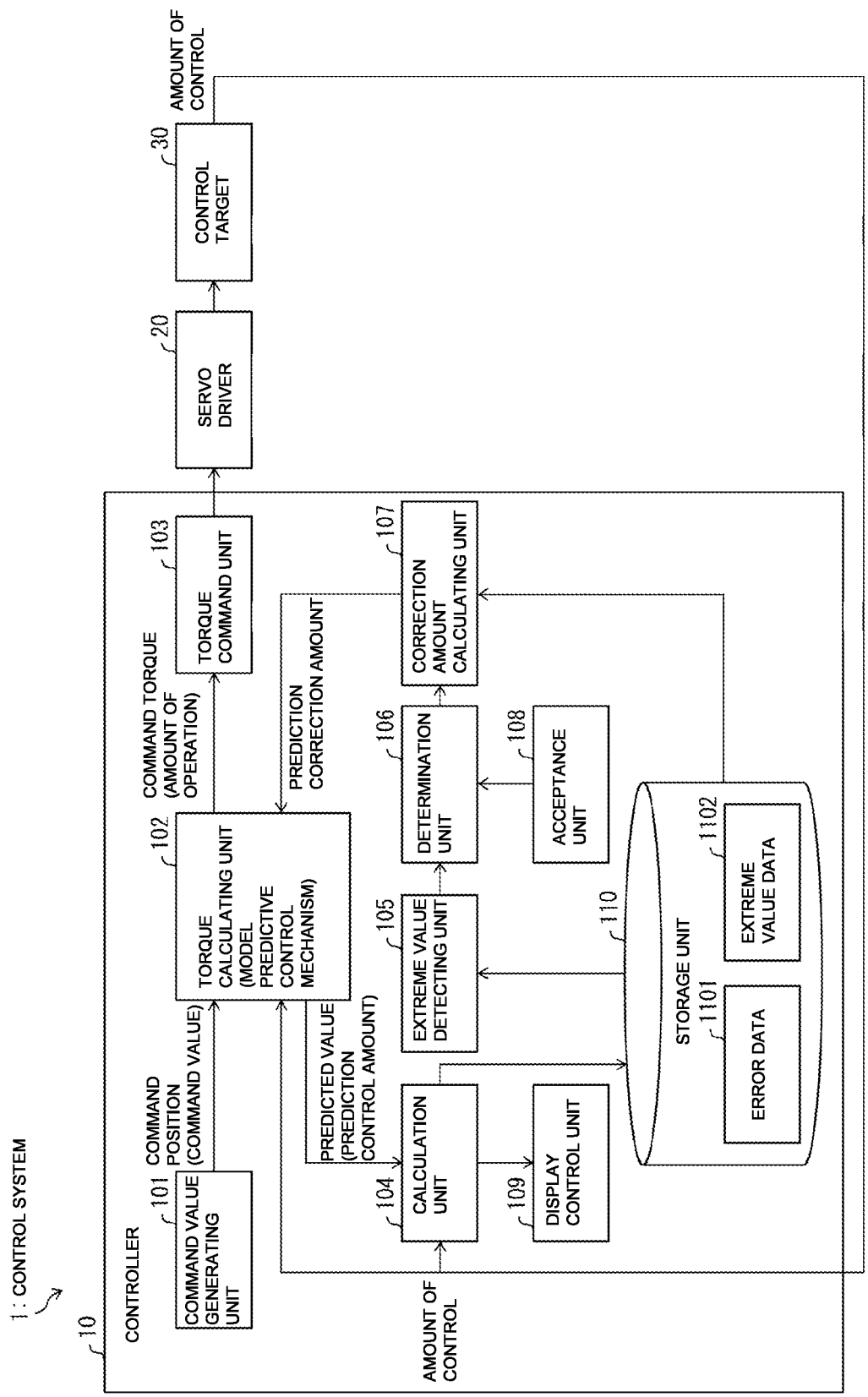
FIG. 1 is a block diagram illustrating the configuration of a main part of a controller according to Embodiment 1 of the disclosure.

The disclosure provides a model predictive control device not requiring a model of external disturbances and capable of applying external disturbance compensations to a wide range of machines and devices in a simpler manner. Particularly, the disclosure provides a model predictive control device capable of accurately predicting the amount of control even when the amplitude of a waveform representing changes in a predicted error with respect to time is not constant in a case in which the predicted error that is the error between an actually-measured value of the amount of control of a control target and a predicted value thereof periodically changes.

According to one aspect of the disclosure, there is provided a model predictive control device that predicts an amount of control of a control target corresponding to a command value generated for each control period from a target track using a model of the control target. The model predictive control device includes: a determination unit that determines presence/absence of periodicity of changes in a predicted error, which is an error between an actually-measured value of the amount of control of the control target and a predicted value of the amount of control predicted using the model, with respect to time; a deriving unit that derives an equation representing changes in an amplitude with respect to time in a waveform representing changes in the predicted error with respect to time in a case in which the presence of periodicity is determined by the determination unit; and a predicted value correcting unit that corrects the predicted value in a current period using the equation derived by the deriving unit and the predicted error in a period previous to the current period in the waveform.

According to the configuration described above, in a case in which the presence of periodicity of changes in a predicted error, which is an error between an actually-measured value of the amount of control and a predicted value, with respect to time is determined, the model predictive control device derives an equation representing changes in an amplitude with respect to time in a waveform representing changes in the predicted error with respect to time. Then, the model predictive control device corrects the predicted value in a current period using the derived equation and the predicted error in a period previous to the current period in the waveform.

Accordingly, the model predictive control device has an effect of ability to apply compensation for an external disturbance to a wide range of machines and devices in a simpler manner without requiring a model of the external disturbance. Particularly, the model predictive control device has an effect of ability to accurately predict the amount of control of the control target even when the amplitude of a waveform representing changes in the predicted error with respect to time is not constant with respect to time in a case in which the predicted error changes periodically.

The model predictive control device may further include a ratio calculating unit that calculates an amplitude variation ratio for each period up to the period previous to the current period in the waveform, wherein the deriving unit may derive the equation representing changes in the amplitude with respect to time in the waveform as a sum of values respectively acquired by multiplying amplitude variation ratios for periods up to the period previous to the current period, which are calculated by the ratio calculating unit, by coefficients for the periods.

According to the configuration described above, the model predictive control device calculates an amplitude variation ratio for each period up to the period previous to the current period in the waveform. Then, the model predictive control device derives the equation representing changes in the amplitude with respect to time in the waveform as a sum of values respectively acquired by multiplying acquired amplitude variation ratios for periods up to the period previous to the current period by coefficients for the periods.

Accordingly, the model predictive control device has an effect of ability to derive the equation described above using the amplitude variation ratios for the periods up to the period previous to the current period even in a case in which the amplitude variation ratio is not constant with respect to time. For example, even in a case in which the amplitude variation ratio increases or decreases in accordance with the advancement of time, the model predictive control device can derive the equation described above as a sum of values respectively acquired by multiplying the calculated "amplitude variation ratios for periods" up to the period previous to the current period by "the coefficients for the periods". In addition, "the coefficients for the periods", for example, may be calculated using a least-squares method or the like.

The model predictive control device may calculate the amplitude variation ratio in a certain period using a ratio between (1) an absolute value of a difference between a first extreme value that is an extreme value in the certain period in the waveform and a second extreme value that is an extreme value a half period before the first extreme value in the waveform and (2) an absolute value of a difference between a third extreme value that is an extreme value one period before the first extreme value in the waveform and a fourth extreme value that is an extreme value a half period before the third extreme value in the waveform or an absolute value of a difference between the second extreme value and the third extreme value.

According to the configuration described above, the model predictive control device calculates the amplitude variation ratio in a certain period in the waveform using a ratio between (1) an absolute value of a difference between a first extreme value that is an extreme value in the certain period in the waveform and a second extreme value that is an extreme value a half period before the first extreme value in the waveform and (2) an absolute value of a difference between a third extreme value that is an extreme value one period before the first extreme value in the waveform and a fourth extreme value that is an extreme value a half period before the third extreme value in the waveform or an absolute value of a difference between the second extreme value and the third extreme value.

For example, the model predictive control device calculates the amplitude variation ratio in a certain period in the period using a ratio between (1) an absolute value of a difference between a first extreme value that is an extreme value in the certain period in the waveform and a second extreme value that is an extreme value a half period before the first extreme value in the waveform and (2-1) an absolute value of a difference between a third extreme value that is an extreme value one period before the first extreme value in the waveform and a fourth extreme value that is an extreme value a half period before the third extreme value in the waveform.

In addition, for example, the model predictive control device calculates the amplitude variation ratio in a certain period in the waveform using a ratio between (1) an absolute value of a difference between a first extreme value that is an extreme value in the certain period in the waveform and a second extreme value that is an extreme value a half period before the first extreme value in the waveform and (2-2) an absolute value of a difference between the second extreme value and the third extreme value.

Accordingly, the model predictive control device has an effect of ability to easily calculate an amplitude variation ratio for each period of the waveform using extreme values of the waveform.

In the model predictive control device, the ratio calculating unit may calculate a latest amplitude variation ratio as a ratio between (1) an absolute value of a difference between a latest extreme value in the waveform determined until now and an extreme value that is an extreme value a half period before the latest extreme value in the waveform and (2) an absolute value of a difference between an extreme value that is an extreme value one period before the latest extreme value in the waveform and an extreme value that is 1.5 period before the latest extreme value in the waveform or an absolute value of a difference between an extreme value that is an extreme value a half period before the latest extreme value in the waveform and an extreme value that is an extreme value one period before the latest extreme value in the waveform, and the deriving unit may derive the latest amplitude variation ratio calculated by the ratio calculating unit as an equation representing a change in the amplitude with respect to time in the waveform.

According to the configuration described above, the model predictive control device calculates a latest amplitude variation ratio as a ratio between (1) an absolute value of a difference between a latest extreme value in the waveform determined until now and an extreme value that is an extreme value a half period before the latest extreme value in the waveform and (2) an absolute value of a difference between an extreme value that is an extreme value one period before the latest extreme value in the waveform and an extreme value that is 1.5 period before the latest extreme value in the waveform or an absolute value of a difference between an extreme value that is half period before the latest extreme value in the waveform and an extreme value that is one period before the latest extreme value in the waveform. Then, the model predictive control device derives the calculated ratio as an equation representing changes in the amplitude with respect to time in the waveform.

Accordingly, in a case in which the amplitude variation ratio is constant with respect to time, for example, in a case in which the amplitude of the waveform increases or decreases at a constant ratio in accordance with a time, the model predictive control device has an effect of ability to easily derive an equation representing a change in the amplitude with respect to time.

In addition, according to one aspect of the disclosure, there is provided a method of controlling a model predictive control device that predicts an amount of control of a control target corresponding to a command value generated for each control period from a target track using a model of the control target. The method includes: a determination step of determining presence/absence of periodicity of changes in a predicted error, which is an error between an actually-measured value of the amount of control of the control target and a predicted value of the amount of control predicted using the model, with respect to time; a deriving step of deriving an equation representing changes in an amplitude with respect to time in a waveform representing changes in the predicted error with respect to time in a case in which the presence of periodicity is determined in the determination step; and a predicted value correcting step of correcting the predicted value in a current period using the equation derived in the deriving step and the predicted error in a period previous to the current period in the waveform.

According to the configuration described above, in the control method, in a case in which the presence of periodicity of changes in a predicted error, which is an error between an actually-measured value of the amount of control and a predicted value, with respect to time is determined, an equation representing changes in an amplitude with respect to time in a waveform representing changes in the predicted error with respect to time is derived, Then, in the control method, the predicted value in a current period is corrected using the derived equation and the predicted error in a period previous to the current period in the waveform.

Therefore, according to the control method, an effect of ability to apply compensation for an external disturbance to a wide range of machines and devices in a simpler manner without requiring a model of the external disturbance is acquired. Particularly, according to the control method, there is an effect of ability to accurately predict the amount of control of the control target even when the amplitude of a waveform representing changes in the predicted error with respect to time is not constant with respect to time in a case in which the predicted error changes periodically.

According to the disclosure, a model of external disturbances is not required, and compensation for external disturbance can be applied to a wide range of machines and devices in a simpler manner, and, particularly, there is an effect of ability to accurately predict the amount of control even when the amplitude of a waveform representing changes in predicted error with respect to time is not constant in a case in which the predicted error that is the error between an actually-measured value of the amount of control of a control target and a predicted value thereof periodically changes.

Embodiment 1

Hereinafter, Embodiment 1 of the disclosure will be described in detail with reference to FIGS. 1 to 11(A) and 11(B). The same reference signs will be assigned to parts that are the same or correspond to each other, and description thereof will not be repeated. For easy understanding of a controller 10 (model predictive control device) according to one aspect of the disclosure, first, an overview of a control system 1 including the controller 10 will be described with reference to FIG. 2.

(Overview of Control System)

Figure 2:
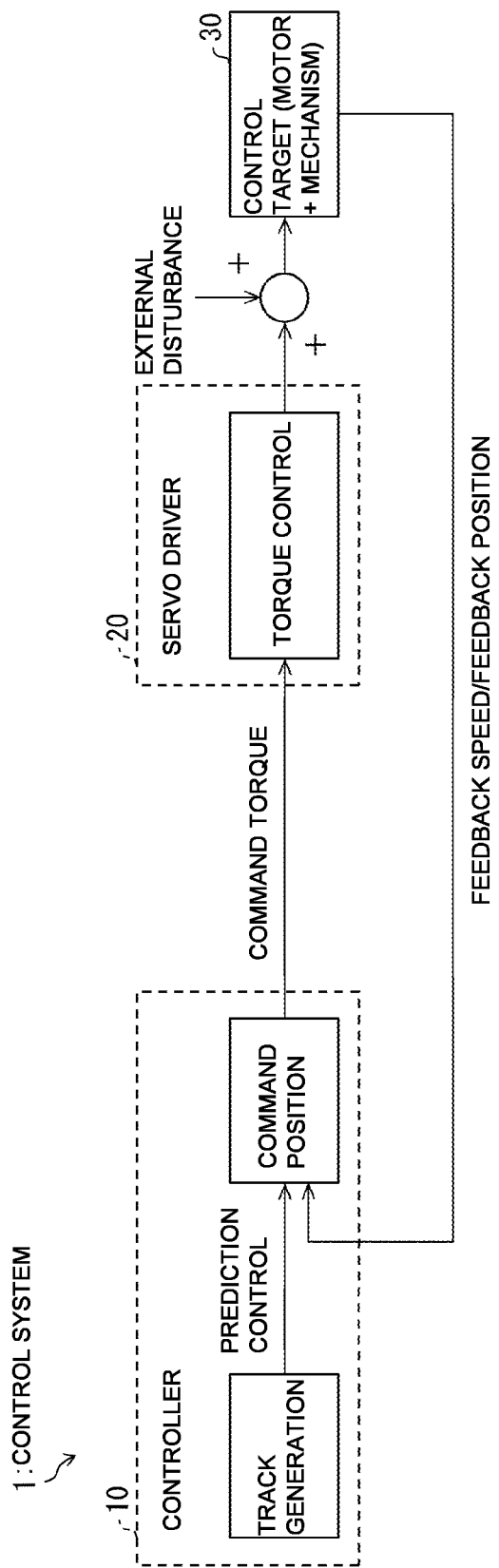
FIG. 2 is a diagram illustrating an overview of a control system including the controller illustrated in FIG. 1.

FIG. 2 is a diagram illustrating an overview of the control system 1 including the controller 10. The control system 1 is for quickly suppressing a disturbance with an amount of control according to an external disturbance having periodicity. The controller 10 of the control system 1 can perform external disturbance compensation without using a model of external disturbances, and accordingly, there is an effect of ability to apply external disturbance compensation to a wide range of machines and devices in a simpler manner. The controller 10 can be applied either to control of an operation having a cycle (operation period) or to control of a continuous operation having no cycle. External disturbance compensation executed by the controller 10 does not use an operation cycle, and accordingly, it can be applied to control of an operation in which a continuous irregular operation continues.

The controller 10, for example, is a control device (high-rank controller) including a prediction mechanism such as a model predictive control (MPC) or the like. The controller 10 determines the presence/absence of periodicity relating to variations in a predicted error and, in a case in which the presence of periodicity is determined, corrects a prediction of the amount of control using predicted error data of a previous period (one predicted error variation period) that is a period of change in the predicted error with respect to time. For example, in a case in which an external disturbance having periodicity such as a vibration excited in accordance with accelerations or decelerations of a tool and a table or a vibration received from another machine disposed in the vicinity occurs in a processing machine, the controller 10 can maintain a control performance. In addition, for example, by maintaining the control performance, the controller 10 can maintain the quality of manufactured products.

The control system 1 includes: (1) a controller 10 that is, for example, a programmable controller (programmable logic controller (PLC)); (2) a servo driver 20 as a low-rank controller controlled by the controller 10 that is a high-rank controller; and (3) a control target 30 (for example, a motor and a mechanism) that is controlled by the servo driver 20. In the control system 1, the controller 10 executes position/speed control and outputs a torque command value to the servo driver 20 using predictive control.

The controller 10 is a controller including a model predictive control mechanism and outputs a torque command value to the servo driver 20 as an amount of operation. The controller 10, for example, accepts target track data (target track) from the outside such as a user (track generation) and generates a command value (command position) from the accepted target track data for each control period. In addition, the controller 10 acquires "an amount of control that is an output of the control target 30 (an actually-measured value of an amount of control)" from the control target 30 as feedback information. In other words, the controller 10 acquires a speed and a position (at least one of the speed and the position) output by the control target 30 as a feedback speed and a feedback position (at least one of the feedback speed and the feedback position).

The controller 100 includes a model of the control target 30 (and the servo driver 20) as an internal model and outputs a torque command value to the servo driver 20 as an amount of operation on the basis of a command position generated using the internal model and "the amount of control that is an output of the control target 30". Here, the controller 10 predicts the amount of control using the model of the control target (i.e., the control target 30 and the servo driver 20), estimates a predicted error, and performs external disturbance compensation. The controller 10 stores and uses an external disturbance pattern maintained in a dimension of the amount of control and thus, an arithmetic operation for estimating an external disturbance does not need to be performed in addition to an arithmetic operation for calculating the amount of control (here, more precisely, rather than an "external disturbance pattern", a predicted error pattern including information of an external disturbance is stored by the controller 10). Accordingly, compared to a device that separately performs an arithmetic operation for estimating an external disturbance in addition to an arithmetic operation for calculating the amount of control, the controller 10 has a small calculation load, which is a major advantage for motion control requiring a rapid control period.

The servo driver 20 executes torque control for the control target 30 in accordance with a torque command value transmitted from the controller 10.

(Overview of Controller)

Next, a configuration, details of the process, and the like of the controller 10 included in the control system 1 of which the overview has been described with reference to FIG. 2 will be described with reference to FIG. 1 and the like. Before details are described with reference to FIG. 1, for easy understanding of the controller 100, an overview thereof will be given as follows.

The controller 10 (model predictive control device) is a model predictive control device predicting an amount of control of the control target 30 corresponding to a command value generated for respective control periods from a target track using a model of the control target 30. The controller 10 includes: a determination unit 106 that determines presence/absence of periodicity of changes in a model predicted error, which is an error between an actually-measured value of the amount of control of the control target 30 and a predicted value of the amount of control predicted using the model described above with respect to time; and a correction amount calculating unit 107 that calculates a prediction correction amount (more specifically, prediction correction amounts Cd(n) and CH(n) to be described later) used for correcting "a predicted value of the amount of control predicted using the model described above in a certain predicted error variation period" using the model predicted error in a predicted error variation period previous to the certain predicted error variation period, wherein a predicted error variation period is a period of changes in the model predicted error with respect to time, in a case in which the presence of periodicity of the model predicted error with respect to time is determined by the determination unit 106.

According to the configuration described above, in a case in which the presence of periodicity of changes in the model predicted error with respect to time is determined, the correction amount calculating unit 107 calculates a prediction correction amount used for correcting "a predicted value of the amount of control predicted using the model described above in the certain predicted error variation period" using the model predicted error described above in the predicted error variation period previous to the certain predicted error variation period. Although details will be described later, the torque calculating unit 102 corrects a predicted value (a predicted value of the amount of control) using the prediction correction amount calculated by the correction amount calculating unit 107.

In addition, "a predicted value of the amount of control predicted using the model described above in the certain predicted error variation period described above" that is corrected by the torque calculating unit 102 using prediction correction amounts Cd(n) and CH(n) may be rephrased as "a predicted value at the present".

Accordingly, the controller 10 has an effect of ability to correct a predicted value in the certain predicted error variation period using the model predicted error described above in the predicted error variation period previous to the certain predicted error variation period in a case in which the predicted value of the amount of control in the certain predicted error variation period described above is disturbed by an external disturbance having periodicity. The controller 10 has an effect of ability to apply compensation for an external disturbance to a wide range of machines and devices in a simpler manner without requiring a model of the external disturbance.

The controller 10 further includes a calculation unit 104 that calculates a model predicted error for each of a plurality of continuous control periods and an extreme value detecting unit 105 that detects a maximum value and a minimum value of the model predicted error from changes in the plurality of continuous model predicted errors with respect to time, which are calculated by the calculation unit 104, and the determination unit 106 determines the presence/absence of periodicity of changes in the model predicted error with respect to time from a time when each of a maximum value and a minimum value is detected by the extreme value detecting unit 105.

According to the configuration described above, the determination unit 106 determines the presence/absence of periodicity of changes in the model predicted error with respect to time from a detection time of each of the maximum value and the minimum value detected from changes in the model predicted error with respect to time calculated for each of the plurality of continuous control periods.

Accordingly, the controller 10 has an effect of ability to correct a predicted value of the amount of control predicted using the model in a certain predicted error variation period using the model predicted error in the predicted error variation period previous to the certain predicted error variation period in a case in which the presence of periodicity of changes in the model predicted error with respect to time is determined from a detection time of each of the maximum value and the minimum value of changes in the model predicted error with respect to time.

The controller 10 further includes a torque calculating unit 102 that corrects a predicted value (a predicted value of the amount of control) using the prediction correction amount calculated by the correction amount calculating unit 107 and calculates a torque such that the amount of control conforms to a command value (command position) using the predicted value after the correction (the predicted value after the correction) and a torque command unit 103 that outputs the torque calculated by the torque calculating unit 102 to the servo driver 20 (a control system performing motion control of the control target 30) as a command value relating to torque control of the control target 30.

According to the configuration described above, the torque calculating unit 102 calculates a torque such that the amount of control conforms to a command value (command position) using a predicted value after correction (a predicted value after correction) using a prediction correction amount calculated by the correction amount calculating unit 107, and the torque command unit 103 outputs the torque calculated by the torque calculating unit 102 to the servo driver 20 as a command value relating to torque control of the control target 30.

Accordingly, the controller 10 has an effect of ability to output a torque for causing the amount of control of the control target 30 to conform to the command value to the servo driver 20 without executing an arithmetic operation process for converting a change in the amount of control due to the external disturbance into an amount of operation.

(Relation Between Control Period and Predicted Error Variation Period)

In a relation (distinction) between the control period and the predicted error variation period in the control system 1, attention needs to be paid to the following points. In the control system 1, the "control period" is a period in which the controller 10 repeatedly executes a control operation and, for example, is a very short time (period) such as 0.25 ms or 1 ms. Meanwhile, the "predicted error variation period" is a time (period) of changes in a model predicted error, which is an error between a predicted value of the amount of control calculated by the controller 10 (the torque calculating unit 102) and the amount of feedback control (an actually-measured value of the amount of control of the control target 30) from the control target 30 with respect to time. A period (the predicted error variation period) in a case in which the periodicity of changes in the model predicted error with respect to time is present is longer than the control period and, for example, is in the range of 50 ms or 1 s.

The controller 10 calculates a model predicted error that is an error between a predicted value of the amount of control predicted using a model of the control target 30 (and the servo driver 20) and the amount of feedback control from the control target 30 (an actually-measured value of the amount of control of the control target 30) for every "control period". The controller 10 aligns a plurality of continuous model predicted errors in a time series and determines presence/absence of periodicity of changes in the model predicted error with respect to time. In a case in which the presence of periodicity of changes in the model predicted error with respect time is determined, the controller 10 calculates a "predicted error variation period" that is a period of changes in the model predicted error with respect to time. Then, the controller 10 corrects the predicted value of the amount of control in a certain "predicted error variation period" using the model predicted error in the previous "predicted error variation period" of the certain "predicted error variation period" in the "predicted error variation period" described above.

The "certain predicted error variation period" described above neither can be designated nor is determined at the current time. Only a (past) variation period before the current time (in other words, the previous "predicted error variation period" of a certain "error variation period") is determined. The controller 10 corrects the predicted value of the (future) amount of control (in other words, a predicted value of the amount of control in a certain "predicted error variation period"), which is predicted at the current time, using a "(past) variation period before the current time".

(Details of Controller)

As described above, the controller 10 determines the presence/absence of periodicity of an external disturbance on the basis of changes in the model predicted error, which is an error between a predicted value of the amount of control predicted using the model of the control target 30 (and the servo driver 20) and an amount of feedback control from the control target 30 (an actually-measured value of the amount of control of the control target 30), with respect to time. Then, in a case in which the presence of periodicity is determined, the controller 10 corrects a predicted value of the amount of control predicted using the model in a certain predicted error variation period using the model predicted error in the predicted error variation period previous to the certain predicted error variation period in a predicted error variation period (a period of changes in the model predicted error with respect to time). Next, details of the configuration of the controller 10 of which the overview has been described above will be described with reference to FIG. 1.

As described above, the "certain predicted error variation period" described above neither can be designated nor is determined at the current time. Only a (past) variation period before the current time (i.e., a "predicted error variation period" previous to a certain predicted error variation period) is determined. The controller 10 corrects a predicted value of the amount of control in a certain "predicted error variation period" (i.e., a predicted value of the (future) amount of control predicted at the current time") using the previous "predicted error variation period" of the certain "predicted error variation period" (i.e., a (past) "variation period before the current time."

FIG. 1 is a block diagram illustrating the configuration of a main part of a controller 10 according to Embodiment 1 of the disclosure. The controller 10 illustrated in FIG. 1 has a configuration including a command value generating unit 101, a torque calculating unit 102, a torque command unit 103, a calculation unit 104, an extreme value detecting unit 105, a determination unit 106, a correction amount calculating unit 107, an acceptance unit 108, a display control unit 109, and a storage unit 110. In order to secure simplicity of description, components not directly relating to this embodiment are omitted from the description and the block diagram. Here, the controller 10 may include the omitted components in accordance with situations for implementation. Each of the functional blocks of the command value generating unit 101, the torque calculating unit 102, the torque command unit 103, the calculation unit 104, the extreme value detecting unit 105, the determination unit 106, the correction amount calculating unit 107, the acceptance unit 108, the display control unit 109, and the like described above, for example, may be realized by a central processing unit (CPU) or the like reading a program stored in a storage device (the storage unit 110) realized by a read only memory (ROM), a non-volatile random access memory (NVRAM), or the like into a random access memory (RAM) not illustrated in the drawing and executing the program. Hereinafter, each functional block of the controller 10 will be described.

The command value generating unit 101 accepts target track data (target track) from the outside (for example, a user) (track generation) and generates a command value (command position) from the accepted target track data for every control period. The command value generating unit 101 transmits the generated command value (command position) to the torque calculating unit 102.

The torque calculating unit 102 executes model predictive control (MPC) and, more specifically, predicts a state in the future using an internal model of the control target 30 and determines an amount of operation such that an output of the control target 30 in the future (a predicted value of the amount of control) is as close as possible to a target value (a command value, in other words, a command position). In other words, the torque calculating unit 102 predicts a change in the output (the amount of control) in the future on the basis of the internal model and determines an input (an amount of operation) such that the output and the target value are as close as possible to each other.

The torque calculating unit 102 includes the internal model acquired by modelling the behavior of the control target 30 and predicts an amount of control output by the control target in each control period using the internal model. In other words, the torque calculating unit 102 calculates a predicted value (a predicted value of the amount of control) in each control period using the internal model. The torque calculating unit 102 notifies the calculation unit 104 of the calculated predicted value (a predicted amount of control).

The internal model used by the torque calculating unit 102 for calculating a predicted value of the amount of control of the control target 30 and determining an amount of operation includes not only a model of the control target 30 but also a model of the servo driver 20. In other words, the torque calculating unit 102 calculates a predicted value of the amount of control of the control target 30 using the internal models of the control target 30 and the servo driver 20 and determines an amount of operation such that the predicted value is close to the command value (i.e., the command position).

Here, in a case in which characteristics of the control target (i.e., the entirety of the servo driver 20 and the control target 30; a range from an output of the controller to an input of the controller) seen from the controller 10 include a dead time, there are problems in that the accuracy of estimation of an external disturbance executed by the controller 10 decreases, and a sufficient compensation effect cannot be acquired when the dead time becomes long. As an example in which the control target seen from the controller 10 includes a dead time, there is a system in which the controller 10 and output devices such as the servo driver 20 are connected through communication. When seen from the controller 10, the entirety of the servo driver 20 and the control target 30 becomes a target to be controlled (control target), and accordingly, basically, the internal model includes the model of the servo driver 20. Here, a torque control unit using the servo driver 20, generally, has characteristics of having a sufficiently higher speed than the characteristics of the control target 30, and thus, the characteristics of the servo driver 20 may be ignored (in other words, a transfer function thereof may be regarded as "1").

In addition, the torque calculating unit 102 acquires prediction correction amounts (more specifically, prediction correction amounts Cd(n) and CH(n)) from the correction amount calculating unit 107. The torque calculating unit 102 corrects a predicted value (a predicted value of the amount of control) using the acquired prediction correction amounts and calculates a torque using a predicted value after the correction (post-correction predicted value) such that the amount of control conforms to a command value (command position). The torque calculating unit 102 notifies the torque command unit 103 of the calculated torque as a command torque (an amount of operation).

The torque command unit 103 outputs a command torque (the amount of operation) notified from the torque calculating unit 102 to the servo driver 20 (a control system performing motion control of the control target 30) as a command value relating to torque control of the control target 30.

The calculation unit 104 calculates a model predicted error that is an error between an output of the control target 30 (an actually-measured value of the amount of control) in a certain control period and a predicted value of the amount of control (prediction amount of control) in the certain control period for every control period. In other words, the calculation unit 104 calculates an error between "a predicted value of the amount of control (prediction amount of control) in the certain control period" notified from the torque calculating unit 102 and "an output of the control target 30 (an actually-measured amount of control) in the certain control period" (a model predicted error in the certain control period).

The calculation unit 104 notifies the extreme value detecting unit 105 of "the model predicted error in the certain operation period" calculated for each control period. The calculation unit 104 may store the model predicted error in the storage unit 110 as error data 1101. In addition, the calculation unit 104 notifies the display control unit 109 of the calculated "model prediction area in the certain operation period".

The extreme value detecting unit 105 detects a maximum value and a minimum value of the model predicted error (changes in the model predicted error with respect to time) from changes in the model predicted error with respect to time (model predicted errors stored in the storage unit 110 as error data 1101), which have been calculated by the calculation unit 104, for each control period. In other words, the extreme value detecting unit 105, for example, acquires a predicted error variation waveform representing changes in the model predicted error with respect to time that is notified from the calculation unit 104 for each control period. Then, the extreme value detecting unit 105 detects (determines) extreme values for changes in the model predicted error with respect to time in the predicted error variation waveform. The extreme value detecting unit 105 notifies the determination unit 106 of detected extreme values together with timings (detection times) at which the extreme values have occurred for each control period. The extreme value detecting unit 105 may store the detected extreme values in the storage unit 110 as extreme value data 1102 together with the timings (detection times) at which the extreme values have occurred.

In addition, the extreme value detecting unit 105 may acquire a period lower limit value designated in a user operation accepted by the acceptance unit 108 from the acceptance unit 108. For example, when at least one of a maximum value and a minimum value of changes in the model predicted error with respect to time is determined from the predicted error variation waveform, the extreme value detecting unit 105 may regard a mountain (valley) having a difference (interval) from a detection time of a maximum value (minimum value) that has determined immediately before does not reach a period lower limit value as not a maximum value (minimum value). In other words, in a case in which a detection time difference between maximum values (minimum values) is shorter than a period lower limit value, the extreme value detecting unit 105 does not determine the extreme value (in other words, does not regard it as a maximum value (minimum value).

The extreme value detecting unit 105 (1) detects a plurality of maximum values such that intervals between detection times of the plurality of maximum values are longer than a predetermined period and (2) detects a plurality of minimum values such that intervals between detection times of the plurality of minimum values are longer than a predetermined period.

The determination unit 106 determines presence/absence of periodicity of changes in a model predicted error, which is an error between an actually-measured value of the amount of control of the control target 30 and a predicted value of the amount of control predicted using the model, with respect to time. While details of a determination method used by the determination unit 106 will be described later with reference to FIGS. 5, 8, and the like, the determination unit 106, for example, determines presence/absence of periodicity of changes in the model predicted error with respect to time from a time at which each of the maximum values and the minimum values is detected by the extreme value detecting unit 105. In other words, the determination unit 106 calculates differences (time intervals) between timings (detection times) at which a plurality of extreme values have occurred by referring to the extreme value data 1102 stored in the storage unit 110. Then, the determination unit 106 may determine the presence/absence of periodicity of changes in the model predicted error with respect to time by determining whether the plurality of calculated time intervals are approximate to each other.

In addition, the determination unit 106 acquires a period lower limit value designated by a user operation accepted by the acceptance unit 108. The determination unit 106, (1) when a plurality of maximum values are detected by the extreme value detecting unit 105, uses an interval longer than the period lower limit value among intervals of detection times between the plurality of maximum values as an interval of times when the extreme values used when the presence/absence of periodicity is determined are detected and (2) when a plurality of minimum values are detected by the extreme value detecting unit 105, uses an interval longer than the period lower limit value among intervals of detection times between the plurality of minimum values as an interval of times when the minimum values used when the presence/absence of periodicity is determined are detected.

In addition, the calculation unit 104, the extreme value detecting unit 105, and the determination unit 106 execute respective processes for every control period. In other words, the calculation unit 104 calculates a predicted error for every control period, and the extreme value detecting unit 105 detects extreme values (a maximum value and a minimum value) for every control period. The determination unit 106 determines the presence/absence of periodicity of changes in the model predicted error with respect to time using time intervals (differences between detection times) between the maximum values (minimum values) detected by the calculation unit 104 for every control period. Here, the display control unit 109 to be described later may display changes in the model predicted error with respect to time to a user through a batch process for every operation period. A processing amount is large in a case in which changes in the model predicted error with respect to time is displayed for every control period, and thus, the display control unit 109 may display changes in the model predicted error with respect to time for every operation period.

In a case in which the presence of periodicity of changes in the model predicted error with respect to time is determined by the determination unit 106, the correction amount calculating unit 107 calculates prediction correction amounts (more specifically, the prediction correction amounts Cd(n) and CH(n)) using the model predicted error in the prediction variation period previous to a certain predicted error variation period wherein the predicted error variation period is a period of changes in the model predicted error with respect to time. While details will be described later, the correction amount calculating unit 107 calculates amounts of changes in the predicted error PE in a dead time d section and a prediction horizon H section as prediction correction amounts Cd(n) and CH(n). Then, the correction amount calculating unit 107 notifies the torque calculating unit 102 of the calculated prediction correction amounts.

The acceptance unit 108 accepts a user operation that designates a period lower limit value. The acceptance unit 108 notifies the determination unit 106 (and the extreme value detecting unit 105) of the period lower limit value designated by the user operation.

In addition, the acceptance unit 108 may accept a user operation designating a reference value (a value EPS1 to be described later) used by the determination unit for determining the presence/absence of periodicity of changes in the model predicted error with respect to time.

Furthermore, the acceptance unit 108 may accept a user operation designating a threshold used by the extreme value detecting unit 105 for detecting (determining) an extreme value. For example, when extreme values (a maximum value that is a mountain and a minimum value that is a valley) are detected (determined) from mountains and valleys of a predicted error variation waveform, the extreme value detecting unit 105 may determine a mountain (valley) as a maximum value (minimum value) only in a case in which a difference between the mountain and the valley exceeds a threshold designated by a user.

The display control unit 109 displays changes in the model predicted error with respect to time to a user. The display control unit 109 may acquire a model predicted error in the "certain operation period" calculated by the calculation unit 104 from the calculation unit 104 and display changes in the model predicted error with respect to time using the acquired model predicted error. In addition, the display control unit 109 may display changes in the model predicted error with respect to time to a user by referring to the error data 1101 stored in the storage unit 110.

The storage unit 110 is a storage device that stores various kinds of data used by the controller 10. In addition, the storage unit 110 may non-transitorily store (1) a control program, (2) an operating system (OS) program, and (3) an application program used for executing various functions included in the controller 10, which are executed by the controller and (4) various kinds of data read in a case in which the application is executed. The data of (1) to (4) described above, for example, is stored in a nonvolatile storage device such as a read only memory (ROM), a flash memory, an erasable programmable ROM (EPROM), an electrically-EPROM (EEPROM; registered trademark), or a hard disc drive (HDD).

The controller 10 may include a temporary storage unit not illustrated in the drawing. The temporary storage unit is a so-called work memory that temporarily stores data used for arithmetic operations, results of the arithmetic operations, and the like in the process of various processes executed by the controller 10 and is composed of a volatile storage device such as a random access memory (RAM).

A storage device in which specific data is stored is appropriately determined on the basis of the use of the controller 10, the degree of convenience, costs, physical restrictions, and the like. In addition, the storage unit 110 stores error data 1101 and extreme value data 1102.

The error data 1101 is information of "the model predicted error (in the certain operation period)" calculated by the calculation unit 104 and is stored in the storage unit 110 by the calculation unit 104.

The extreme value data 1102 is information of extreme values in changes in the model predicted error with respect to time that are detected from changes in the model predicted error with respect to time by the extreme value detecting unit 105 and is stored in the storage unit 110 by the extreme value detecting unit 105.

(Model Predictive Control)

Figure 3:
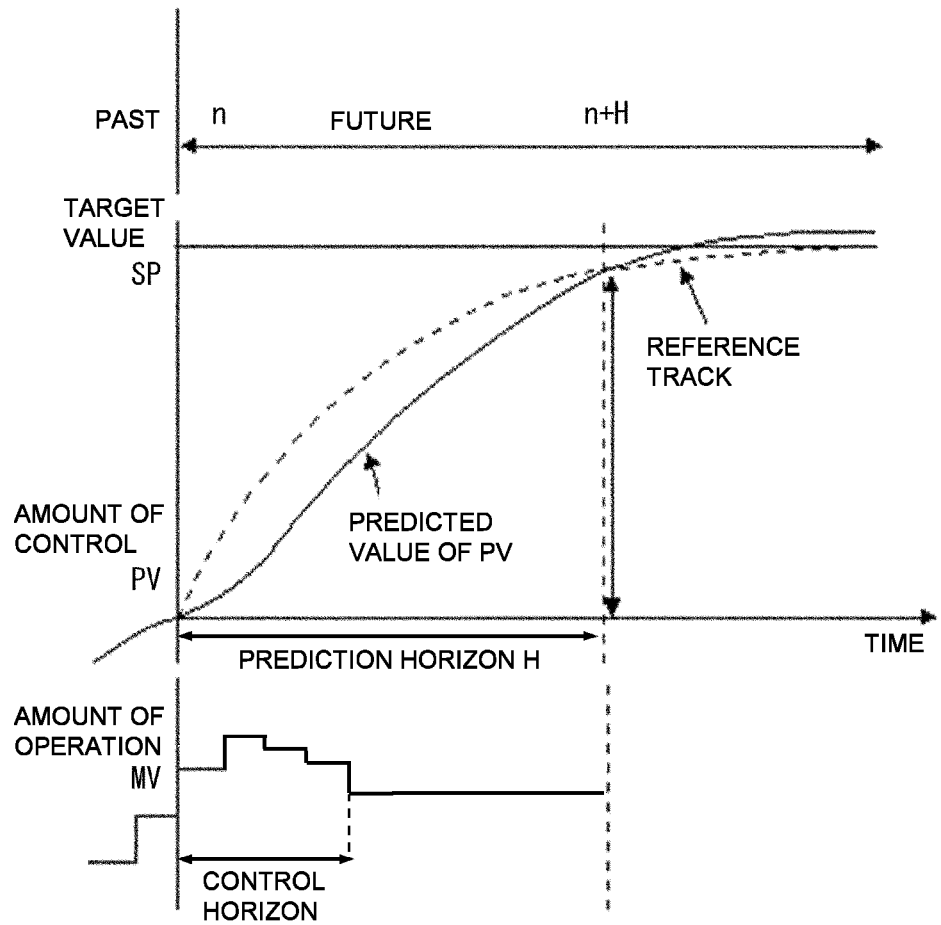
FIG. 3 is a diagram illustrating an overview of model predictive control executed by the controller illustrated in FIG. 1.

FIG. 3 is a diagram illustrating an overview of model predictive control executed by the controller 10. In the model predictive control, an amount of operation in the future (a torque command value given to the servo driver 20 in the control system 1) for causing the amount of control to match a target point on a reference track (a target track in the control system 1) is determined using the model of the control target (the control target 30 (and the servo driver 20) in the control system 1), and this process is repeated every period.

The controller 10, as illustrated in FIG. 3, measures an amount of control PV(n) at the current time n and calculates a reference track, which is denoted by a broken line, having the amount of control PV(n) at the current time as a starting point and gradually approaching a set value SP. Here, for the simplicity, a control horizon Hu is assumed to be "1".

Next, the controller 10 determines an amount of operation MV(n) at the current time n such that a predicted value PV(n+H) after the prediction horizon H coincides with the reference track using the internal model (the model of the control target 30 (and the servo driver 20)).

The controller 10 actually applies the acquired amount of operation MV(n) to the servo driver 20 and maintains the value up to a next sampling time n+1.

When an amount of control PV(n+1) is measured at the time n+1, the controller 10 regards the time t+1 as the current time again, determines an amount of operation such that a predicted value in the future and the reference track coincide with each other after the prediction horizon H, and applies the amount of operation to the servo driver 20 up to the next sampling time. Thereafter, this sequence is repeated.

Next, the predictive control executed by the controller 10 in the control system 1 will be described in detail.

The controller 10 performs predictive control using the internal model as described above, and the internal model of the control system 1 is an N-th degree ARX model represented in the following equation discretized at sampling times. In addition, the model of the control target (the control target 30 (and the servo driver 20) in the control system 1) is not limited to the ARX model, and a step response model or any other model may be used.

$$Y(n) = -a1 \times Y(n-1) - a2 \times Y(n-2) - \ldots - aN \times Y(n-N) + b1 \times U(n-1) + b2 \times U(n-2) + \ldots + bM \times U(n-M) \quad \text{[Math. 1]}$$

Here, Y(n) represents an output value of the internal model at a time n, U(n) represents amounts of operation at a time n, a1 to aN, b1 to bM represent coefficients of the internal model, and N, M represent the degree of the internal model.

For example, time-series data of input/output for the control target (the control target 30 (and the servo driver 20) in the control system 1), in other words, time-series data of the amount of operation MV and the amount of control PV are measured in advance, and the determination of this ARX model is performed using a least squares method or the like.

In the control system 1, as a reference track denoted by a broken line in FIG. 3, a track in which a deviation at the current time n exponentially approaches "0" with a time constant Tr is used.

In other words, a target value R(n+H) on the reference track after the prediction horizon H can be acquired using the following equation.

$$R(n+H) = SP(n+H) - \lambda H \ast \{SP(n) - PV(n)\}, \lambda = \exp(-Tc/Tr)$$

Here, PV(n) represents an amount of control at a time n, SP(n) and SP(n+H) represent target values at times n and n+H, R(n+H) represents a target value after a prediction horizon H on the reference track, and Tc represents a sampling time.

Accordingly, an increment from the amount of control PV(n) at the current time n, in other words, an increment (deviation) ΔP(n+H) of the amount of control PV required for causing the amount of control PV to coincide with a target value R(n+H) on the reference track after the prediction horizon H is as follows.

$$\Delta P(n+H) = SP(n+H) - \lambda H \times \{SP(n) - PV(n)\} - PV(n) = \quad \text{[Math. 2]}$$
$$(1 - \lambda H)\{SP(n) - PV(n)\} + SP(n+H) - SP(n) \circ$$

Next, calculation of the amount of operation MV will be described.

In the case of a linear control target, the behavior of a model output can be acquired by adding the following two items.

(1) Fee Response

A model output Yf(n+H) after the prediction horizon H in a case in which a current state is set as an initial value, and "0" is continued as the amount of operation MV in the future is acquired through repeated calculation from the equation of the ARX model described above.

$$Yf(n+1) = \quad \text{[Math. 3]}$$
$$\quad -a1 \times Y(n) - a2 \times Y(n-1) - \ldots - aN \times Y(n-N+1)$$
$$Yf(n+2) = -a1 \times Yf(n+1) - a2 \times Y(n) -$$
$$\quad \ldots - aN \times Y(n-N+2)$$
$$\ldots$$
$$Yf(n+H) = -a1 \times Yf(n+H-1) -$$
$$\quad a2 \times Yf(n+H-2) - \ldots - aN \times Y(n-N+H)$$

(2) Step Response

A model output S(H) at a time H in a step response of MV=1 (100%) is acquired with an initial state set as "0".

$$S(1) = b1 \quad \text{[Math. 4]}$$
$$S(2) = -a1 \times S(1) + (b1 + b2)$$
$$\ldots$$
$$S(H) = -a1 \times S(H-1) - a2 \times S(H-2) -$$
$$\quad \ldots - aN \times S(H-N) + (b1 + b2 + \ldots + bM)$$

Generally, when MV is set as MV(n) instead of MV=1 (100%), a step response output at a time H is MV(n)*S(H).

Here, MV(n) represents an amount of operation at a time n, Yf(n+H) represents a free response output of the model after the prediction horizon H, and S(H) represents a step response output of the model at the time H.

In the previous term, after the time n, in a case in which the amount of operation MV(n) is continued, a model output at a time point of a time n+H (a predicted value of the amount of control) is acquired using the following equation.

$$Y(n+H) = Yf(n+H) + MV(n) \ast S(H)$$

Here, an increment from Y(n), in other words, an increment of the model output ΔM(n+H) expected after the prediction horizon H is as follows.

$$\Delta M(n+H)=Yf(n+H)+MV(n)*S(H)-Y(n)$$

Accordingly, the amount of operation MV may be acquired such that an increment ΔM(n+H) of the model output expected after the prediction horizon H is the same as the above-described increment ΔP(n+H) of the amount of control PV for causing the amount of control PV to be the target value on the reference track after the prediction horizon H. In other words, an amount of operation MV for which ΔM(n+H)=ΔP(n+H) may be acquired.

Here, by taking a prediction correction amount CH(n) into account, from ΔM(n+H)+CH(n)=ΔP(n+H), the following equation is acquired.

$$Yf(n+H)+MV(n)\times S(H)-Y(n)+CH(n)=(1-\lambda H)\{SP(n)-PV(n)\}+SP(n+H)-SP(n) \quad \text{[Math. 5]}$$

By solving with respect to MV(n), the following equation is acquired.

$$MV(n)=[(1-\lambda H)\{SP(n)-PV(n)\}+SP(n+H)-SP(n)-Yf(n+H)+Y(n)-CH(n)]/S(H) \quad \text{[Math. 6]}$$

In a case in which a dead time is not included in the internal model, the calculation equation of MV of the previous term needs to be corrected in consideration of the dead time d.

Thus, for actual process data, a time n+d is used instead of the time n.

$$MV(n)=[(1-\lambda H)\{SP(n+d)-PV(n+d)\}+SP(n+H+d)-SP(n+d)-Yf(n+H)+Y(n)-CH(n)]/S(H) \quad \text{[Math. 7]}$$

Here, a predicted value of the PV(n+d) is required, and, generally, the predicted value is acquired using the following equation as reasonable approximation.

$$PV(n+d)=PV(n)+Y(n)-Y(n-d)$$

Also here, by taking a prediction correction amount Cd(n) during the dead time d into account, from PV(n+d)=PV(n)+Y(n)-Y(n-d)+Cd(n), the following equation is acquired.

$$MV(n)=[(1-\lambda H)\{SP(n+d)-PV(n)+Y(n)-Y(n-d)+Cd(n)\}+SP(n+H+d)-SP(n+d)-Yf(n+H)+Y(n)-CH(n)]/S(H) \quad \text{[Math. 8]}$$

In addition, after the amount of operation MV(n) at the time n is calculated, for the calculation of the next time, a next model output Y(n+1) is acquired.

$$Y(n+1)=a1\times Y(n)+a2\times Y(n-1)+\ldots+aN\times Y(n-N+1)+b1\times MV(n)+b2\times MV(n-1)+\ldots+bM\times MV(n-M+1) \quad \text{[Math. 9]}$$

Here, as MV(n), a value after an operation amount limiting process is used.

(One Example of External Disturbance Compensating Process)

Figure 4:
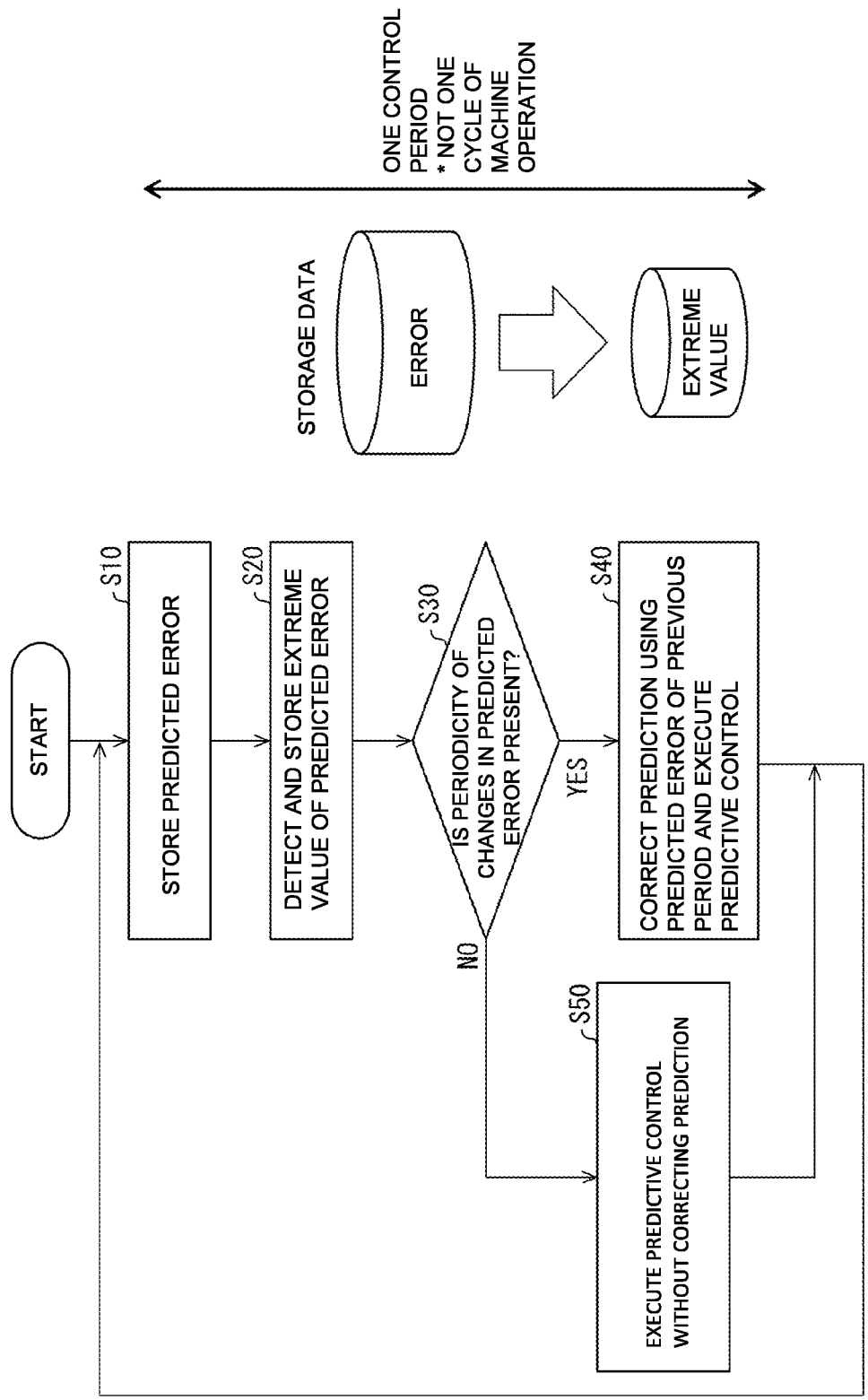
FIG. 4 is a flowchart illustrating one example of an external disturbance compensating process executed by the controller illustrated in FIG. 1.

FIG. 4 is a flowchart illustrating one example of an external disturbance compensating process executed by the controller 10. As illustrated in FIG. 4, the controller 10 stores a model predicted error (S10) and detects extreme values of the model predicted error from data in which model predicted errors are aligned in a time series (S20). Then, the controller 10 determines the presence/absence of periodicity of changes in the model predicted error with respect to time using the detected extreme values (S30). In a case in which the presence of periodicity of changes in the model predicted error with respect to time is determined (Yes in Step S30), the controller 10 corrects the predicted value using a predicted error of the previous period (one predicted error variation period) and executes predictive control using the corrected predicted value (S40). On the other hand, in a case in which the absence of periodicity of changes in the model predicted error with respect to time is determined (No in S30), the controller 10 does not correct the predicted value and executes predictive control (S50). Hereinafter, details thereof will be described.

In the following description, "PE(n) represents a predicted error at a time n within the cycle", and "PV(n) represents an amount of control at a time n within the cycle (an actually-measured value of the amount of control output by the control target 30; for example, a feedback position)". In addition, "Y(n−d) represents a model predicted value at a time (n−d) (a predicted value of the amount of control at a time (n−d) within the cycle calculated using an internal model in which behaviors of the control target (in other words, the control target 30 and the servo driver 20) are modeled by the torque calculating unit 102), and "d" represents a "dead time". The dead time d is an integral multiplication of the control period of the controller 10.

The calculation unit 104 calculates predicted error data corresponding to one cycle for every control period, notifies the extreme value detecting unit 105 of the calculated model predicted error, and stores the model predicted error in the storage unit 110 as error data 1101 (S10). The calculation unit 104 calculates a model predicted error PE(n) using the following equation, notifies the extreme value detecting unit 105 of the calculated model predicted error PE(n) and stores the model predicted error in the storage unit 110 as error data 1101.

$$PE(n)=PV(n)-Y(n-d)$$

The extreme value detecting unit 105 detects a maximum value and a minimum value of the model predicted errors from changes in a plurality of continuous model predicted errors with respect to time calculated by the calculation unit 104 for every control period. In other words, the extreme value detecting unit 105 detects a maximum value and a minimum value of the model predicted error, for example, from a curve (or a straight line) representing changes in the model predicted error with respect to time that are notified from the calculation unit 104 for every control period. Then, the extreme value detecting unit 105 notifies the determination unit 106 of detected extreme values (a maximum value and a minimum value) together with detection times for every control period. The extreme value detecting unit 105 may store the detected extreme values in the storage unit 110 as extreme value data 1102 together with timings (detection times) at which the extreme values have occurred (S20).

When a plurality of extreme values are detected by the extreme value detecting unit 105 for each control period, the determination unit 106 calculates a difference between detection times (detection time difference) of the extreme values and determines the presence/absence of periodicity (S30). In a case in which the presence of periodicity of changes in the model predicted error with respect to time is determined by the determination unit 106 (Yes in S30), the correction amount calculating unit 107 calculates the prediction correction amount using a predicted error of a variation period before the current time (in the past) (i.e, the previous "predicted error variation period" of a certain "predicted error variation period"). Here, particularly, the correction amount calculating unit 107 calculates prediction correction amounts Cd(n) and CH(n) for correcting "a predicted value of the (future) amount of control predicted at the current time (i.e., a predicted value of the amount of control in the certain "predicted error variation period").

Then, the torque calculating unit 102 corrects the predicted value (the predicted value of the amount of control) using the prediction correction amounts Cd(n) and CH(n) calculated by the correction amount calculating unit 107 and calculates a torque using a predicted value after the correction (a post-correction predicted value) such that the amount of control conforms to the command value (command position). Here, particularly, the torque calculating unit 102 corrects "the predicted value of the amount of control in the certain predicted error variation period", i.e., "the predicted value at the current time" using the prediction correction amounts Cd(n) and CH(n). The torque calculating unit 102 calculates a torque using "the predicted value of the amount of control in the certain predicted error variation period" after the correction such that the amount of control conforms to the command value (command position). The torque calculating unit 102 calculates a torque required for the amount of control to follow the command value using the internal model. The torque command unit 103 outputs the torque calculated by the torque calculating unit 102 to the servo driver 20 as a command torque (an amount of operation) (S40).

On the other hand, in a case in which the absence of periodicity of changes in the model predicted error with respect to time is determined by the determination unit 106 (No in S30), the correction amount calculating unit 107 does not calculate prediction correction amounts Cd(n) and CH(n) used for correcting the predicted value. Then, the torque calculating unit 102 calculates a torque using the internal model using the predicted value (the predicted value of the amount of control) that has not been corrected such that the amount of control conforms to the command value (command position). The torque command unit 103 outputs the torque calculated by the torque calculating unit 102 to the servo driver 20 as a command torque (an amount of operation) (S50).

The process (control method) executed by the controller 10 that has been described with reference to FIG. 4 can be summarized as below. The process (control method) executed by the controller 10 is a method of controlling a model predictive control device that predicts an amount of control of the control target 30 corresponding to a command value generated from a target track for each control period using a model of the control target 30 (and the servo driver 20). The control method includes: a determination step (S30) of determining presence/absence of periodicity of changes in a model predicted error, which is an error between an actually-measured value of the amount of control of the control target 30 and the predicted value of the amount of control predicted using the model, with respect to time; and a predicted value correcting step (S40) of correcting a predicted value of the amount of control predicted using the model in a certain predicted error variation period using the model predicted error in the predicted error variation period previous to the certain predicted error variation period wherein a predicted error variation period is a period of changes in the model predicted error with respect to time in a case in which the presence of the periodicity of changes in the model predicted error with respect to time is determined in the determination step described above.

According to the control method described above, in the predicted value correcting step, in a case in which the presence of the periodicity of changes in the model predicted error with respect to time is determined, a predicted value of the amount of control predicted using the model in the certain predicted error variation period is corrected using the model predicted error in the predicted error variation period previous to the certain predicted error variation period.

In addition, in the predicted value correcting step (S40), "a predicted value of the amount of control predicted using the model in the certain predicted error variation period" that is corrected using the model predicted error in the predicted error variation period previous to the certain predicted error variation period may be rephrased as "a predicted value at a current time".

Accordingly, the control method described above has an effect of ability to correct the predicted value in the certain predicted error variation period using the model predicted error in the predicted error variation period previous to the certain predicted error variation period in a case in which the predicted value of the amount of control in the certain predicted error variation period is disturbed by an external disturbance having periodicity. The control method described above has an effect of ability to apply external disturbance compensation to a wide range of machines and devices in a simpler manner without requiring a model of the external disturbance.

(Method of Determining Periodicity—Detection and Storage of Extreme Value of Predicted Error)

Figure 5:
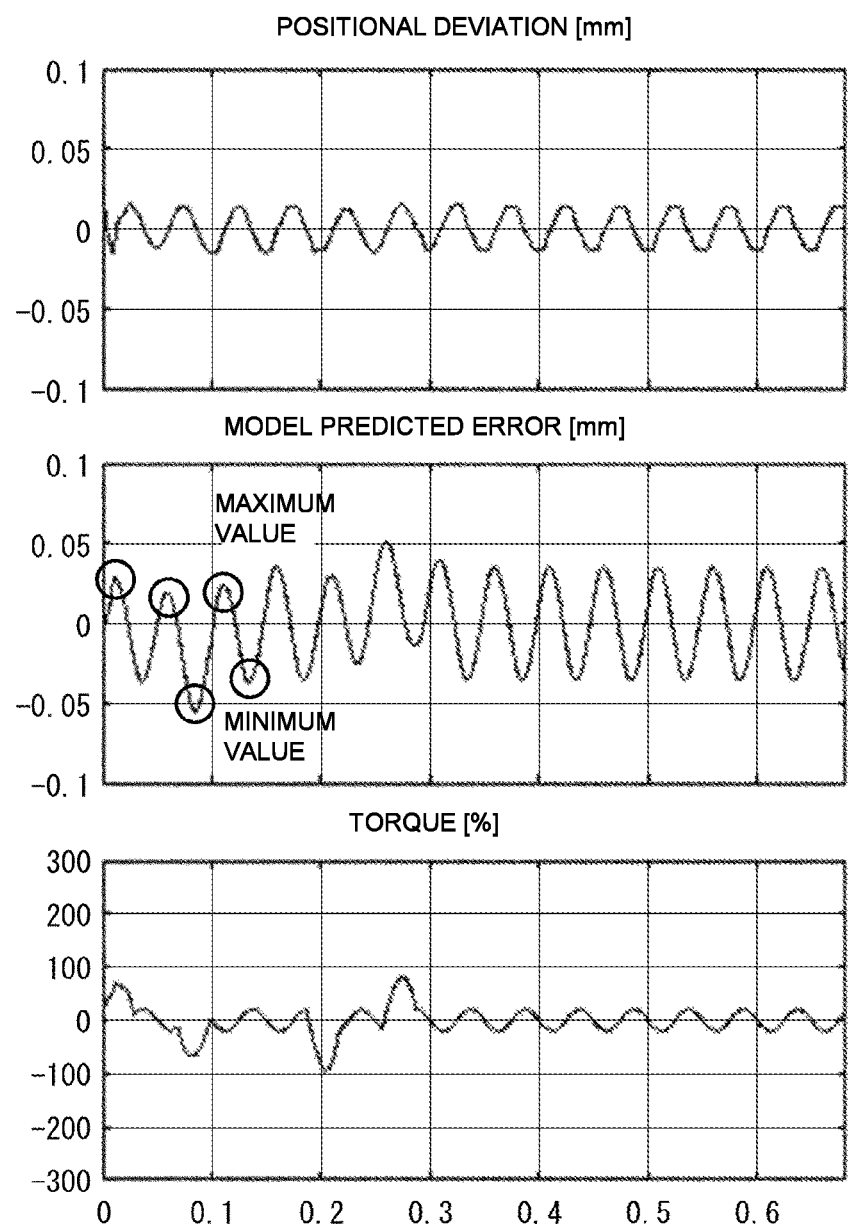
FIG. 5 is a diagram illustrating a method of determining the presence/absence of periodicity of changes in a model predicted error with respect to time that is used by the controller illustrated in FIG. 1.

FIG. 5 is a diagram illustrating a method of determining the presence/absence of periodicity of changes in a model predicted error with respect to time that is used by the controller 10. As described with reference to FIG. 4, the calculation unit 104 checks (calculates) a model predicted error for each control period and stores the calculated model predicted error in the storage unit 110 as error data 1101. Then, the extreme value detecting unit 105 detects a maximum value and a minimum value of the model predicted error from changes in the model predicted error with respect to time in which model predicted errors calculated by the calculation unit 104 are aligned in a time series.

Here, a "model predicted error" illustrated in a middle stage of FIG. 5 illustrates a curve (straight line) in which model predicted errors (stored in the storage unit 110 as error data 1101) calculated by the calculation unit 104 are aligned in a time series. In the following description, "a curve (straight line) in which model predicted errors are aligned in a time series" may be also referred to as a "predicted error variation waveform".

The extreme value detecting unit 105 sequentially determines maximum values and minimum values enclosed by circles from the curve of the "model predicted error" (predicted error variation waveform) illustrated in the middle stage of FIG. 5. Then, the extreme value detecting unit 105, as information of determined extreme values, stores "a P(j): j-th extreme value" and "Ptime(j): appearance time (detection time) of the j-th extreme value" in the storage unit 110 as extreme value data 1102.

The extreme value detecting unit 105 alternately determines a maximum value and a minimum value in the curve of the "model predicted error" (predicted error variation waveform) illustrated in the middle stage of FIG. 5. Here, in a case in which maximum values and minimum values of a total number of four or more are determined by the extreme value detecting unit 105, the presence/absence of periodicity is determined using the following points. In a case in which an extreme value determined last by the extreme value detecting unit 105 satisfies the following condition as P(k), the determination unit 106 determines the presence of periodicity of changes in the model predicted error with respect to time.

$$|\{P\text{time}(k)-P\text{time}(k-2)\}-\{P\text{time}(k-1)-P\text{time}(k-3))\}|/|P\text{time}(k-1)-P\text{time}(k-3)|<EPS1 \quad [\text{Math. 10}]$$

Here, EPS1 may be set in advance in the range of "0" to "1". For example, "EPS1=0.2" or the like is set. As the value of EPS1 is set to a value closer to "1", "the determination of the presence/absence of periodicity relating to changes in the model predicted error with respect to time" using the determination unit 106 becomes looser. In addition, a user may be allowed to set EPS1 in the range of "0" to "1".

In other words, in the controller 10, the determination unit 106 determines presence/absence of periodicity of changes in the model predicted error with respect to time on the basis of a difference between an interval of times at which a plurality of maximum values are detected by the extreme value detecting unit 105 and an interval of times at which a plurality of minimum values are detected by the extreme value detecting unit 105.

According to the configuration described above, the determination unit 106 determines the presence/absence of periodicity of changes in the model predicted error with respect to time on the basis of a difference between an interval of times at which a plurality of maximum values are detected by the extreme value detecting unit 105 and an interval of times at which a plurality of minimum values are detected by the extreme value detecting unit 105.

Accordingly, the controller 10 determines the presence/absence of periodicity of changes in the model predicted error with respect to time on the basis of the difference between the interval of times at which the plurality of maximum values are detected and the interval of times at which the plurality of minimum values are detected and has an effect of ability to correct a predicted value of the amount of control predicted using the model in a certain predicted error variation period using the model predicted error of the predicted error variation period previous to the certain predicted error variation period in a case in which the presence of periodicity is determined.

For example, in a case in which the difference between the interval of times at which the plurality of maximum values are detected by the extreme value detecting unit 105 and the interval of times at which the plurality of minimum values are detected by the extreme value detecting unit 105 is smaller than a predetermined value (EPS1 described above), the determination unit 106 determines that periodicity of changes in the model predicted error with respect to time is present.

Accordingly, the controller 10 determines that periodicity of changes in the model predicted error with respect to time is present in a case in which the difference between the interval of times at which the plurality of maximum values are detected and the interval of times at which the plurality of minimum values are detected is smaller than the predetermined value and has an advantage of being capable of correcting the predicted value of the amount of control predicted using the model in the certain predicted error variation period using the model predicted error in the model predicted error variation period previous to the certain predicted error variation period.

In addition, as described above, a user may be allowed to set EPS1 in the range of "0" to "1", and, as the value of EPS1 is set to a value closer to "1", "the determination of presence/absence of periodicity of changes in the model predicted error with respect to time" using the determination unit 106 becomes looser.

In addition, in the example described above, an example has been described in which the determination unit 106 divides [Math. 11]|{Ptime(k)-Ptime(k-2)}-{Ptime(k-1)-Ptime(k-3)}| by [Math. 12] |Ptime(k-1)-Ptime(k-3)| and determines the presence/absence of periodicity of changes in the model predicted error with respect to time.

However, it is not essential to break [Math. 13]|{Ptime(k)-Ptime(k-2)}-{Ptime(k-1)-Ptime(k-3)}| into [Math. 14]|Ptime(k-1)-Ptime(k-3)| for the determination unit 106 to determine the presence/absence of periodicity of changes in the model predicted error with respect to time.

The determination unit 106 may determine the presence/absence of periodicity of changes in the model predicted error with respect to time on the basis of a difference between an interval of times at which a plurality of maximum values are detected by the extreme value detecting unit 105 and an interval of times at which a plurality of minimum values are detected by the extreme value detecting unit 105. In other words, the determination unit 106 may determine that periodicity of changes in the model predicted error with respect to time is present in a case in which [Math. 15]|{Ptime(k)-Ptime(k-2)}-{Ptime(k-1)-Ptime(k-3)}| is smaller than EPS1 (in other words, is approximated to "0").

In addition, in the example described above, the extreme value detecting unit 105 detects two maximum values and two minimum values from the predicted error variation waveform (a curve in which model predicted errors are aligned in a time series), and the determination unit 106 determines the presence/absence of periodicity of changes in the model predicted error with respect to time on the basis of a difference between an interval of times at which the two maximum values have been detected and an interval of times at which the two minimum values have been detected.

However, the extreme value detecting unit 105 may detect three extreme values from the predicted error variation waveform, and the determination unit 106 may acquire each interval of times at which two extreme values adjacent to each other have been detected and determine the presence/absence of periodicity of changes in the model predicted error with respect to time on the basis of a difference between the first interval and the next interval. In other words, the determination unit 106 may determine the presence/absence of periodicity of changes in the model predicted error with respect to time on the basis of a difference between an interval (first interval) at which the first extreme value (for example, a maximum value) has been detected and a time at which the second extreme value (for example, a minimum value) has been detected and an interval (next interval) at which the second extreme value (for example, a minimum value) has been detected and a time at which the third extreme value (for example, a maximum value) has been detected.

In addition, in the detection of extreme values illustrated in FIG. 5, in order to prevent erroneous detection due to a measurement noise and to prevent erroneously detect a minute vibration in a stop state due to static friction, the extreme value detecting unit 105 may determine an extreme value only in a case in which a difference between a maximum value and a minimum value exceeds a certain threshold. In other words, in the controller 10, the extreme value detecting unit 105 detects only a maximum value and a minimum value between which a difference is larger than a predetermined value among maximum values and minimum values of the model predicted error in changes in a plurality of continuous model predicted errors with respect to time.

According to the configuration described above, the extreme value detecting unit 105 detects only a maximum value and a minimum value between which a difference is larger than a predetermined value among maximum values and minimum values of model predicted errors in changes in a plurality of the continuous model predicted errors with respect to time.

Here, the model predicted error described above is calculated as an error between an actually-measured value of the amount of control of the control target 30 and a predicted value of the amount of control predicted using the model by the calculation unit 104, and the actually-measured value may include a measurement noise. In addition, for example, a minute vibration in a stop state due to static friction may have an influence on the actually-measured value. In other words, the model predicted error calculated by the calculation unit 104 may be influenced by a measurement noise or the like included in the actually-measured value.

By detecting only a maximum value and a minimum value between which a difference is larger than a predetermined value among maximum values and minimum values of model predicted errors in changes in a plurality of the continuous model predicted errors with respect to time, the extreme value detecting unit 105 can prevent erroneous detection of a model predicted error influenced by a measurement noise or the like as an extreme value (a maximum value or a minimum value).

Accordingly, the controller 10 has an effect of ability to determine the presence/absence of periodicity of changes in the model predicted error with respect to time using detection times of extreme values detected with a high accuracy.

(Method of Correcting Predicted Value—Correcting a Prediction Using a Predicted Error of Previous Period)

Figure 6:
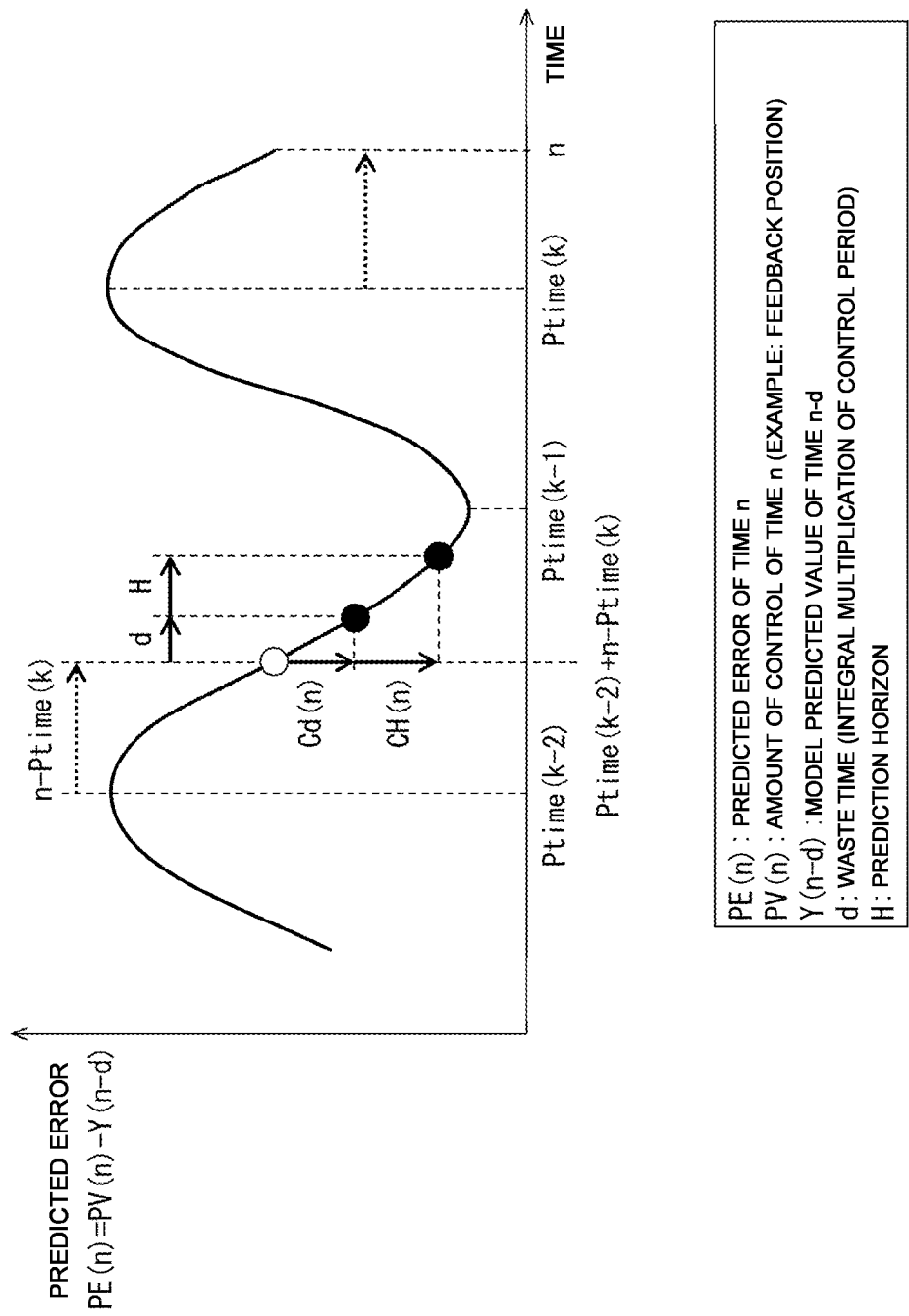
FIG. 6 is a diagram illustrating a method of correcting a predicted value that is used by the controller illustrated in FIG. 1.

FIG. 6 is a diagram illustrating a method of correcting a predicted value that is used by the controller 10. In a case in which the determination unit 106 determines the presence of periodicity of changes in the model predicted error with respect to time, the correction amount calculating unit 107 calculates a prediction correction amount using the method illustrated below.

The correction amount calculating unit 107, first, acquires an elapsed time |fn−Ptime(k)|, which is an elapsed time from a time at which an extreme value has been detected last to the current time, at a time point of a time n.

The correction amount calculating unit 107, next, acquires a time that is a time one period before the current time using the following equation and sets the time as a start point of the prediction.

$$P\text{time}(k-2)+n-P\text{time}(k)$$

Then, the correction amount calculating unit 107 acquires the amounts of changes in the predicted error in the dead time d section and the prediction horizon H section as prediction correction amounts Cd(n) and CH(n) from the time acquired using the equation represented above. In other words, the prediction correction amounts Cd(n) and CH(n) are acquired as below.

$$Cd(n)=PE(P\text{time}(k-2)+n-P\text{time}(k)+d)-PE(P\text{time}(k-2)+n-P\text{time}(k)),CH(n)=PE(P\text{time}(k-2)+n-P\text{time}(k)+d+H)-PE(P\text{time}(k-2)+n-P\text{time}(k)+d)$$ [Math. 16]

In addition, as described above, "PE(n)" represents "a predicted error at a time n", and the calculation unit 104 calculates a model predicted error PE(n) using the following equation and stores the calculated model predicted error PE(n) in the storage unit 110 as error data 1101.

$$PE(n)=PV(n)-Y(n-d)$$

(Verification of Effect of Compensation for External Disturbance)

The controller 10 determines the presence/absence of periodicity of changes in the model predicted error, which is an error between an actually-measured value of the amount of control of the control target 30 and a predicted value of the amount of control predicted using the model of the control target 30 (and the servo driver 20), with respect to time. Then, in a case in which the presence of periodicity of changes in the model predicted error with respect to time is determined, the controller 10 corrects a predicted value of the amount of control predicted using the model in a certain predicted error variation period using the model predicted error in the predicted error variation period previous to the certain predicted error variation period in a predicted error variation period. Hereinafter, effects of the external disturbance compensating process executed by the controller 10 will be described for each of a "simple (general) external disturbance" and a "complex external disturbance".

Here, the "simple (general) external disturbance", for example, represents an external disturbance of which a variation waveform (predicted error variation waveform) representing changes in the magnitude with respect to time as only one period. On the other hand, the "complex external disturbance", for example, represents an external disturbance of which a variation waveform (predicted error variation waveform) representing changes in the magnitude with respect to time has a plurality of periods.

(Compensation for Simple External Disturbance)

Figure 7:
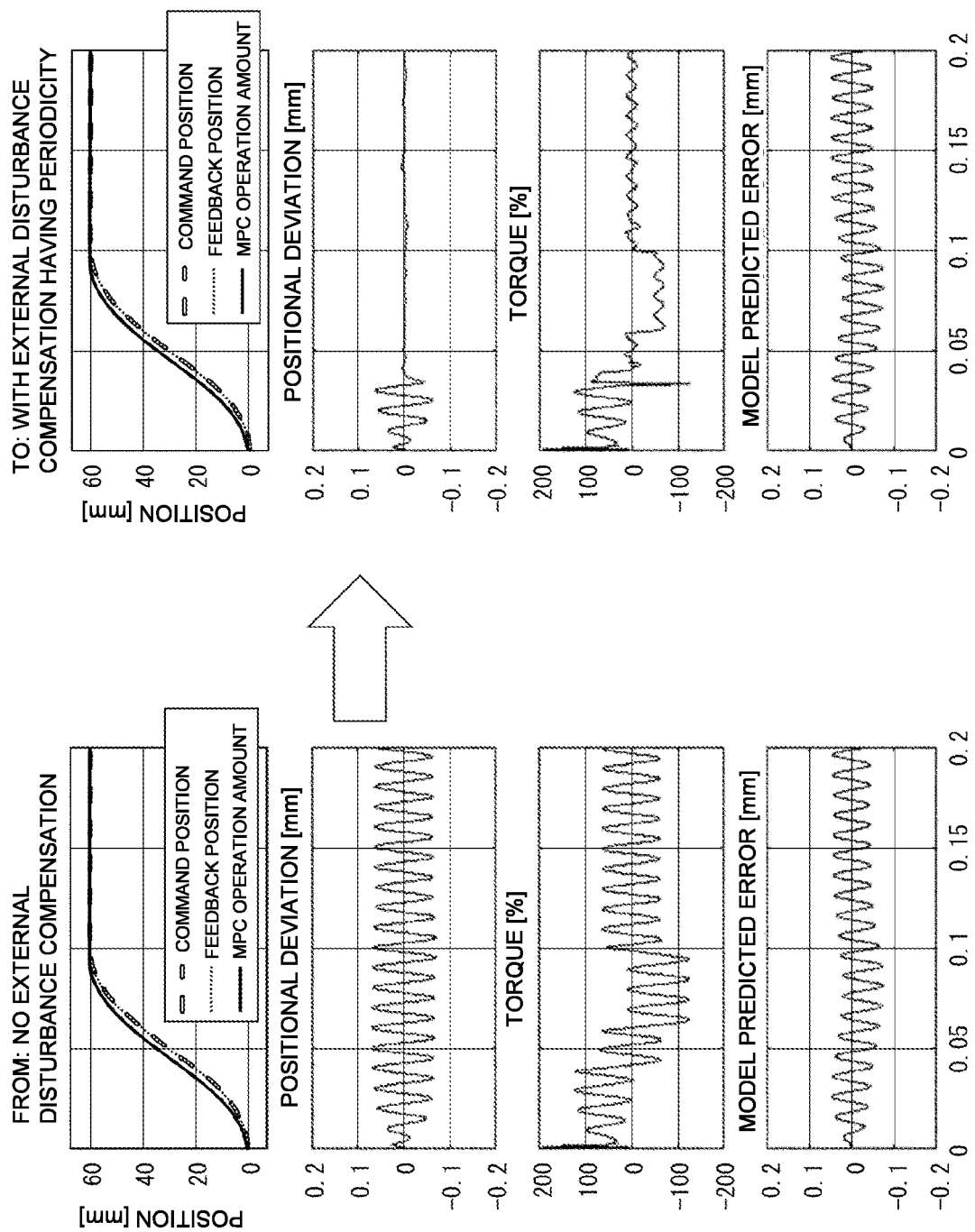
FIG. 7 is a diagram illustrating an effect acquired in a case in which the controller illustrated in FIG. 1 executes an external disturbance correcting process.

FIG. 7 is a diagram illustrating effects acquired in a case in which the controller 10 executes an external disturbance compensating process. In other words, the example illustrated in FIG. 7 is a diagram for illustrating effects of execution of an external disturbance compensating process using the controller 10 in a case in which "an external disturbance of a sinusoidal waveform having a maximum amplitude of 10% and a frequency of 100 Hz" is applied for control of target track data (target track) of "moving over 60 mm in 100 ms and stopping thereafter for 100 ms".

As illustrated in FIG. 7, the controller 10 executes a periodical external disturbance compensating function at about a time 40 ms, and a positional deviation after the time 40 ms is suppressed to be small. In other words, after the time 40 ms, the influence on the control of the external disturbance is suppressed. For example, a positional deviation after the time 40 ms, different from a positional deviation before the time 40 ms, transitions to almost "0". In addition, a torque after the time 40 ms has a change that is gentler than a torque before the time 40 ms, and thus, a severe change as that before the time 40 ms disappears. In other words, in a case in which the presence of periodicity in an external disturbance is determined, in a period of the external disturbance (in other words, a predicted error variation period), the controller 10 corrects the predicted value of the amount of control at the current time using the model predicted error calculated before the current time (in the past), thereby suppressing the influence of the external disturbance on the control.

Here, in the method of determining the periodicity of an external disturbance using at least one of a positional deviation and a vibration waveform of a position, in a case in which compensation for an external disturbance starts to operate, the periodicity cannot be correctly determined. The reason for this is that an external disturbance is compensated through the external disturbance compensation, in other words, a positional deviation and a vibration waveform of the position are deformed by the external disturbance compensation, and accordingly, the external disturbance (the periodicity of the external disturbance) cannot be correctly perceived.

In contrast to this, in the controller 10, also while the vibration of a positional deviation is suppressed by the controller 10 through external disturbance compensation, a vibration waveform of the external disturbance remains in a predicted error. Accordingly, the controller 10 can continuously compensate the external disturbance. The controller 10 determines the periodicity of an external disturbance using the predicted error, and accordingly, also after the execution of the external disturbance compensation, a vibration waveform of the external disturbance can be detected in the predicted error. Therefore, the controller 10 has an effect of ability to correctly determine the periodicity of an external disturbance.

(Compensation for Complex External Disturbance)

In the example illustrated in FIG. 7, the controller 10 compensates a "simple (general) external disturbance" of which the predicted error variation waveform has only one period. In contrast to this, in order to compensate a "complex external disturbance" of which the predicted error variation waveform has a plurality of periods, the controller 10 can correctly perceive a predicted error variation period that is a period of changes in the model predicted error with respect to time by using a period lower limit (value). Hereinafter, description will be presented with reference to FIGS. 8 and 9.

Figure 8:
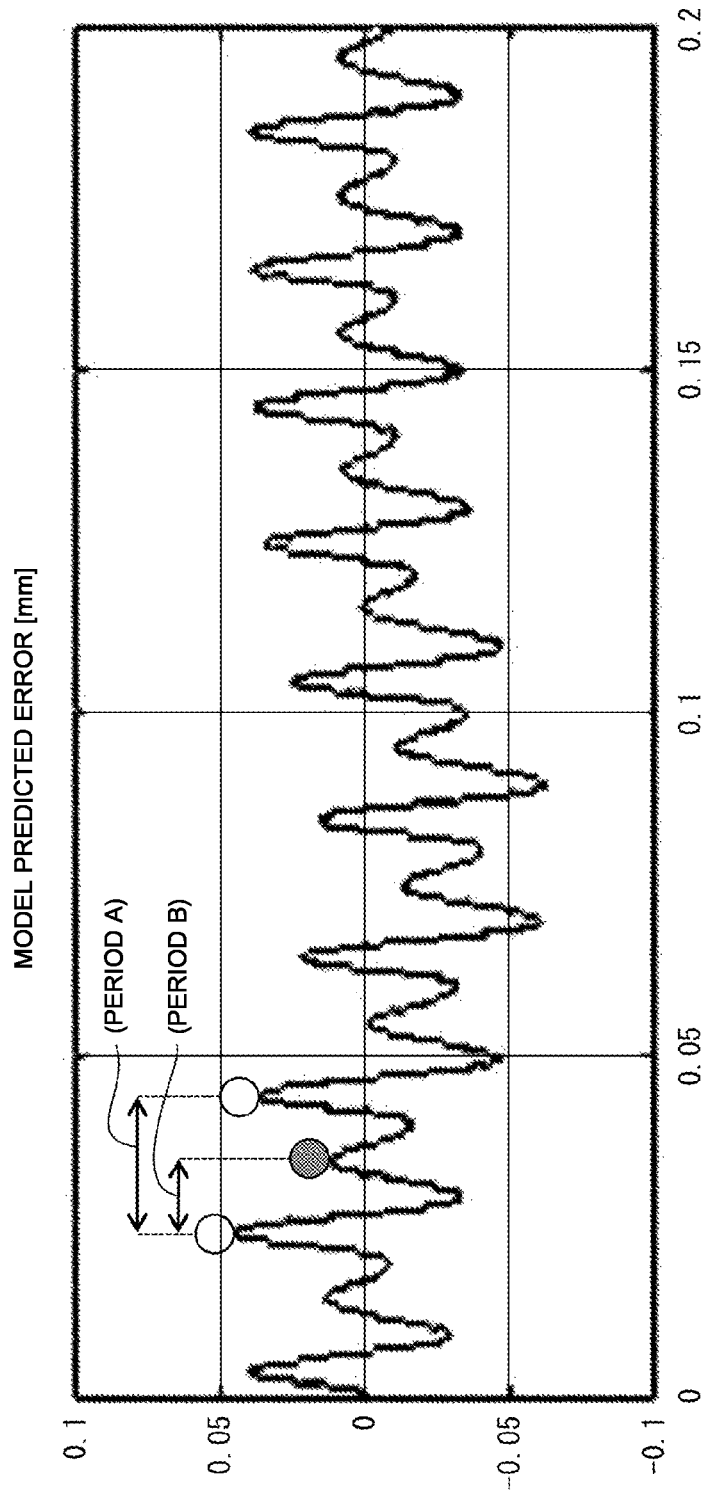
FIG. 8 is a diagram illustrating a complex external disturbance for which the controller illustrated in FIG. 1 determines the presence/absence of periodicity of model predicted error using a period lower limit value.

FIG. 8 is a diagram illustrating a "complex external disturbance" for which the controller 10 determines the presence/absence of periodicity of model predicted errors using a period lower limit value. While the variation waveform (predicted error variation waveform) of the "simple (general) external disturbance" illustrated in FIG. 7 has a single period, the variation waveform (predicted error variation waveform) of the "complex external disturbance" illustrated in FIG. 8 as an example has a plurality of periods.

In the example illustrated in FIG. 8, a period (A) is desired to be perceived, and a period (B) needs to be ignored. Thus, by setting a time that is longer than the period (B) and is shorter than the period (A) as a period lower limit value, in the controller 10, the determination unit 106 can ignore the period (B). For example, when at least one of a maximum value and a minimum value in changes in the model predicted error with respect to time is determined from the predicted error variation waveform, the extreme value detecting unit 105 does not regard a value having a time difference from a maximum value (minimum value) that has been determined immediately before is less than the period lower limit as a minimum value (maximum value). In other words, the period lower limit value is set, and, when a difference between detection times of maximum values (minimum values) is shorter than the period lower limit value, the extreme value detecting unit 105 does the determine the extreme value (in other words, does not regard it as a maximum value (minimum value). The extreme value detecting unit 105 (1) detects a plurality of maximum values such that an interval between detection times of the plurality of maximum values is longer than the period lower limit value and (2) detects a plurality of minimum values such that an interval between detection times of the plurality of minimum values is longer than the period lower limit value.

The determination unit 106 determines the presence/absence of periodicity of changes in the model predicted error with respect to time using a plurality of maximum values (minimum values) of which a difference between detection times is equal to or greater than the period lower limit value (more accurately, using an interval between detection times of a plurality of maximum values (minimum values)).

In addition, instead of improving the accuracy of extreme values to be detected (determined) by the extreme value detecting unit 105 using the period lower limit value, the accuracy of determination of the presence/absence of periodicity of changes in the model predicted error with respect to time may be improved by the determination unit 106 using the period lower limit value. In other words, the determination unit 106 may (1) use intervals longer than the period lower limit value among intervals between detection times of a plurality of maximum values that have been detected by the extreme value detecting unit 105 as intervals between times at which the maximum values have been detected used when the presence/absence of periodicity is determined and (2) use intervals longer than the period lower limit value among intervals between detection times of a plurality of minimum values that have been detected by the extreme value detecting unit 105 as intervals between times at which the minimum values have been detected used when the presence/absence of periodicity is determined.

At least one of the determination unit 106 and the extreme value detecting unit 105 uses the period lower limit value, and accordingly, the determination unit 106 determines the presence/absence of periodicity of changes in the model predicted error with respect to time not for the period (B) but for the period (A) in the predicted error variation waveform illustrated in FIG. 8. Then, in a case in which the presence of periodicity of changes in the model predicted error with respect to time is determined by the determination unit 106, the correction amount calculating unit 107 calculates prediction correction amounts Cd(n) and CH(n) using the model predicted error in the predicted error variation period previous to a certain predicted error variation period in the predicted error variation period (in other words, the period (A)) that is a period of changes in the model predicted error with respect to time. Particularly, the correction amount calculating unit 107 calculates prediction correction amounts Cd(n) and CH(n) for correcting "a predicted value of the amount of control predicted using the model in the certain predicted error variation period".

Next, effects acquired in a case in which the controller 10, as described above, compensates the "complex external disturbance" of which the predicted error variation waveform has a plurality of periods using the period lower limit value will be described with reference to FIG. 9.

Figure 9:
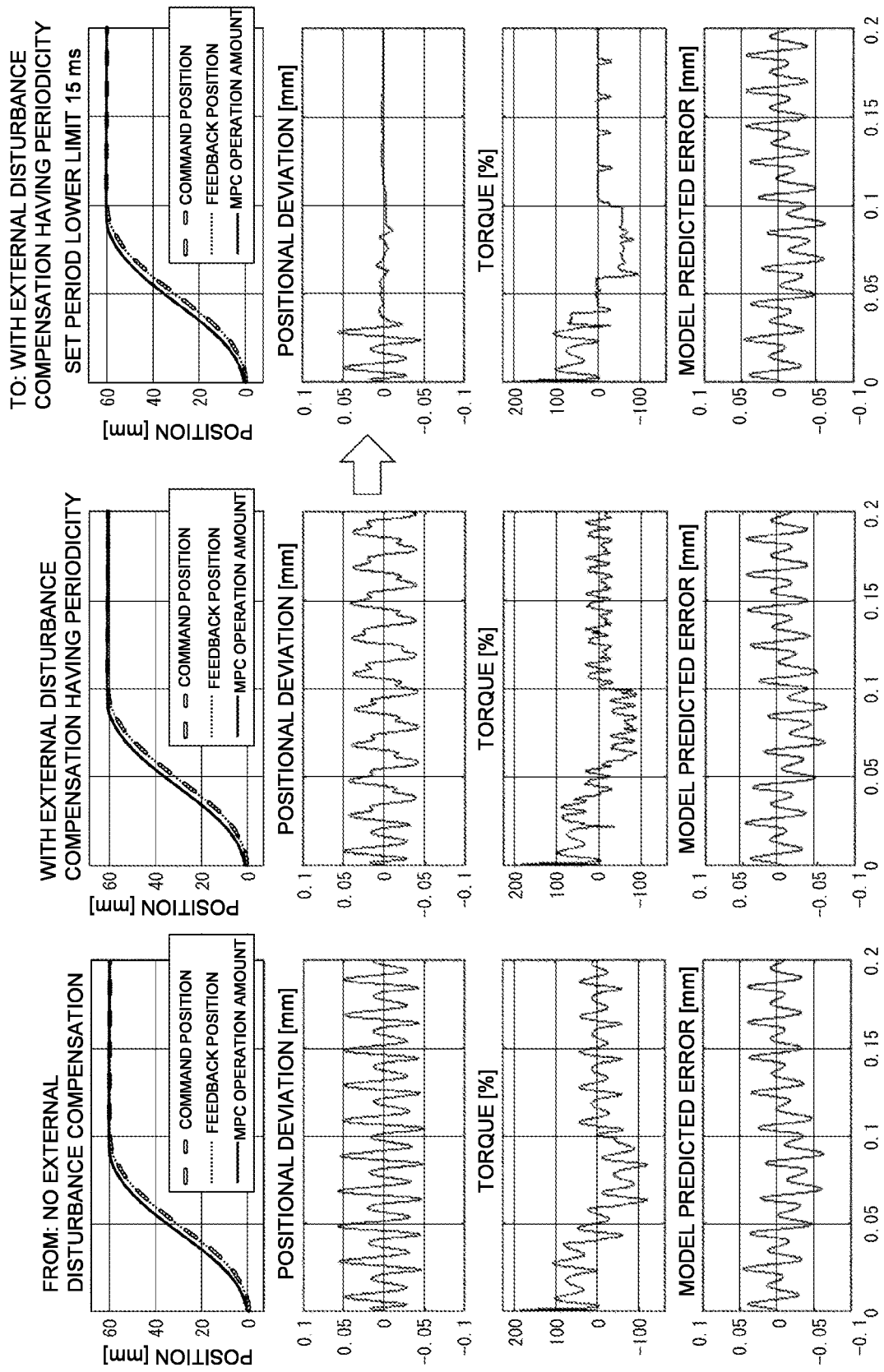
FIG. 9 is a diagram illustrating effects acquired in a case in which the controller illustrated in FIG. 1 executes an external disturbance compensating process using a period lower limit value.

FIG. 9 is a diagram illustrating effects acquired in a case in which the controller 10 executes an external disturbance compensating process using a period lower limit value. In other words, the example illustrated in FIG. 9 is a diagram for illustrating effects of execution of an external disturbance compensating process using the controller 10 in a case in which "a complex external disturbance" appearing as a predicted error variation waveform having a plurality of periods is applied for control of target track data (target track) of "moving over 60 mm in 100 ms and stopping thereafter for 100 ms".

In the case illustrated in FIG. 9 as an example, the process executed by the controller 10 is different from that of the case illustrated in FIG. 7 in that the period lower limit value is used. In other words, in the case illustrated in FIG. 9, the controller 10 (the extreme value detecting unit 105) executes a process acquired by only adding a process of "not determining an extreme value at a time less than the period lower limit value" to the process executed in the case illustrated in FIG. 7.

In the model predicted error illustrated in the lowest stage in FIG. 9, the predicted error variation waveform has a plurality of periods. As described with reference to FIG. 8, in a case in which a predicted error variation waveform has a plurality of periods, only the longest period needs to be detected.

In the controller 10, the extreme value detecting unit 105 improves the accuracy of extreme values to be detected (determined) using the period lower limit value. In other words, the controller 10 sets a lower limit value of a period (period lower limit value) in advance and ignores a period less than this lower limit value, thereby being able to detect predicted error variations having the longest period.

In a middle column of FIG. 9, tracks of a positional deviation, a torque, and the like in a case in which the controller 10 executes general external disturbance compensation (in other words, an external disturbance compensating process "not using the period lower limit value") for a "complex external disturbance" of which the predicted error variation waveform has a plurality of periods are illustrated.

As described with reference to FIG. 8, for a "complex external disturbance" of which the predicted error variation waveform has a plurality of periods, it is difficult to correctly determine periodicity of changes in the model predicted error with respect to time, and it is difficult to correctly calculate a period of the changes in the model predicted error with respect to time.

Accordingly, the tracks of the positional deviation, the torque, and the like in a case in which an external disturbance compensating process "not using a period lower limit value" is executed for a "complex external disturbance" by the controller 10, as illustrated in the middle column in FIG. 9, are similar to tracks of a positional deviation, a torque, and the like (tracks of a positional deviation, a torque, and the like illustrated in a left column in FIG. 9) in a case in which an external disturbance compensating process is not executed. In other words, in a case in which "the period lower limit value is not used", the controller 10 cannot suppress disturbances of control due to the "complex external disturbance" and, for example, cannot suppress positional deviation variations.

In contrast to this, as illustrated in a right column in FIG. 9, by executing an external disturbance compensating process using a period lower limit value for a "complex external disturbance" of which the predicted error variation waveform has a plurality of periods, the controller 10 can satisfactorily suppress positional deviation variations. In addition, changes in the torque can be cased to be gentle.

In other words, by using a period lower limit value, the controller 10 correctly determines the presence/absence of periodicity of changes with respect to time for a "complex external disturbance" of which the predicted error variation waveform has a plurality of periods and can correctly calculate a period of changes in the "complex external disturbance" with respect to time (in other words, a period of changes in the model predicted error with respect to time). Then, in a case in which the presence of periodicity of the external disturbance is determined, the controller 10 corrects a predicted value of the amount of control at the current time using a model predicted error calculated before the current time (in the past) for the period of the external disturbance (in other words, a predicted error variation period), thereby suppressing the influence of the external disturbance on the control.

In other words, in the controller 10, the extreme value detecting unit 105 (1) detects a plurality of maximum values such that an interval between detection times of the plurality of maximum values is longer than a predetermined period and (2) detects a plurality of minimum values such that an interval between detection times of the plurality of minimum values is longer than a predetermined period.

According to the configuration described above, the extreme value detecting unit 105 detects a plurality of maximum values (minimum values) such that an interval between detection times of the plurality of maximum values (minimum values) is longer than the predetermined period. In other words, when a difference (interval) between detection times of maximum values (minimum values) is shorter than the predetermined period, the extreme value detecting unit 105 does not determine the extreme value (in other words, does not regard it as a maximum value (minimum value)). The extreme value detecting unit 105, for example, may regard a mountain (valley) having a time difference from a maximum value (minimum value) that has been determined immediately before to be less than the period lower limit value as not a maximum value (minimum value).

Here, for example, in a case in which a curve representing changes in the model predicted error with respect to time is a curve in which a curve having a short period is included in a curve having a long period, a period to be used when the periodicity of changes in the model predicted error with respect to time is determined is the period of the curve having the long period.

Accordingly, the controller 10 uses intervals between the times at which the plurality of extreme values (maximum values or minimum values) are detected, which are longer than the predetermined period (period lower limit value), when the presence/absence of periodicity is determined, and accordingly, there is an effect of ability to correctly determine presence/absence of the periodicity of changes in the model predicted error with respect to time.

(Improvement of Accuracy of Determination of Periodicity Using Period Lower Limit Value Designated by User)

In addition, the period lower limit value used by the determination unit 106 when the presence/absence of periodicity of changes in the model predicted error with respect to time is determined may be designated by a user. In other words, the acceptance unit 108 of the controller 10 accepts a user operation designating the period lower limit value. Then, the determination unit 106 (1), when a plurality of maximum values are detected by the extreme value detecting unit 105, uses intervals longer than the period lower limit value among intervals between detection times of the plurality of maximum values as intervals between times at which the maximum values are detected used when the presence/absence of periodicity is determined and (2), when a plurality of minimum values are detected by the extreme value detecting unit 105, uses intervals longer than the period lower limit value among intervals between detection times of the plurality of minimum values as intervals between times at which the minimum values are detected used when the presence/absence of periodicity is determined.

According to the configuration described above, the determination unit 106 (1) uses intervals longer than the period lower limit value among intervals between detection times of a plurality of maximum values detected by the extreme value detecting unit 105 as intervals between times, at which the maximum values are detected, used when the presence/absence of periodicity is determined and (2) uses intervals longer than the period lower limit value among intervals between detection times of a plurality of minimum values detected by the extreme value detecting unit 105 as intervals between times, at which the minimum values are detected, used when the presence/absence of periodicity is determined.

Here, for example, in a case in which a curve representing changes in the model predicted error with respect to time is a curve in which a curve having a short period is included in a curve having a long period, a period to be used when the periodicity of changes in the model predicted error with respect to time is determined is the period of the curve having the long period.

Accordingly, the controller 10 uses intervals between the times at which the plurality of extreme values (maximum values or minimum values) are detected, which are longer than the period lower limit value when the presence/absence of periodicity is determined, and accordingly, there is an effect of ability to correctly determine presence/absence of the periodicity of changes in the model predicted error with respect to time.

(One Example of Display Screen)

Figure 10:
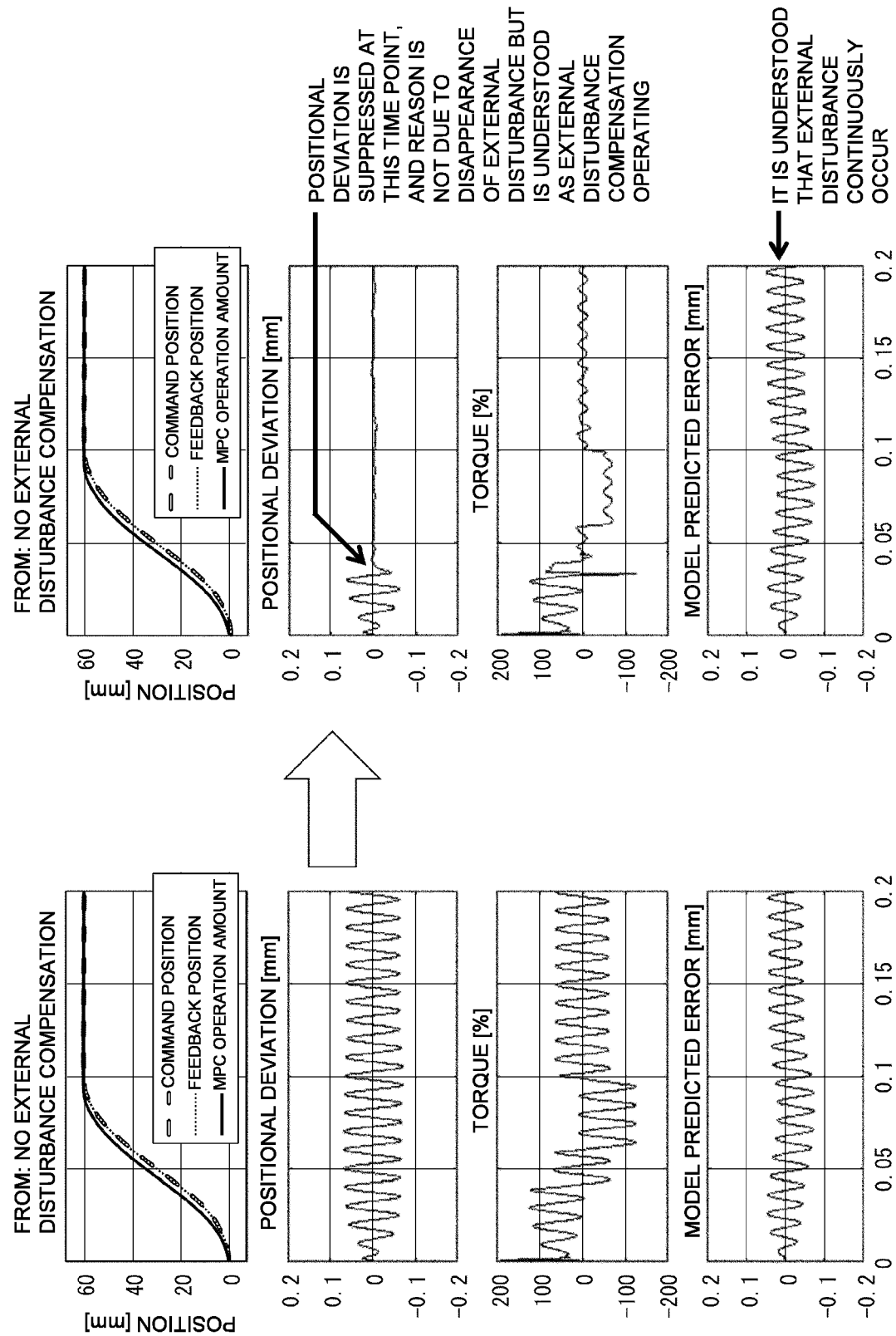
FIG. 10 is a diagram illustrating one example of a trend graph of a predicted error displayed by the controller illustrated in FIG. 1.

FIG. 10 is a diagram illustrating one example of a trend graph of predicted errors displayed by the controller 10. As illustrated in FIG. 10, the display control unit 109 of the controller 10 displays changes in the model predicted error (the error data 1101 that is calculated by the calculation unit 104 and is stored in the storage unit 110) with respect to time to a user.

According to the configuration described above, the display control unit 109 displays changes in the model predicted error with respect to time to a user. Accordingly, the controller 10 displays changes in the model predicted error with respect to time to a user, and thus, there is an effect that the user can perceive an approximated appearance of an external disturbance from a waveform represented in the changes in the model predicted error with respect to time (referred to a trend graph) that is displayed by the controller 10.

By displaying the trend graph of the predicted error (model predicted error) using the display control unit 109, a user can check a timing at which an external disturbance has occurred and changes in the external disturbance that has occurred. Particularly, in a case in which the external disturbance compensation effectively operates, it is difficult for a user to check an appearance of the occurrence of an external disturbance only using a disturbance of the control deviation (for example, a positional deviation). Since the display control unit 109 displays the trend graph of the predicted error, a user can easily check a time point (timing) at which an external disturbance has occurred and changes in the external disturbance with respect to time.

Figure 11A:
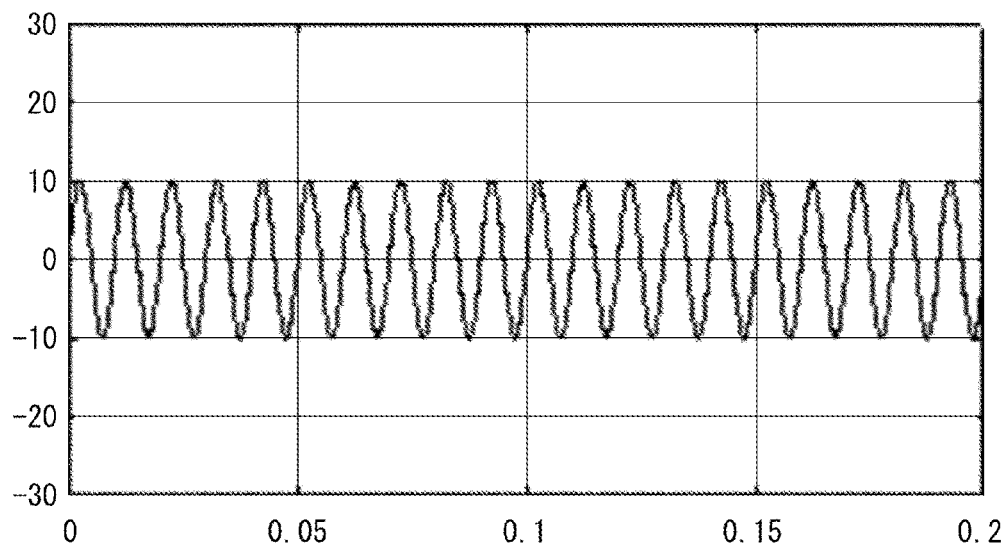
FIGS. 11(A) and 11(B) are diagrams illustrating waveforms of torque external disturbances compensated for by the controller illustrated in FIG. 1.
Figure 11B:
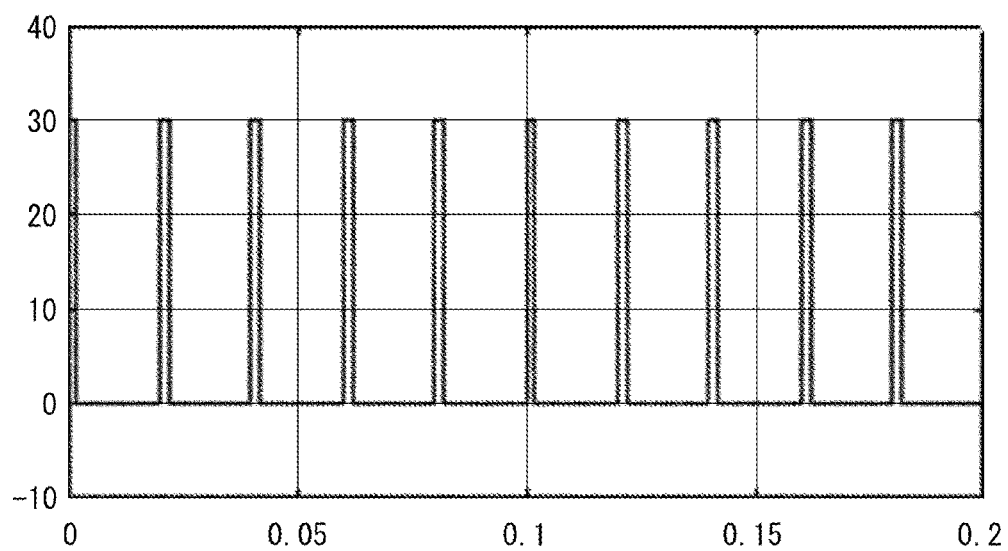

FIGS. 11(A) and 11(B) are diagrams illustrating waveforms of torque external disturbances compensated by the controller 10. FIG. 11(A) illustrates a waveform of a torque external disturbance (a "simple (general) external disturbance" represented in a predicted error variation waveform having a signal period) for which the controller 10 executes an external disturbance compensating process in the example illustrated in FIG. 7. FIG. 11(B) illustrates a waveform of a torque external disturbance (a "complex external disturbance" represented in a predicted error variation waveform having a plurality of periods) for which the controller 10 executes an external disturbance compensating process in the example illustrated in FIG. 9.

Embodiment 2

Another embodiment of the disclosure will be described with reference to FIGS. 12 and 13 as below. In order to secure simplicity of description, only a configuration (a sequence of a process and details of a process) different from that according to Embodiment 1 will be described. In other words, all the configurations and the like described in Embodiment 1 are also included in this embodiment. In addition, the definitions of the terms described in Embodiment 1 are the same.

(Overview of Control System)

Figure 13:
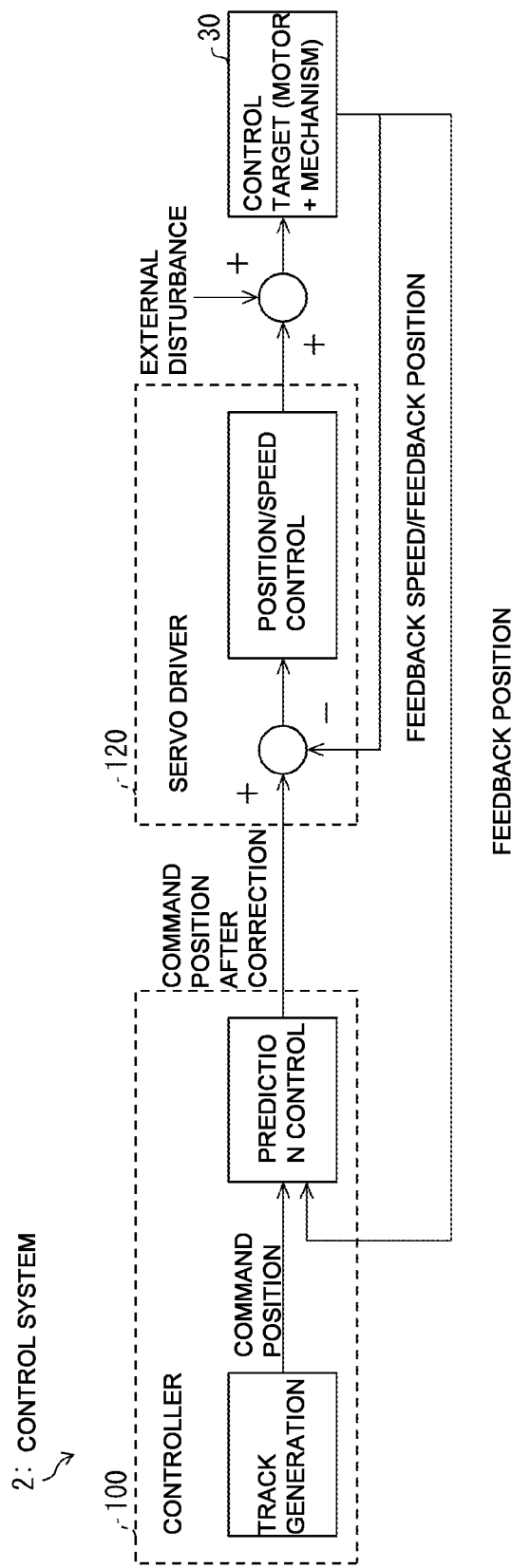
FIG. 13 is a diagram illustrating an overview of a control system including the controller illustrated in FIG. 12.

FIG. 13 is a diagram illustrating an overview of a control system 2 including the controller 100. In the control system 2, different from the control system 1 in which the controller 10 executes position/speed control and outputs a torque command value to the servo driver 20 in accordance with predictive control, the controller 100 corrects a command position for a servo driver 120 using predictive control, and the servo driver 120 executes position/speed control. In other words, while the controller 10 of the control system 1 outputs a torque command value to the servo driver 20, the controller 100 of the control system 2 outputs a command position to the servo driver 120.

The controller 100 is a controller that includes a model predictive control mechanism and outputs a command position to the servo driver 120 as an amount of operation. The controller 100, for example, accepts target track data (target track) from the outside such as a user (track generation) and generates a command value (command position) from the accepted target track data for each control period. In addition, the controller 100 acquires "an amount of control (an actually-measured value of an amount of control) that is an output of a control target 30" from the control target 30 as feedback information. In other words, the controller 100 acquires a position output by the control target 30 as a feedback position.

The controller 100 includes a model of the control target 30 as an internal model and outputs a command position to the servo driver 120 as an amount of operation on the basis of a command position generated using the internal model and "a feedback position (an actually-measured value of the amount of control) that is an output of the control target 30" by using this internal model. The internal model used by the controller 100 is a model of the servo driver 120 and the control target 30. In the control system 2, the characteristics of the servo driver 120 cannot be ignored, and thus, the model of only the control target 30 is insufficient, and the controller 100 requires the model of the servo driver 120 and the control target 30 as the internal model.

The controller 100 predicts an amount of control (feedback position) output by the control target 30 using the internal model, estimates a predicted error, and performs external disturbance compensation, in other words, corrects the predicted amount of control (predicted value) using a model predicted error stored in advance (a model predicted error in the previous predicted error variation period). Then, the controller 100 calculates a command position (an amount of operation) after the correction to be output to the servo driver 120 using a prediction correction value (a predicted value after correction) that is a predicted value corrected using the model predicted error.

The servo driver 120 executes position/speed control of the control target 30. In other words, the servo driver 120 acquires a command position (a command position after correction) from the controller 100. In addition, the servo driver 120 acquires "an amount of control (an actually-measured amount of control) that is an output of the control target 30" from the control target 30 as feedback information. In other words, the servo driver 120 acquires a speed and a position (at least one of the speed and the position) output by the control target 30 as a feedback speed and a feedback position (at least one of the feedback speed and the feedback position).

The servo driver 120 executes position/speed control for the control target 30 using the command position (a command position after correction) acquired from the controller 100 and at least one of the feedback speed and the feedback position acquired from the control target 30.

(Overview of Controller)

Next, a configuration, details of the process, and the like of the controller 100 included in the control system 2 of which the overview has been described with reference to FIG. 13 until now will be described with reference to FIG. 12. Before details are described with reference to FIG. 12, for easy understanding of the controller 100, an overview thereof will be described as below.

The controller 100 includes a command value correcting unit 112 and a position command unit 113. The command value correcting unit 112 acquires prediction correction amounts (more specifically, prediction correction amounts Cd(n) and CH(n)) from the correction amount calculating unit 107. The command value correcting unit 112 corrects "a predicted value of the amount of control in a certain predicted error variation period", in other words, "a predicted value at the current time" using the acquired prediction correction amounts. The command value correcting unit 112 calculates a position command (a position command after correction) using the predicted value after correction (post-correction predicted value) such that the amount of control conforms to the command value (command position). The command value correcting unit 112 notifies the position command unit 113 of the calculated command position after correction as an amount of operation.

The position command unit 113 outputs the command value after correction that is the command value calculated by the command value correcting unit 112 to the servo driver 120 (a control system performing motion control of the control target 30) as a command value relating to position control of the control target 30.

According to the configuration described above, the command value correcting unit 112 corrects a predicted value (a predicted value of the amount of control) using the prediction correction amounts calculated by the correction amount calculating unit 107 and calculates a position command (a position command after correction) using the predicted value after correction such that the amount of control conforms to the command value (command position).

Accordingly, the controller 100 has an effect of ability to output the command value corrected such that the amount of control of the control target 30 conforms to the command value to the servo driver 120 without executing an arithmetic operation for converting a change in the amount of control according to the external disturbance into an amount of operation.

(Details of Controller)

Next, details of the configuration of the controller 100 of which the overview has been described above will be described with reference to FIG. 12.

Figure 12:
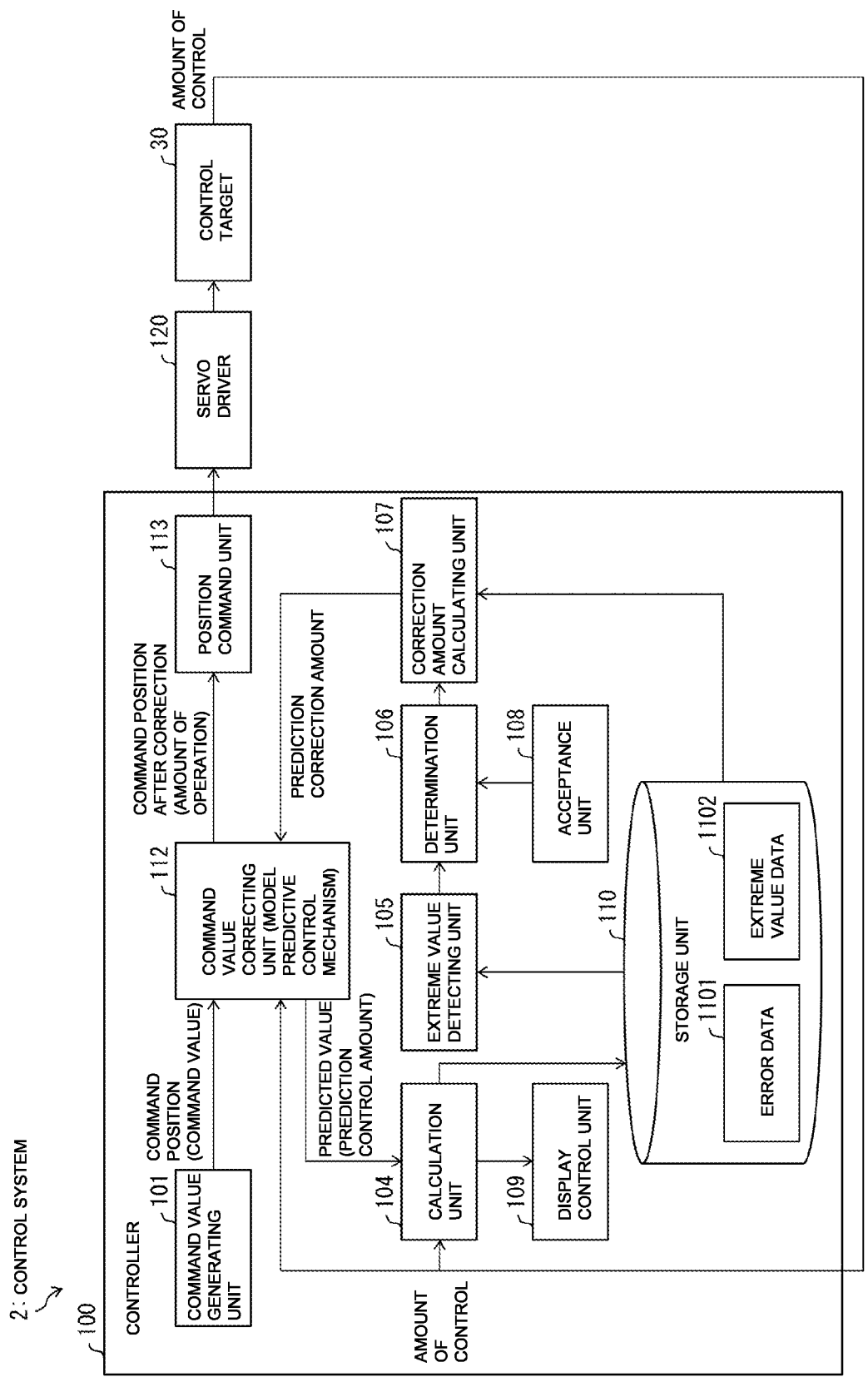
FIG. 12 is a block diagram illustrating the configuration of a main part of a controller according to Embodiment 2 of the disclosure.

FIG. 12 is a block diagram illustrating the configuration of a main part of the controller 100 according to Embodiment 2 of the disclosure. The controller 100 illustrated in FIG. 12 includes the command value correcting unit 112 and the position command unit 113 instead of the torque calculating unit 102 and torque command unit 103 of the controller 10 illustrated in FIG. 1. The configuration of the controller 100 other than the torque calculating unit 102 and the torque command unit 103 is similar to the configuration of the controller 10 other than the torque calculating unit 102 and the torque command unit 103 of the controller, and detailed description thereof will not be presented.

The command value correcting unit 112 executes model predictive control and, more specifically, predicts a state in the future using an internal model of control targets (in other words the servo driver 120 and the control target 30), and determines an amount of operation (command position) such that an output of the control target 30 in the future (a predicted value of the amount of control) is as close as possible to a target value (a command value, in other words, a command position). In other words, the command value correcting unit 112 predicts a change in the output (the amount of control) in the future on the basis of the internal model and determines an input (an amount of operation, in other words, a command position) such that the output and the target value are as close as possible to each other.

The command value correcting unit 112 includes the internal model acquired by modelling the behavior of a control target (in other words, the control target 30) and predicts an amount of control output by the control target 30 in each control period using the internal model. In other words, the command value correcting unit 112 calculates a predicted value (a predicted value of the amount of control) in each control period using the internal model. The command value correcting unit 112 notifies the calculation unit 104 of the calculated predicted value (a predicted amount of control).

In addition, the command value correcting unit 112 acquires prediction correction amounts (more specifically, prediction correction amounts Cd(n) and CH(n)) from the correction amount calculating unit 107. The command value correcting unit 112 corrects "a predicted value of the amount of control in a certain predicted error variation period" using the acquired prediction correction amounts and calculates a position command (a position command after correction) using the predicted value after the correction such that the amount of control conforms to a command value (command position). The command value correcting unit 112 notifies the position command unit 113 of the calculated command position after correction as an amount of operation.

The position command unit 113 outputs a command position after the correction (the amount of operation) notified from the command value correcting unit 112 to the servo driver 20 (a control system performing motion control of the control target 30) as a command value relating to the position/speed of the control target 30.

Embodiment 3

Embodiment 3 of the disclosure will be described with reference to FIGS. 15 to 24 as below. In order to secure simplicity of description, only a configuration (a sequence of a process and details of a process) different from those according to Embodiment 1 and Embodiment 2 will be described. In other words, all the configurations and the like described in Embodiment 1 and Embodiment 2 are also included in this embodiment. In addition, the definitions of the terms described in Embodiment 1 and Embodiment 2 are basically the same.

The controller 10 and the controller 100 described in Embodiment 1 and Embodiment 2 until now suppress a disturbance of the amount of control due to an external disturbance having periodicity. More specifically, each of the controller 10 and the controller 100 predicts an amount of control of the control target 30 corresponding to a command value using the model (the model of the control target 30 or the model of the servo driver 120 and the control target 30), in other words, calculates a predicted value of the amount of control. Here, each of the controller 10 and the controller 100 determines presence/absence of periodicity of changes in the predicted error (model predicted error) PE, which is an error between an actually-measure value of the amount of control of the control target 30 and the predicted value of the amount of control, with respect to time. Then, in a case in which the presence of periodicity of changes in the predicted error PE with respect to time is determined, each of the controller 10 and the controller 100 further executes the following process. Each of the controller 10 and the controller 100 corrects a predicted value of the amount of control in a certain error variation period using the predicted error PE in the predicted error variation period previous to the certain predicted error variation period in the predicted error variation period that is a period of changes in the predicted error PE with respect to time.

Here, each of the controller 10 and the controller 100 assumes that the amplitude of a waveform representing changes in the predicted error PE with respect to time is constant and corrects a predicted value of the amount of control in the certain error variation period using the predicted error PE of the previous period. For this reason, in the correction of a predicted value of the amount of control using each of the controller 10 and the controller 100, the following situation may occur.

In a case in which the amplitude of a waveform representing the predicted error PE that changes periodically is not constant with respect to time, the magnitude of the predicted error PE in the certain predicted error variation period does not coincide with the magnitude of a predicted error PE in the previous period (the error variation period previous to the certain error variation period). For this reason, in a case in which the amplitude of a waveform representing "the predicted error PE that changes periodically" is not constant with respect to time, it is difficult for each of the controller 10 and the controller 100 to correctly correct a predicted value of the amount of control at the current time using the predicted error PE of the previous period. In the following description, a waveform represented by "the predicted error PE of which the magnitude changes periodically will be referred to as a "predicted error variation waveform".

Figure 14A:
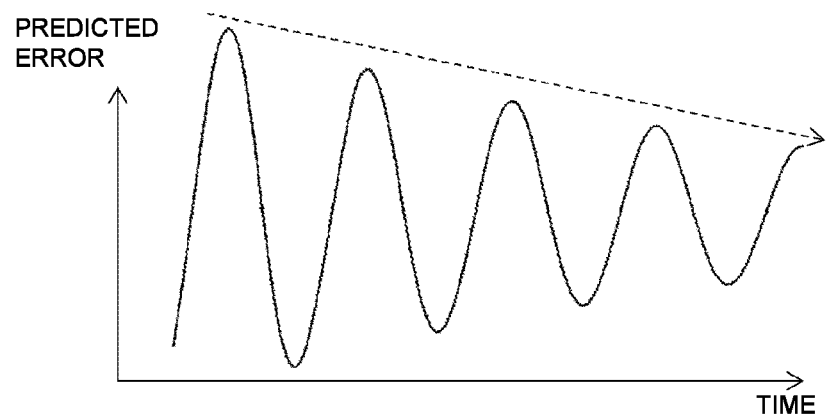
FIGS. 14(A) to 14(C) are diagrams illustrating examples of changes in a predicted error with respect to time that is assumed by controllers according to Embodiment 3 and Embodiment 4 of the disclosure.
Figure 14B:
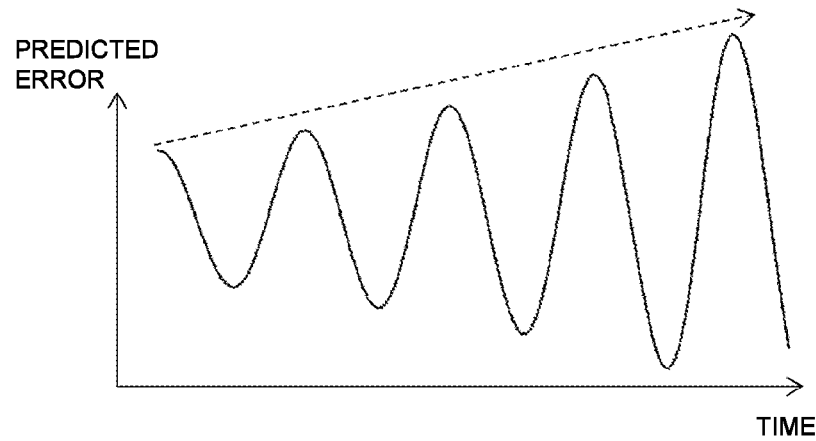
Figure 14C:
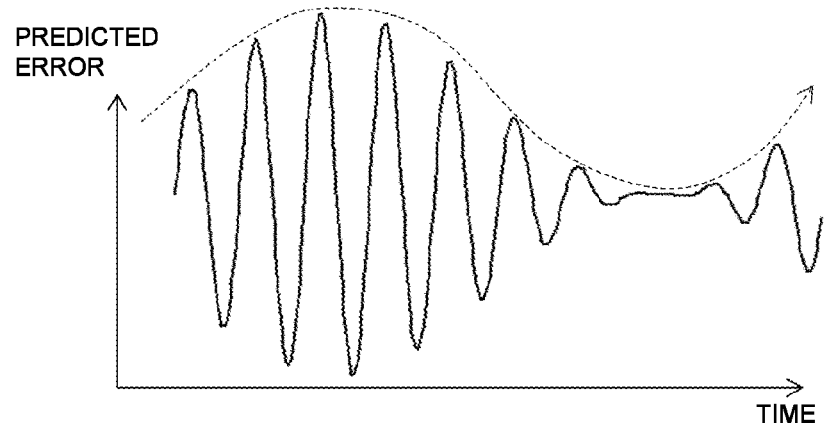

FIGS. 14(A) to 14(C) are diagrams illustrating examples in which the amplitude of a predicted error variation waveform is not constant with respect to a time. More specifically, FIG. 14(A) illustrates an example of a predicted error variation waveform of which the amplitude decreases with respect to time (horizontal axis), in other words, an example in which the amplitude of a predicted error variation waveform decreases as a time advances (an example in which the amplitude decreases at a constant rate). More specifically, FIG. 14(B) illustrates an example of a predicted error variation waveform of which the amplitude increases with respect to time, in other words, an example in which the amplitude of a predicted error variation waveform increases as a time advances (an example in which the amplitude increases at a constant rate). More specifically, FIG. 14(C) illustrates an example of a predicted error variation waveform of which the amplitude oscillates with respect to time, in other words, an example in which the amplitude of a predicted error variation waveform increases or decreases with respect to time. In the predicted error variation waveform illustrated in FIG. 14(C), the magnitude of a change in the amplitude of "a certain period (=a certain predicted error variation period) with respect to the amplitude of the period previous to the "certain period" (amplitude change rate) is not constant.

As illustrated in FIGS. 14(A) to 14(C), in a case in which the amplitude of the predicted error variation waveform changes with respect to time, the magnitude of the predicted error PE of a certain predicted error variation period does not coincide with the magnitude of the predicted error PE of the previous period (=the predicted error variation period previous to the certain predicted error variation period). For this reason, in a case in which the amplitude of the predicted error variation waveform changes with respect to time, the compensation effect of each of the controller 10 and the controller 100 assuming that the magnitude of the predicted error PE of a certain error variation period and the predicted error PE of the previous period coincide with each other decreases.

§ 1. Application Example

Each of a controller 200 and a controller 300 according to Embodiment 3 and Embodiment 4 of the disclosure can correctly correct a predicted value of the amount of control at the current time using a predicted error PE of the previous period even in a case in which the amplitude of the predicted error variation waveform is not constant with respect to time. More specifically, each of the controller 200 and the controller 300 calculates an equation representing a change in the amplitude with respect to time in the predicted error variation waveform (a change in the latest amplitude from the amplitude of the previous period) and corrects a predicted value of the amount of control at the current time using this equation and the predicted error PE of the previous period.

For example, each of the controller 200 and the controller 300 calculates and stores a ratio between the latest amplitude and the amplitude of the previous period (i.e., an "amplitude change ratio") in the predicted error variation waveform. Then, each of the controller 200 and the controller 300 takes the amplitude change ratio into account when a predicted error PE in the future (i.e., a current predicted error PE) of the previous period is predicted from the predicted error PE of the previous period. Each of the controller 200 and the controller 300 correctly predict a current predicted error PE by taking the amplitude change ratio into account from the predicted error PE of the previous period even in a case in which the amplitude of the predicted error variation waveform changes with respect to time, whereby the compensation effect is maintained and can be improved.

In other words, each of the controller 200 and the controller 300 is a control device (model predictive control device) including a prediction mechanism and monitors whether there is periodicity in variations (=changes with respect to time) of the predicted error PE. In a case in which the periodicity in changes of the predicted error PE with respect to time is checked, each of the controller 200 and the controller 300 compensates a prediction of the current amount of control using the predicted error PE of the previous period. Here, each of the controller 200 and the controller 300 executes "compensation for a prediction of the current amount of control" using the predicted error PE of the previous period by taking "a change in the amplitude" of a waveform representing the predicted error PE that changes periodically (=predicted error variation waveform)

into account. A "change in the amplitude" taken into account by each of the controller 200 and the controller 300, for example, is "a ratio between a latest amplitude of the predicted error variation waveform and an amplitude of the previous period".

In this way, each of the controller 200 and the controller 300 can suppress a disturbance of the amount of control due to an external disturbance having periodicity and can correctly execute "compensation for a prediction of the current amount of control" even in a case in which the amplitude of the predicted error variation waveform changes with respect to time. For example, each of the controller 200 and the controller 300 can suppress attenuating vibrations of a target having low rigidity that occur by being triggered upon an instant external disturbance, in other words, maintains the control performance of a machine and accordingly can maintain the quality of manufactured products. The controller 200 and the controller 300 may be used under an environment in which vibrations received from other machines disposed in the vicinity and vibrations excited in accordance with acceleration/deceleration of a tool and a table are generated.

§ 2. Configuration Example (Overview of Configuration)

Each of the controller 10 and the controller 100 does not assume "a change in the amplitude" in a waveform representing changes in the predicted error PE, which is an error between an actually-measured value of an amount of control and a predicted value, with respect to time (=predicted error variation waveform)". For example, each of the controller 10 and the controller 100 does not assumed that the amplitude of the predicted error variation waveform increases or decreases in accordance with advancement of time.

In contrast to this, the controller 200 and the controller 300 to be described below with reference to FIG. 15 and the like execute "compensation for a prediction of the current amount of control" using the predicted error PE of the previous period by taking "a change in the amplitude in the predicted error variation waveform" into account. The controller 200 and the controller 300 can correctly predict the amount of control even when the amplitude of the predicted error variation waveform is not constant with respect to time by taking "a change in the amplitude of the predicted error variation waveform" into account.

Hereinafter, details of the controller 200 will be described with reference to FIG. 15. Before that, for easy understanding of the controller 200, an overview thereof will be described as below.

The controller 200 (model predictive control device) is a model predictive control device predicting an amount of control of the control target 30 corresponding to a command value generated for every control period from a target track using a model of the control target 30. The controller 200 includes: a determination unit 106 that determines presence/absence of periodicity of changes in a predicted error PE, which is an error between an actually-measured value of the amount of control of the control target 30 and a predicted value of the amount of control predicted using the model described above, with respect to time; a deriving unit 202 that derives an equation representing a change in the amplitude with respect to time in the waveform (=predicted error variation waveform) representing a change in the predicted error PE with respect to time (for example, an "amplitude change rate ACR" to be described later) in a case in which the presence of periodicity is determined by the determination unit 106; and a torque calculating unit 102 (predicted value correcting unit) that corrects a predicted value (a predicted value of the amount of control predicted using the model of the control target 30) in the current period using the equation derived by the deriving unit 202 and the predicted error PE of the period previous to the current period in the predicted error variation waveform.

According to the configuration described above, the controller 200 derives an equation representing a change in the amplitude with respect to time in a "predicted error variation waveform" that is a waveform representing a change in the predicted error PE with respect to time in a case in which the presence of periodicity of changes in the predicted error PE, which is an error between an actually-measured value of the amount of control and a predicted value, with respect to time is determined. Then, the controller 200 corrects the predicted value in the current period using the derived equation and the predicted error PE of the period previous to the current period in the predicted error variation waveform.

Accordingly, the controller 200 has an effect of ability to apply compensation for an external disturbance to a wide range of machines and devices in a simpler manner without requiring a model of the external disturbance. Particularly, the controller 200 has an effect of ability to accurately predict the amount of control of the control target 30 even when the amplitude of a waveform representing changes in the predicted error PE with respect to time is not constant in a case in which the predicted error PE changes periodically.

The controller 200 further includes a ratio calculating unit 201 that calculates an amplitude variation ratio (an "amplitude variation ratio ACR(k−j)" to be described later) for each period up to the period previous to the current period in the predicted error variation waveform. In the controller 200, the deriving unit 202 may derive an equation representing a change in the amplitude with respect to time in the predicted error variation waveform as a sum of values respectively acquired by multiplying amplitude variation ratios for periods up to the period previous to the current period, which are calculated by the ratio calculating unit 201, by coefficients ("$c_0, c_1, \ldots, c_j$" to be described later) for the periods.

According to the configuration described above, the controller 200 calculates "an amplitude variation ratio for each period" up to the period previous to the current period in the predicted error variation waveform. Then, the controller 200 derives an equation representing a change in the amplitude with respect to time in the predicted error variation waveform as a sum of values respectively acquired by multiplying the calculated "amplitude variation ratios for the periods" up to the period previous to the current period by "coefficients for the periods".

Accordingly, the controller 200 has an effect of ability to derive "an equation representing a change in the amplitude with respect to time in the predicted error variation waveform" using the "amplitude variation ratios for the periods" up to the period previous to the current period even in a case in which the amplitude variation ratio is not constant with respect to time. For example, even in a case in which the amplitude variation ratio increases or decreases in accordance with the advancement of time, the controller 200 derives the equation described above as a sum of values respectively acquired by multiplying the calculated "amplitude variation ratios for periods" up to the period previous to the current period by the coefficients for the periods". In addition, "the coefficients for the periods", for example, may be calculated using a least-squares method or the like.

In the controller 200, the ratio calculating unit 201 may calculate an amplitude variation ratio in a certain period using a ratio between (1) an absolute value of a difference between a first extreme value that is an extreme value in the certain period in the predicted error variation waveform and a second extreme value that is an extreme value a half period before the first extreme value in the predicted error variation waveform and (2) an absolute value of a difference between a third extreme value that is an extreme value one period before the first extreme value in the predicted error variation waveform and a fourth extreme value that is an extreme value a half period before the third extreme value in the predicted error variation waveform or an absolute value of a difference between the second extreme value and the third extreme value.

According to the configuration described above, the controller 200 calculates an "amplitude variation ratio in a certain period" in the predicted error variation waveform using a ratio between (1) an absolute value of a difference between a first extreme value that is an extreme value in the certain period and a second extreme value that is an extreme value a half period before the first extreme value in the predicted error variation waveform and (2) an absolute value of a difference between a third extreme value that is an extreme value one period before the first extreme value in the predicted error variation waveform and a fourth extreme value that is an extreme value a half period before the third extreme value in the predicted error variation waveform or an absolute value of a difference between the second extreme value and the third extreme value.

For example, the controller 200 calculates an "amplitude variation ratio in a certain period" in the predicted error variation waveform using a ratio between (1) an absolute value of a difference between a first extreme value that is an extreme value in the certain period and a second extreme value that is an extreme value a half period before the first extreme value in the predicted error variation waveform and (2-1) an absolute value of a difference between a third extreme value that is an extreme value one period before the first extreme value in the predicted error variation waveform and a fourth extreme value that is an extreme value a half period before the third extreme value in the predicted error variation waveform.

In addition, the controller 200 calculates an "amplitude variation ratio in a certain period" in the predicted error variation waveform as a square of a ratio between (1) an absolute value of a difference between a first extreme value that is an extreme value in the certain period and a second extreme value that is an extreme value a half period before the first extreme value in the predicted error variation waveform and (2-2) an absolute value of a difference between the second extreme value and the third extreme value.

Accordingly, the controller 200 has an effect of ability to easily calculate an amplitude variation ratio for each period of the predicted error variation waveform using extreme values of the predicted error variation waveform.

In the controller 200, the ratio calculating unit 201 may calculate a latest amplitude variation ratio as a ratio between (1) an absolute value of a difference between a latest extreme value in the predicted error variation waveform that has been determined until now and an extreme value a half period before the latest extreme value in the predicted error variation waveform and (2) an absolute value of a difference between an extreme value that is an extreme value one period before the latest extreme value in the predicted error variation waveform and an extreme value that is 1.5 period before the latest extreme value in the predicted error variation waveform or an absolute value of a difference between the extreme value that is an extreme value a half period before the latest extreme value in the predicted error variation waveform and the extreme value that is an extreme value one period before the latest extreme value in the predicted error variation waveform, and the deriving unit 202 may derive the latest amplitude variation ratio calculated by the ratio calculating unit 201 as an equation representing a change in the amplitude with respect to time in the predicted error variation waveform.

According to the configuration described above, the controller 200 calculates a ratio between (1) an absolute value of a difference between a latest extreme value in the predicted error variation waveform that has been determined until now and an extreme value that is an extreme value a half period before the latest extreme value in the predicted error variation waveform and (2) an absolute value of a difference between an extreme value that is an extreme value one period before the latest extreme value in the predicted error variation waveform and an extreme value that is a 1.5 period before the latest extreme value in the predicted error variation waveform or an absolute value of a difference between the extreme value that is an extreme value a half period before the latest extreme value in the predicted error variation waveform and the extreme value that is an extreme value one period before the latest extreme value in the predicted error variation waveform. Then, the controller 200 sets the calculated ratio as an equation representing a change in the amplitude with respect to time in the predicted error variation waveform.

Accordingly, in a case in which the amplitude variation ratio is not constant with respect to time, for example, in a case in which the amplitude of the predicted error variation waveform increases or decreases at a constant ratio in accordance with a time, the controller 200 has an effect of ability to easily derive an equation representing a change in the amplitude with respect to time.

(Details of Configuration)

Figure 15:
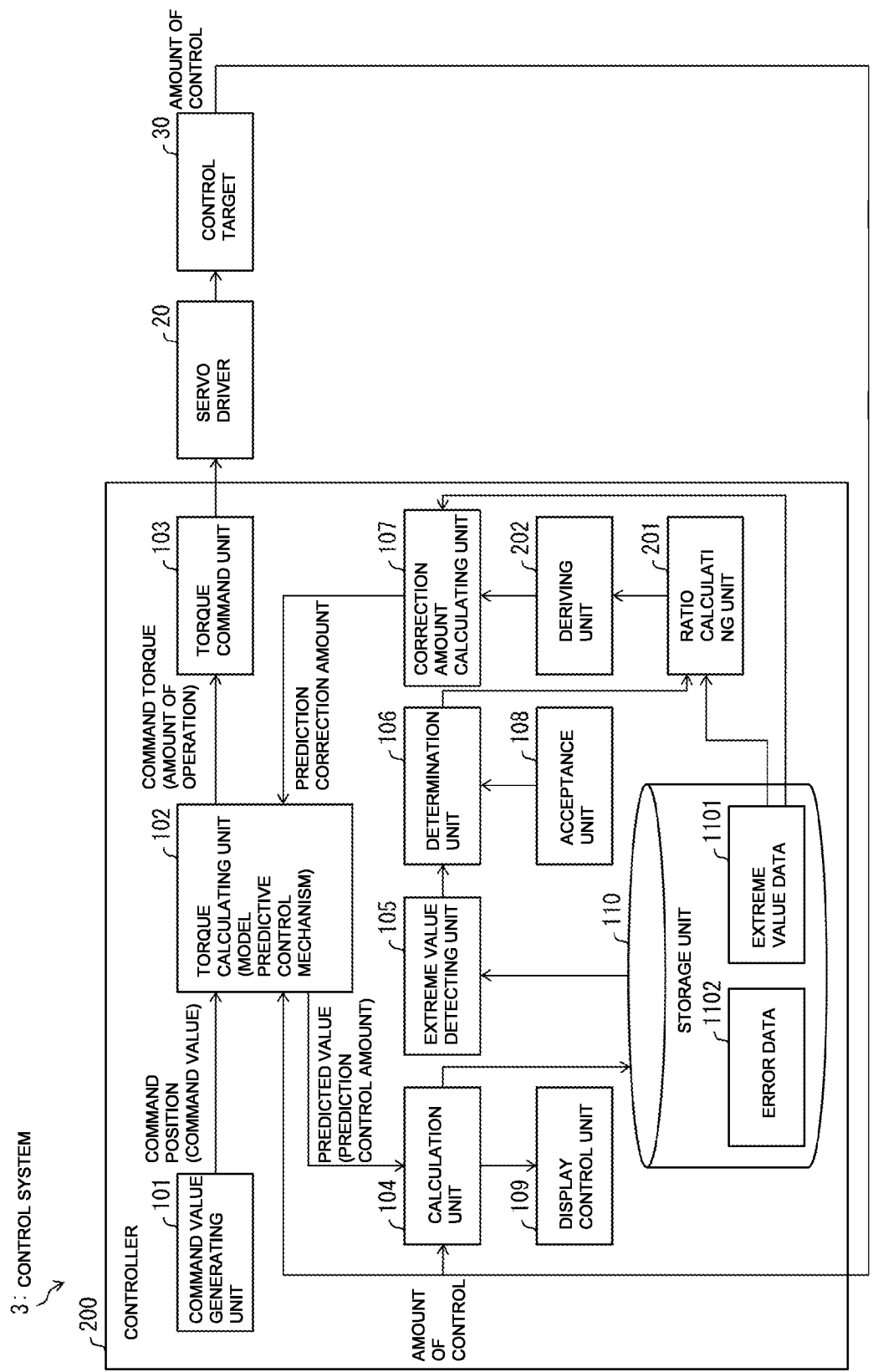
FIG. 15 is a block diagram illustrating the configuration of a main part of a controller according to Embodiment 3 of the disclosure.

FIG. 15 is a block diagram illustrating the configuration of a main part of the controller 200 according to Embodiment 3 of the disclosure. The controller 200 illustrated in FIG. 15 includes the ratio calculating unit 201 and the deriving unit 202 in addition to the components of the controller 10 illustrated in FIG. 1.

In a case in which the determination unit 106 determines the presence of periodicity of changes in the predicted error (model predicted error) PE with respect to time, the ratio calculating unit 201 calculates an "amplitude variation ratio for every predetermined period in a waveform representing changes in the predicted error PE with respect to time (=predicted error variation waveform)". For example, the ratio calculating unit 201 calculates an amplitude variation ratio for each period (=predicted error variation period) of the predicted error variation waveform. The ratio calculating unit 201 notifies the deriving unit 202 of the calculated "amplitude variation ratio for each predicted error variation period".

The deriving unit 202 derives "an equation representing changes in the amplitude with respect to time in the predicted error variation waveform" using the "amplitude variation ratio for each predetermined period (for example, for each predicted error variation period)" notified from the ratio calculating unit 201. The deriving unit 202 notifies the correction amount calculating unit 107 of "the equation representing changes in the amplitude with respect to time in the predicted error variation waveform" that has been derived.

The correction amount calculating unit 107 calculates a prediction correction amount using "the equation representing changes in the amplitude with respect to time in the predicted error variation waveform" that has been derived by the deriving unit 202 and the predicted error PE in the period previous to the current period (=predicted error variation period) in the predicted error variation waveform. Although details will be described later, the correction amount calculating unit 107 calculates amounts of changes in the predicted error PE in the dead time d section and the prediction horizon H section as prediction correction amounts Cd(n) and CH(n). Then, the correction amount calculating unit 107 notifies the torque calculating unit 102 of the calculated prediction correction amounts (more specifically, the prediction correction amounts Cd(n) and CH(n)).

(Rechecking Items)

In addition, as described above, the calculation unit 104 calculates a predicted error PE for each of a plurality of continuous control periods, and the extreme value detecting unit 105 detects maximum values and minimum values of the predicted error PE from changes in the plurality of continuous predicted errors PE with respect to time calculated by the calculation unit 104. The determination unit 106 determines the presence/absence of periodicity of changes in the predicted error PE with respect to time from times at which the maximum values and the minimum values have been detected by the extreme value detecting unit 105. The determination unit 106 determines presence/absence of periodicity of changes in the predicted error PE with respect to time on the basis of a difference between an interval of times at which a plurality of maximum values are detected by the extreme value detecting unit 105 and an interval of times at which a plurality of minimum values are detected by the extreme value detecting unit 105. For example, in a case in which the difference between the interval of times at which the plurality of maximum values are detected by the extreme value detecting unit 105 and the interval of times at which the plurality of minimum values are detected by the extreme value detecting unit 105 is smaller than a predetermined value (EPS1 described above), the determination unit 106 determines that periodicity of changes in the predicted error PE with respect to time is present.

In other words, the extreme value detecting unit 105 detects only "a maximum value and a minimum value" between which a difference is larger than a predetermined value among "maximum values and minimum values of the predicted error PE" in changes in a plurality of continuous predicted errors PE with respect to time. The extreme value detecting unit 105 takes a "difference between a maximum value and a minimum value" into account, and accordingly, in detection of extreme values, it can be prevented to erroneously detect extreme values due to a measurement noise, and it can be prevented to erroneously detect a minute vibration in a stop state caused by static friction as an extreme value.

In addition, the extreme value detecting unit 105 (1) detects a plurality of maximum values such that an interval between detection times of the plurality of maximum values is longer than a predetermined period and (2) detects a plurality of minimum values such that an interval between detection times of the plurality of minimum values is longer than a predetermined period. For example, the extreme value detecting unit 105 may regard a mountain (valley) having a time difference from a maximum value (minimum value) that has been determined immediately before to be less than a period lower limit value as not a maximum value (minimum value). Since intervals between times at which a plurality of extreme values (maximum values or minimum values) have been detected, which are longer than a predetermined period (period lower limit value), are used when the presence/absence of periodicity is determined, the controller 200 can correctly determine the presence/absence of periodicity of changes in the predicted error PE with respect to time. In addition, the period lower limit value used by the determination unit 106 when the presence/absence of periodicity of changes in the predicted error PE with respect to time is determined may be designated by a user.

In addition, the command value generating unit 101 accepts target track data (target track) from the outside (for example, a user) (track generation) and generates a command value (command position) from the accepted target track data for each control period. The torque calculating unit 102 executes model predictive control and determines an amount of operation such that a predicted value of the amount of control of the control target 30 is as close as possible to the target value (the command value; in other words, the command position). In other words, the torque calculating unit 102, first, calculates a predicted value (a predicted value of the amount of control) in each control period using the model and notifies the calculation unit 104 of the calculated predicted value (prediction amount of control). In addition, the torque calculating unit 102 acquires prediction correction amounts (more specifically, prediction correction amounts Cd(n) and CH(n)) from the correction amount calculating unit 107. The torque calculating unit 102 corrects a predicted value (a predicted value of the amount of control) using the acquired prediction correction amounts and calculates a torque using a predicted value after the correction (post-correction predicted value) such that the amount of control conforms to a command value (command position). The torque calculating unit 102 notifies the torque command unit 103 of the calculated torque as a command torque (an amount of operation). The torque command unit 103 outputs the torque calculated by the torque calculating unit 102 to the servo driver 20 as a command value relating to torque control of the control target 30. The acceptance unit 108 accepts a user operation designating a period lower limit value and notifies the determination unit 106 (and the extreme value detecting unit 105) of the period lower limit value designated by the user operation. The display control unit 109 displays changes in the predicted error PE (the error data 1101 calculated by the calculation unit 104 and stored in the storage unit 110) with respect to time for the user.

§ 3. Operation Example

Hereinafter, a process (particularly, an external disturbance compensating process) executed by the controller 200 will be described with reference to FIGS. 16 and 17. Before details are described with reference to FIGS. 16 and 17, for easy understanding of the process executed by the controller 200, an overview thereof will be described as below.

The process executed by the controller 200 is a method of controlling a model predictive control device that predicts an amount of control of the control target 30 corresponding to a command value generated for each control period from a target track using a model of the control target 30. The process executed by the controller 200 includes: a determination step of determining presence/absence of periodicity of changes in a predicted error PE, which is an error between an actually-measured value of the amount of control of the control target 30 and a predicted value of the amount of control predicted using the model, with respect to time; a deriving step of deriving an equation representing changes in an amplitude with respect to time in a waveform representing changes in the predicted error PE with respect to time (=predicted error variation waveform) in a case in which the presence of periodicity is determined in the determination step; and a predicted value correcting step of correcting the predicted value in a current period using the equation derived in the deriving step and the predicted error PE in a period previous to the current period in the predicted error variation waveform.

According to the configuration described above, in the control method, an equation representing changes in the amplitude with respect to time in the predicted error variation waveform is derived in a case in which the presence of periodicity of changes in the predicted error PE, which is an error between an actually-measured value of the amount of control and a predicted value, with respect to time is determined. Then, in the control method, the predicted value in a current period is corrected using the derived equation and the predicted error PE in the period previous to the current period in the predicted error variation waveform.

Therefore, according to the control method described above, there is an effect of ability to apply compensation for an external disturbance to a wide range of machines and devices in a simpler manner without requiring a model of the external disturbance. Particularly, according to the control method described above, there is an effect of ability to accurately predict the amount of control of the control target 30 even when the amplitude of a waveform representing changes in the predicted error PE with respect to time is not constant with respect to time in a case in which the predicted error PE changes periodically.

(Case in which Amplitude Change Rate is Constant)

Figure 16:
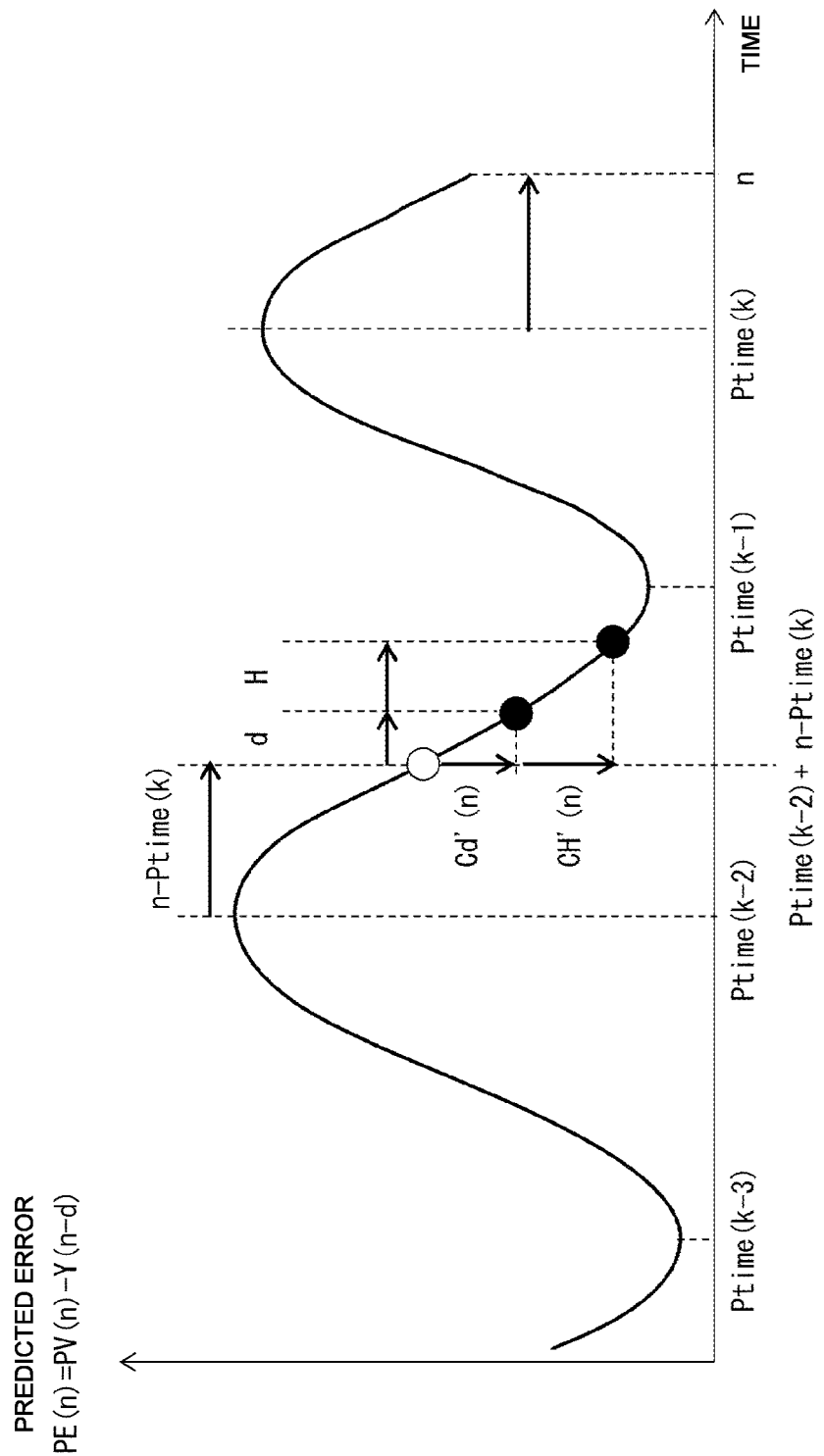
FIG. 16 is a diagram illustrating an overview of a process of correcting a predicted value of the amount of control that is executed by the controller illustrated in FIG. 15 for a predicted error variation waveform of which a rate of change in amplitude with respect to time is constant.

FIG. 16 is a diagram illustrating an overview of a process of "correcting a predicted value of the amount of control" (=external disturbance compensating process) that is executed by the controller 200 for a predicted error variation waveform of which an amplitude change rate with respect to time is constant. FIG. 16 illustrates "changes in the predicted error PE with respect to time" determined to have periodicity by the determination unit 106 and "changes in the predicted error PE with respect to time" in which the amplitude of the waveform (predicted error variation waveform) represented by "the predicted error PE of which the magnitude periodically changes" changes at a constant ratio with respect to time. For a predicted error variation waveform of which the amplitude change rate is constant with respect to time as illustrated in FIG. 16, the controller 200 executes the following process.

In other words, the correction amount calculating unit 107 calculates a prediction correction amount used for correcting the predicted value in the current period using the amplitude change rate calculated by the deriving unit 202 and the predicted error PE in the period previous to the current period (=predicted error variation period) in the predicted error variation waveform. Hereinafter, detailed description will be given.

The correction amount calculating unit 107, first, acquires an elapsed time "n−Ptime(k)" that is an elapsed time from the "extreme value time Ptime(k)" determined last to "the current time (=a time n)" at the time point of the time n. The correction amount calculating unit 107, next, acquires a time that is a time one period before the current time (the time point of the time n) using the following equation and sets the time as a start point of the prediction.

$$P\text{time}(k-2)+n-P\text{time}(k)$$

Then, the correction amount calculating unit 107 acquires the amounts of changes in the predicted error PE in the dead time d section and the prediction horizon H section as prediction correction amounts Cd(n) and CH(n) from the time acquired using the equation represented above (=a time one period before the time point of the time n).

$$Cd(n)=ACR\times\{PE(P\text{time}(k-2)+n-P\text{time}(k)+d)-PE(P\text{time}(k-2)+n-P\text{time}(k))\}CH(n)=ACR\times\{PE(P\text{time}(k-2)+n-P\text{time}(k)+d+H)-PE(P\text{time}(k-2)+n-P\text{time}(k)+d)\}$$ [Math. 17]

(hereinafter, this equation will be referred to as "Numerical equation P")

In other words, the following equations are acquired.

$$Cd'(n)=PE(P\text{time}(k-2)+n-P\text{time}(k)+d)-PE(P\text{time}(k-2)+n-P\text{time}(k))CH'(n)=PE(P\text{time}(k-2)+n-P\text{time}(k)+d+H)-PE(P\text{time}(k-2)+n-P\text{time}(k)+d)$$ [Math. 18]

(hereinafter, this equation will be referred to as "numerical equation Q").

Then, the prediction correction amounts Cd(n) and CH(n) of the numerical equation P are values acquired by multiplying Cd'(n) and CH'(n) of the numerical equation Q by an amplitude change rate ACR that is an equation representing changes in the amplitude with respect to time in the waveform (=predicted error variation waveform) representing changes in the predicted error PE with respect to time.

Here, the prediction correction amounts Cd(n) and CH(n) calculated respectively by the controller 10 and the controller 100 are the same as Cd'(n) and CH'(n) of the numerical equation Q. The controller 200 takes "changes in the amplitude with respect to time in the predicted error variation waveform" not considered by the controller 10 and the controller 100 into account and corrects a predicted value in the current period using the predicted error PE in the period previous to the current period in the predicted error variation waveform. More specifically, the correction amount calculating unit 107 of the controller 200 calculates the prediction correction amounts Cd(n) and CH(n) as values with Cd'(n) and CH'(n) of the numerical equation Q and the amplitude change rate ACR taken into account. For example, the correction amount calculating unit 107 of the controller 200 calculates the prediction correction amounts Cd(n) and CH(n) as values acquired by multiplying Cd'(n) and CH'(n) of the numerical equation Q by the amplitude change rate ACR.

The amplitude change rate ACR is calculated by the deriving unit 202. In other words, in a case in which the "presence of periodicity in changes in the predicted error PE with respect to time" is determined by the determination unit 106, the deriving unit 202 calculates an amplitude change rate ACR using the "amplitude variation ratio for each predicted error change period" calculated by the ratio calculating unit 201. The deriving unit 202 notifies the correction amount calculating unit 107 of the calculated amplitude change rate ACR. Here, in a case in which the amplitude change rate of the predicted error variation waveform is not constant with respect to time, the deriving unit 202 notifies the correction amount calculating unit 107 of the "latest amplitude variation ratio" calculated by the ratio calculating unit 201 as the amplitude change rate ACR. The amplitude change rate ACR (="a latest amplitude variation ratio" calculated by the ratio calculating unit 201) can be represented using the following equation.

$$ACR=|PE(P\text{time}(k))-PE(P\text{time}(k-1))|/|PE(P\text{time}(k-2))+PE(P\text{time}(k-3))|$$ [Math. 19]

(hereinafter, this equation will be referred to as a "numerical equation R").

(Case in which Amplitude Change Rate Change)

Figure 17:
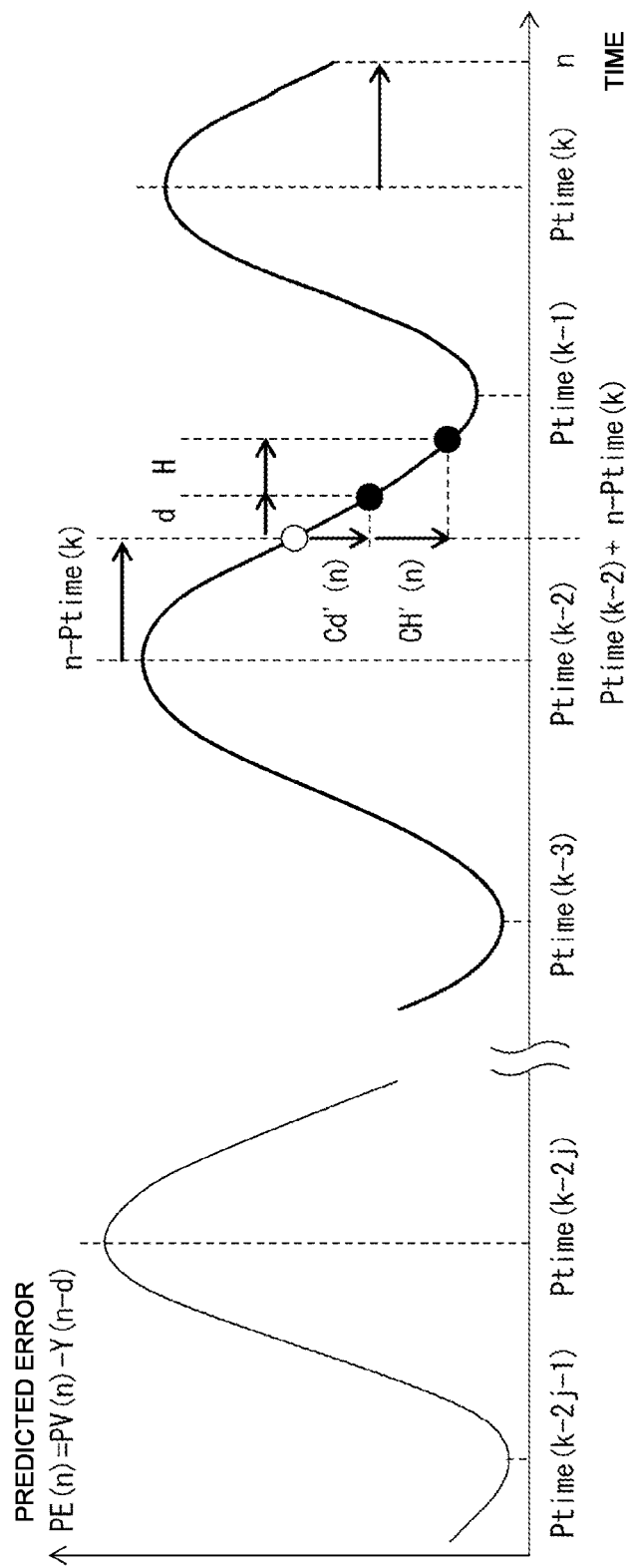
FIG. 17 is a diagram illustrating an overview of a process of correcting a predicted value of the amount of control that is executed by the controller illustrated in FIG. 15 for a predicted error variation waveform of which an amplitude change rate with respect to time is not constant.

FIG. 17 is a diagram illustrating an overview of a process of correcting a predicted value of the amount of control (=external disturbance compensating process) that is executed by the controller illustrated in FIG. 15 for a predicted error variation waveform of which an amplitude change rate with respect to time is not constant. FIG. 17 illustrates "changes in the predicted error PE with respect to time" of which periodicity is determined by the determination unit 106 and changes in the predicted error PE with respect to time in which the amplitude change rate of the waveform (predicted error variation waveform) represented by "predicted error PE of which magnitude changes periodically" is not constant with respect to time.

FIGS. 16 and 17 illustrate cases in which the amplitude of the predicted error variation waveform is not constant with respect to time, which is common. However, the amplitude change rate in the predicted error variation waveform illustrated in FIG. 16 is constant with respect to time, in other words, in the predicted error variation waveform illustrated in FIG. 16, the amplitude of the predicted error variation waveform changes at a constant rate (increases or decreases at a constant rate) in accordance with a time (=in accordance with advancement of time). In contrast to this, the amplitude change rate in the predicted error variation waveform illustrated in FIG. 17 is not constant with respect to time, in other words, the amplitude of the predicted error variation waveform in the predicted error variation waveform illustrated in FIG. 17 oscillates to increase or decrease in accordance with a time (=in accordance with advancement of time).

Although the amplitude change rate ACR of the numerical equation R assumes a case in which the "amplitude change rate of the waveform (predicted error variation waveform) represented by "changes in the predicted error PE with respect to time" determined to have periodicity by the determination unit 106 is constant with respect to time", the amplitude change rate is not necessarily constant with respect to time. Thus, in order to correct the predicted value in the current period using the predicted error PE of the previous period also for a predicted error variation waveform in which the amplitude change rate is not constant with respect to time as illustrated in FIG. 17, the controller 200 calculates an amplitude change rate ACR illustrated below.

The controller 200 assumes that the amplitude change rate of the predicted error variation waveform changes as illustrated in FIG. 17, and an amplitude change rate ACR in the numerical equation P is calculated from an amplitude change rate in the past. More specifically, the deriving unit 202 of the controller 200 calculates the amplitude change rate ACR in the numerical equation P as below with j=0, 1, 2, . . . .

$$ACR=c_0 ACR(k)+c_1 ACR(k-1)+ \ldots +c_j ACR(k-j) \quad \text{[Math. 20]}$$

(hereinafter, this equation will be referred to as a "numerical equation S")

$$ACR(k-j)=|PE(Ptime(k-2j))-PE(Ptime(k-2j-1))|/|PE(Ptime(k-2(j+1)))+PE(Ptime(k-2(j+1)-1))| \quad \text{[Math. 21]}$$

(hereinafter, this equation will be referred to as a "numerical equation T")

ACR(k−j) that is an amplitude variation ratio for each predicted error variation period is calculated by the ratio calculating unit 201, and the ratio calculating unit 201 notifies the deriving unit 202 of "ACR(k−j) that is an amplitude variation ratio for each predicted error variation period" calculated by the ratio calculating unit 201. The deriving unit 202 derives the "amplitude change rate ACR in the numerical equation P" as a sum of values acquired by multiplying "ACR(k−j) that is the amplitude variation ratio for each predicted error variation period" calculated by the ratio calculating unit 201 by coefficients $c_0, c_1, \ldots, c_j$ for periods.

Here, in a case in which the amplitude change rate of the predicted error change waveform changes periodically, the deriving unit 202 determines an appropriate j and may determine the coefficients $c_0, c_1, \ldots, c_j$ using a least-squares method or the like. In other words, as represented in the numerical equation P, the deriving unit 202 may calculate an amplitude change rate ACR as a sum of values respectively acquired by multiplying the amplitude variation ratios (ACR(k−j)) for periods by the coefficients $c_0, c_1, \ldots, c_j$ for the periods.

Here, as the simplest method considering variations in the amplitude change rate, the following equation may be used by using only $c_0$ and $c_1$ and assuming that a times the amount of change in the amplitude change rate from a time that is two times before to the previous time is the amount of change in the amplitude change rate from the previous time to the current time. In other words, the deriving unit 202 may assume that a times the amount of change from the amplitude change rate (ACR(k−1)) of a period that is two periods before the current period (=predicted error variation period) to the amplitude change rate (ACR(k)) of the period previous to the current period is the amount of change from the amplitude change rate (ACR(k)) of the period previous to the current period to the amplitude change rate ACR of this time (=current period). In such a case, the amplitude change rate ACR can be represented as below.

$$ACR=ACR(k)+\alpha \times \{ACR(k)-ACR(k-1)\}=(1+\alpha) \times ACR(k)-\alpha \times ACR(k-1) \quad \text{[Math. 22]}$$

(hereinafter, this equation will be referred to as "numerical equation U")

Here, the numerical equation U corresponds to the numerical equation S in a case in which $c_0=1+\alpha$, $c_1=-\alpha$, and $c_j=0$ (j≥2).

Similarly, the numerical equation R (in other words, the amplitude change rate ACR in a case in which the amplitude change rate of the predicted error variation waveform is constant) corresponds to the numerical equation S in a case in which $c_0=1$ and $c_j=0$ (j≥1).

In addition, the amplitude variation ratio ACR(k−j) for each period may be calculated as below from data of a shorter period.

$$ACR(k-j)=\{|PE(Ptime(k-2j))-PE(Ptime(k-2j-1))|/|PE(Ptime(k-2j-1))+PE(Ptime(k-2j-2))|\}^2 \quad \text{[Math. 23]}$$

(hereinafter, this equation will be referred to as "numerical equation V").

In the numerical equation T, the amplitude variation ratio ACR(k−j) for each period is defined as a ratio between (1) an absolute value of a difference between a first extreme value (PE(Ptime(k−2j))) that is an extreme value in a certain predicted error variation period in the predicted error variation waveform and a second extreme value (PE(Ptime(k−2j−1))) that is an extreme value of a half period before the first extreme value and (2) an absolute value of a difference between a third extreme value (PE(Ptime(k−2(j+1)))) that is an extreme value of one period before the first extreme value and a fourth extreme value (PE(Ptime(k−2(j+1)−1))) that is an extreme value of a half period before the third extreme value.

In contrast to this, in the numerical equation V, the amplitude variation ratio (ACR(k−j)) for each period is defined as a square of a ratio between (1) an absolute value of a difference between a first extreme value (PE(Ptime(k−2j))) that is an extreme value in a certain predicted error variation period in the predicted error variation waveform and a second extreme value (PE(Ptime(k−2j−1))) that is an extreme value of a half period before the first extreme value and (2) an absolute value of a difference between a second extreme value (PE(Ptime(k−2j−1))) and a third extreme value (PE(Ptime(k−2j−2))).

In addition, similarly, also the numerical equation R may be calculated as a ratio between (1) an absolute value of a difference between an extreme value (PE(Ptime(k))) at an extreme value time Ptime(k) determined last at the current time (the time point of a time n) and an extreme value (PE(Ptime(k−1))) of a half period before the extreme value time Ptime(k) and (2) an absolute value of a difference between an extreme value (PE(Ptime(k−2))) of one period before the extreme value time Ptime(k) and an extreme value (PE(Ptime(k−3))) of 1.5 period before the extreme value time Ptime(k), which is not essential.

The numerical equation R may be calculated as a ratio between (1) an absolute value of a difference between an extreme value (PE(Ptime(k))) at an extreme value time Ptime(k) determined last at the current time (the time point of the time n) and an extreme value (PE(Ptime(k−1))) of a half period before the extreme value time Ptime(k) and (2) an absolute value of a difference between an extreme value (PE(Ptime(k−1))) of a half period before the extreme value time Ptime(k) and an extreme value (PE(Ptime(k−2))) of one period before the extreme value time Ptime(k).

(Effect of External Disturbance Compensation for External Disturbance Gradually Increasing at a Constant Rate)

Figure 18:
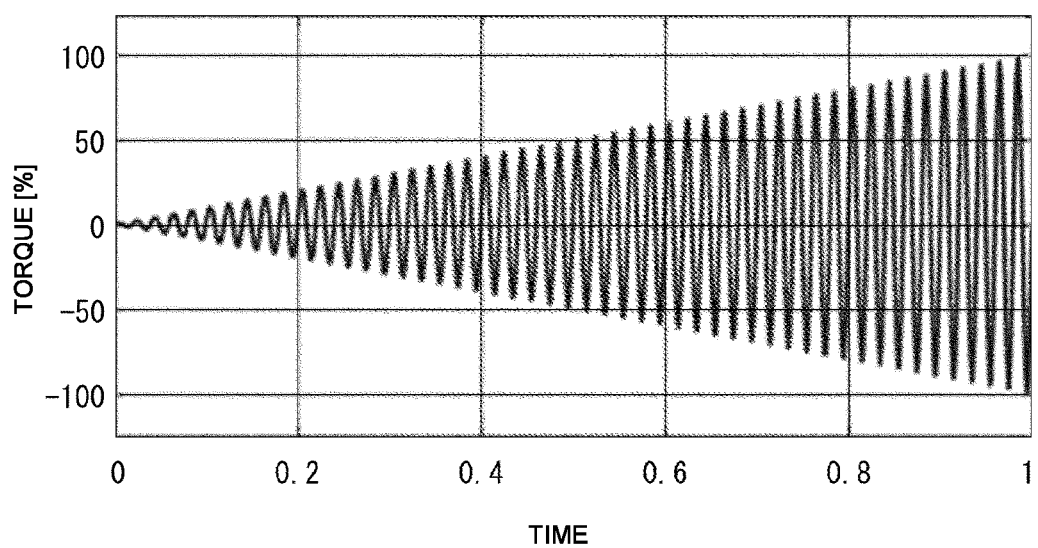
FIG. 18 is a diagram illustrating an external disturbance having a sinusoidal waveform, which continuously increases, applied during the execution of a control process using the controller illustrated in FIG. 15.

FIG. 18 is a diagram illustrating an external disturbance having a sinusoidal waveform, which continuously increases, (in other words, an external disturbance, of which the amplitude increases at a constant rate with respect to time, having periodicity) applied during the execution of a control process using the controller 200. More specifically, FIG. 18 illustrates an external disturbance having a sinusoidal waveform, of which the amplitude continuously increases from 0% to 100% over the entire period of times 0 s to 1 s, having a frequency of 50 Hz.

FIGS. 19(A) to 19(C) are diagrams illustrating effects and the like of an external disturbance compensating process executed by the controller 200 in a case in which the external disturbance illustrated in FIG. 18 is applied during the execution of the control process of the controller 200 having a control target (machine) as one inertial system having no resonance.

FIG. 19(A) illustrates a control result when the controller 200 does not execute external disturbance compensation in a case in which an external disturbance illustrated in FIG. 18 is applied and, more specifically, illustrates changes in a position, a positional deviation, a predicted error, and a torque (vertical axis) with respect to time (horizontal axis) from the top. Here, "external disturbance compensation" illustrates a process of correcting a predicted value of the amount of control at the current time using a predicted error calculated before the current time (in the past) in a period of an external disturbance (in other words, the predicted error variation period) for an external disturbance having periodicity.

In contrast to this, FIG. 19(B) is a control result when the controller 200 executes external disturbance compensation in a case in which the external disturbance illustrated in FIG. 18 is applied and illustrates a control result when a change in the amplitude in the predicted error variation waveform is not considered. Four diagrams in FIG. 19(B) illustrate changes in a position, a positional deviation, a predicted error, and a torque (vertical axis) with respect to time (horizontal axis) from the top.

In addition, FIG. 19(C) is a control result when the controller 200 executes external disturbance compensation in a case in which the external disturbance illustrated in FIG. 18 is applied and illustrates a control result when a change in the amplitude in the predicted error variation waveform is considered. Four diagrams in FIG. 19(C) illustrate changes in a position, a positional deviation, a predicted error, and a torque (vertical axis) with respect to time (horizontal axis) from the top. In FIGS. 19(B) and 19(C), while the controller 200 executes the external disturbance compensation, which are common, when the controller 200 executes the external disturbance compensation, a change in the amplitude in the predicted error variation waveform is not considered in FIG. 19(B) but is considered in FIG. 19(C).

As illustrated in FIG. 19(B), even in a case in which the external disturbance illustrated in FIG. 18 is applied, by executing the external disturbance compensation, the controller 200 can suppress the positional deviation to be an extremely small value relative to the value of the positional deviation illustrated in FIG. 19(A).

In addition, as illustrated in FIG. 19(C), by executing the external disturbance compensation in consideration of a change in the amplitude in the predicted error variation waveform, the controller 200 can significantly improve the effect of suppressing the positional deviation. In other words, the positional deviation that normally remains in FIG. 19(B) is suppressed to be almost "0" after 0.1 sec in FIG. 19(C).

(Effect of External Disturbance Compensation for External Disturbance of which Influence Gradually Decrease at Constant Rate)

Figure 20A:
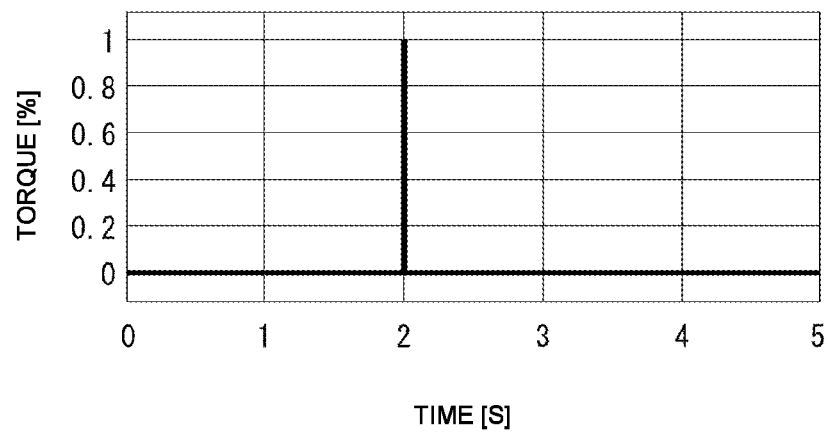
FIGS. 20(A) and 20(B) are diagrams illustrating external disturbances other than the external disturbance illustrated in FIG. 18 that are applied during the execution of the control process using the controller illustrated in FIG. 15.
Figure 20B:
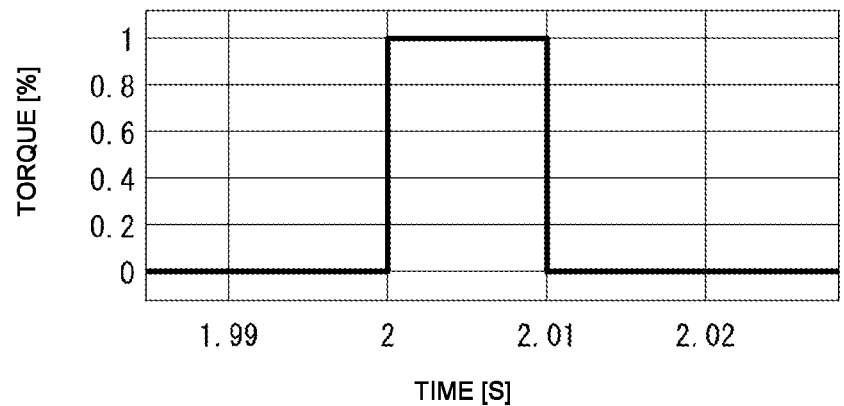

FIGS. 20(A) and 20(B) are diagrams illustrating external disturbances other than the external disturbance illustrated in FIG. 18 that are applied during the execution of the control process using the controller 200. More specifically, FIGS. 20(A) and 20(B) illustrate pulse external disturbances of a magnitude of 1% and a time of 10 ms (for the magnitude of the torque) applied at a time 2 s to a tip end part of a control target that is a control target (machine) of two inertial systems having a resonant frequency of 4 Hz between a base part and the tip end part. In FIGS. 20(A) and 20(B), only the scales of time (horizontal axis) are different, and pulse external disturbances of a magnitude of 1% and a time of 10 ms applied to the time 2 s are illustrated.

Figures 21A, 21B, 21C:
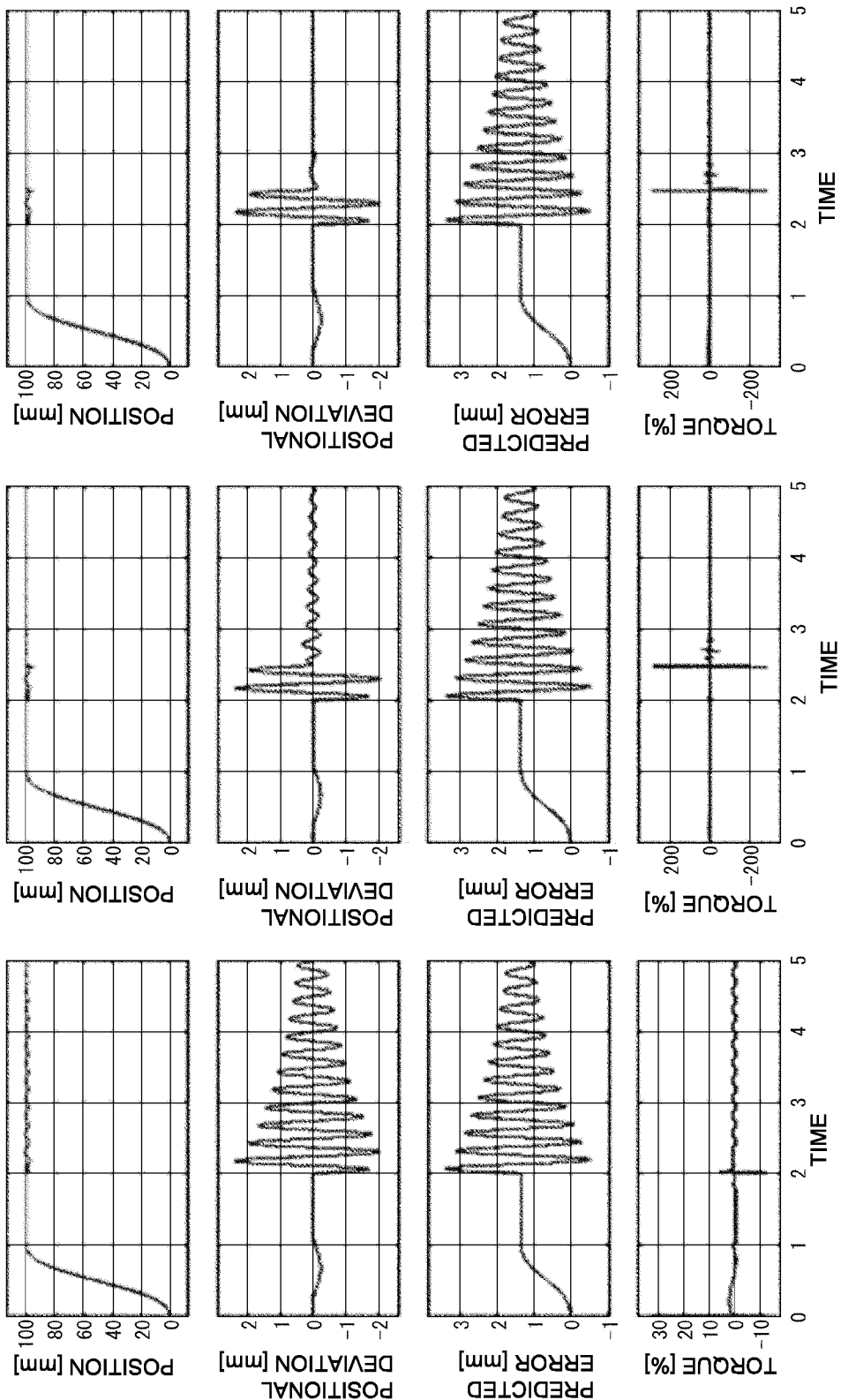
FIGS. 21(A) to 21(C) are diagrams illustrating effects of an external disturbance compensating process executed by the controller illustrated in FIG. 15 in a case in which the external disturbance illustrated in FIG. 20 is applied.

FIGS. 21(A) to 21(C) are diagrams illustrating effects and the like of an external disturbance compensating process executed by the controller 200 in a case in which the external disturbance illustrated in FIGS. 20(A) and 20(B) is applied. More specifically, FIGS. 21(A) to 21(C) illustrate effects and the like of the external disturbance compensating process executed by the controller 200 in a case in which the external disturbance illustrated in FIGS. 20(A) and 20(B) is applied to the controller 200 executing a control process such that the position of the tip end part of the control target (machine) described above is fed back and conforms to a command position.

FIG. 21(A) illustrates a control result when the controller 200 does not execute external disturbance compensation in a case in which the external disturbance illustrated in FIGS. 20(A) and 20(B) is applied and, more specifically, illustrates changes in a position, a positional deviation, a predicted error, and a torque (vertical axis) with respect to time (horizontal axis) from the top.

In contrast to this, FIG. 21(B) is a control result when the controller 200 executes external disturbance compensation in a case in which the external disturbance illustrated in FIGS. 20(A) and 20(B) is applied and illustrates a control result when a change in the amplitude in the predicted error variation waveform is not considered. Four diagrams in FIG. 21(B) illustrate changes in a position, a positional deviation, a predicted error, and a torque (vertical axis) with respect to time (horizontal axis) from the top.

In addition, FIG. 21(C) is a control result when the controller 200 executes external disturbance compensation in a case in which the external disturbance illustrated in FIGS. 20(A) and 20(B) is applied and illustrates a control result when a change in the amplitude in the predicted error variation waveform is considered. Four diagrams in FIG. 21(C) illustrate changes in a position, a positional deviation, a predicted error, and a torque (vertical axis) with respect to time (horizontal axis) from the top. In FIGS. 21(B) and 21(C), while the controller 200 executes the external disturbance compensation, which are common, when the controller 200 executes the external disturbance compensation, a change in the amplitude in the predicted error variation waveform is not considered in FIG. 21(B) but is considered in FIG. 21(C).

As illustrated in FIG. 21(B), even in a case in which the external disturbance illustrated in FIGS. 20(A) and 20(B) is applied, by executing the external disturbance compensation, the controller 200 can suppress the positional deviation in an early stage relative to the positional deviation illustrated in FIG. 21(A).

In addition, as illustrated in FIG. 21(C), by executing the external disturbance compensation in consideration of a change in the amplitude in the predicted error variation waveform, the controller 200 can significantly improve the effect of suppressing the positional deviation. In other words, the positional deviation vibrates and remains also after "2.5 sec" in FIG. 21(B), the positional deviation is suppressed to be almost "0" after "2.5 sec" in FIG. 21(C).

(Effect of External Disturbance Compensation for External Disturbance of which Amplitude Changes Periodically)

Figure 22:
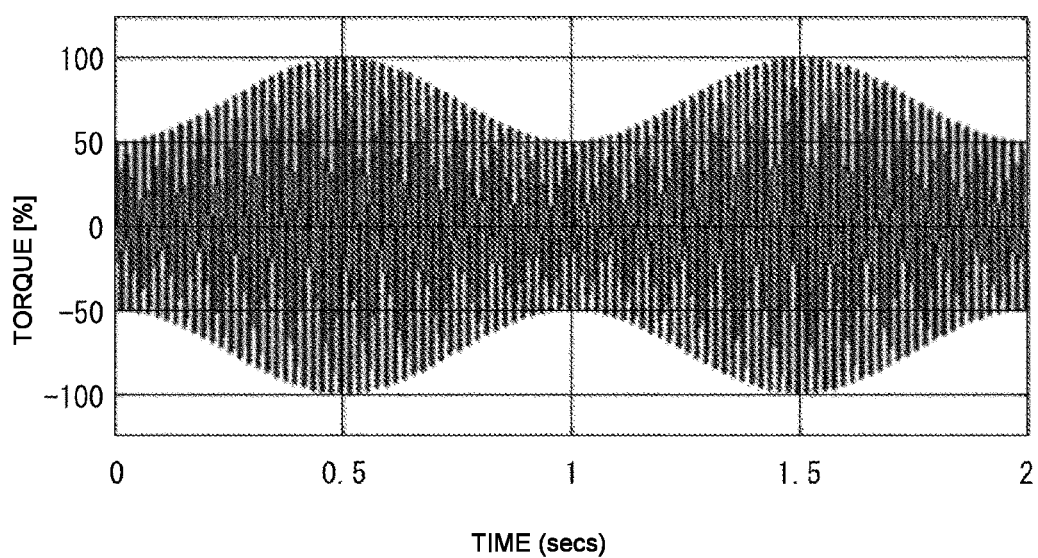
FIG. 22 is a diagram illustrating an external disturbance other than the external disturbances illustrated in FIGS. 18 and 20 that is applied during the execution of the control process using the controller illustrated in FIG. 15.

FIG. 22 is a diagram illustrating an external disturbance other than the external disturbances illustrated in FIGS. 18, 20(A), and 20(B) that is applied during the execution of the control process using the controller 200. More specifically, FIG. 22 illustrates an external disturbance having a sinusoidal waveform, of which the amplitude changes between 50% to 100% at the frequency of 1 Hz over the entire period of times 0 s to 2 s, having a frequency of 50 Hz.

FIGS. 23(A) to 23(C) are diagrams illustrating effects and the like of an external disturbance compensating process executed by the controller 200 in a case in which the external disturbance illustrated in FIG. 22 is applied during the execution of the control process of the controller 200 having a control target (machine) as one inertial system having no resonance. FIG. 23(A) illustrates a control result when the controller 200 does not execute external disturbance compensation in a case in which an external disturbance illustrated in FIG. 22 is applied and, more specifically, illustrates changes in a position, a positional deviation, a predicted error, and a torque (vertical axis) with respect to time (horizontal axis) from the top.

In contrast to this, FIG. 23(B) is a control result when the controller 200 executes external disturbance compensation in a case in which the external disturbance illustrated in FIG. 22 is applied and illustrates a control result when a change in the amplitude in the predicted error variation waveform is not considered. Four diagrams in FIG. 23(B) illustrate changes in a position, a positional deviation, a predicted error, and a torque (vertical axis) with respect to time (horizontal axis) from the top.

In addition, FIG. 23(C) is a control result when the controller 200 executes external disturbance compensation in a case in which the external disturbance illustrated in FIG. 22 is applied and illustrates a control result when a change in the amplitude in the predicted error variation waveform is considered by assuming that the amplitude change rate is constant. More specifically, the control result is illustrated which is acquired in a case in which the controller 200 executes external disturbance compensation using the amplitude change rate ACR calculated from the numerical equation U by setting "α=0" and the numerical equation P. Four diagrams in FIG. 23(C) illustrate changes in a position, a positional deviation, a predicted error, and a torque (vertical axis) with respect to time (horizontal axis) from the top. In FIGS. 23(B) and 23(C), while the controller 200 executes the external disturbance compensation, which are common, when the controller 200 executes the external disturbance compensation, a change in the amplitude in the predicted error variation waveform is not considered in FIG. 23(B) but is considered in FIG. 23(C).

As illustrated in FIG. 23(B), even in a case in which the external disturbance illustrated in FIG. 22 is applied, by executing the external disturbance compensation, the controller 200 can suppress the positional deviation to be an extremely small value relative to the value of the positional deviation illustrated in FIG. 23(A).

In addition, as illustrated in FIG. 23(C), by executing the external disturbance compensation in consideration of a change in the amplitude in the predicted error variation waveform, the controller 200 can significantly improve the effect of suppressing the positional deviation. In other words, the positional deviation in FIG. 23(C) is suppressed to be a further smaller value than that of the positional deviation in FIG. 23(B).

Figures 24A, 24B:
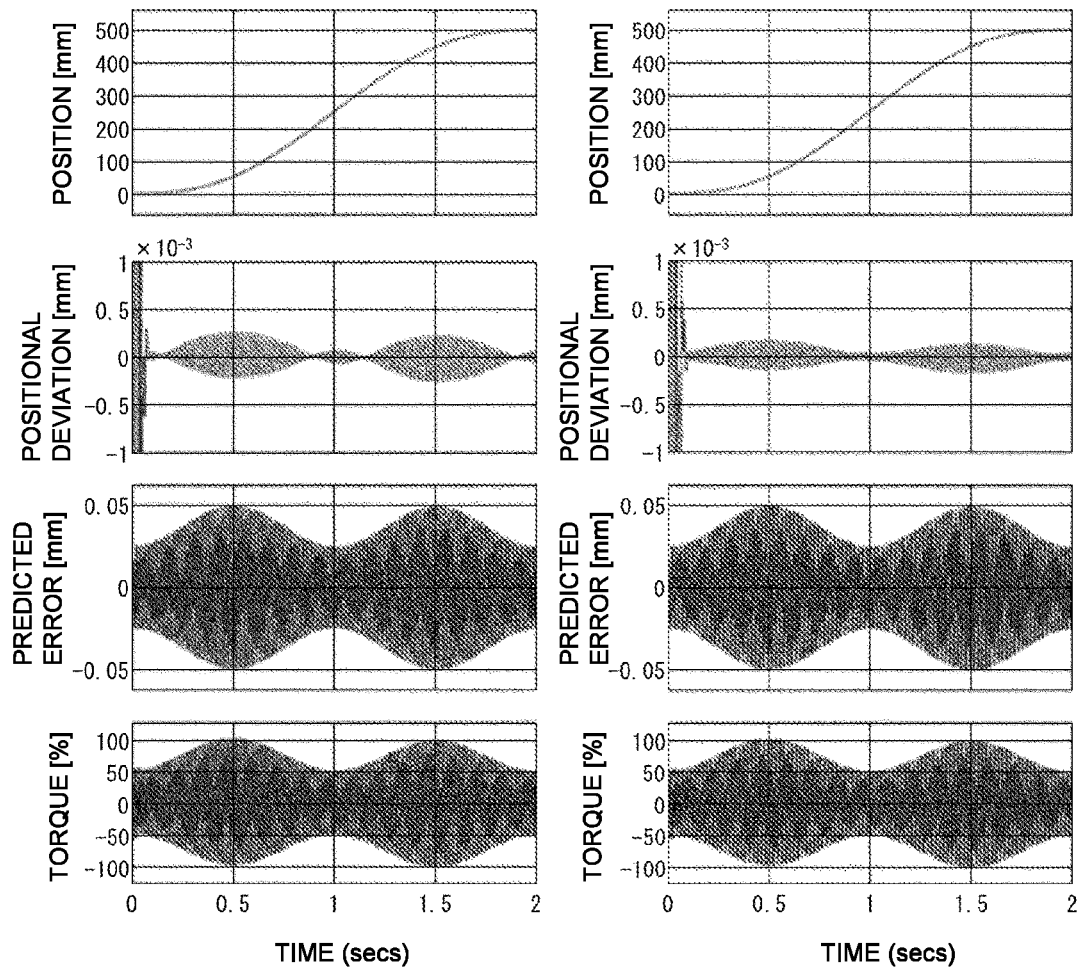
FIGS. 24(A) and 24(B) illustrate a difference between a control result acquired when the controller illustrated in FIG. 15 assumes that an amplitude change rate is constant and a control result acquired when the controller 200 assumes that the amplitude change rate varies in a case in which the external disturbance illustrated in FIG. 22 is applied.

FIGS. 24(A) and 24(B) illustrate a difference between a control result acquired when the controller 200 considering a change in the amplitude in the predicted error variation waveform assumes that an amplitude change rate is constant and a control result acquired when the controller 200 assumes that the amplitude change rate varies in a case in which the external disturbance illustrated in FIG. 22 is applied. FIG. 24(A) is the same as FIG. 23(C), in other words, illustrates a control result acquired in a case in which the controller 200 executes external disturbance compensation using the amplitude change rate ACR calculated from the numerical equation U by setting "α=0" by assuming that the amplitude change rate is constant and the numerical equation P. In contrast to this, FIG. 24(B) illustrates a control result acquired in a case in which the controller 200 executes external disturbance compensation using the amplitude change rate ACR calculated from the numerical equation U by setting "α=0.5" by assuming that the amplitude change rate varies and the numerical equation P.

As illustrated in FIG. 24(B), the controller 200 executes the external disturbance compensation in consideration of a change in the amplitude in the predicted error variation waveform by assuming that the amplitude change rate varies and accordingly, further improves the effect of suppressing the positional deviation compared to the case illustrated in FIG. 24(A). In other words, the positional deviation in FIG. 24(B) is suppressed to be a further smaller value than that of the positional deviation in FIG. 24(A), and a waveform illustrating variations in the positional deviation in FIG.

24(B) is gentler than a waveform representing variations in the positional deviation in FIG. 24(A).

As illustrated in FIGS. 23(A) to 23(C) and FIGS. 24(A) and 24(B), in a period except for a period immediately after start of moving, the compensation considering variations in the amplitude change rate suppresses the amplitude of the positional deviation the most. In other words, in a case in which the amplitude of an external disturbance changes periodically, the controller 200 executes external disturbance compensation in consideration of a change in the amplitude in the predicted error variation waveform of which the amplitude change rate changes, whereby the positional deviation can be suppressed the most.

Embodiment 4

Embodiment 4 of the disclosure will be described with reference to FIG. 25. In order to secure simplicity of description, only a configuration (a sequence of a process and details of a process) different from those according to Embodiment 1 to Embodiment 3 will be described. In other words, all the configurations and the like described in Embodiment 1 to Embodiment 3 are also included in this embodiment. In addition, the definitions of the terms described in Embodiment 1 to Embodiment 3 are basically the same.

A controller 300 described below with reference to FIG. 25, similar to the controller 200, executes "compensation for a prediction of the current amount of control" using the predicted error PE of the previous period by taking "a change in the amplitude" of a waveform representing the predicted error PE that changes periodically (=predicted error variation waveform) into account. In this way, the controller 300 can suppress a disturbance of the amount of control due to an external disturbance having periodicity and can accurately execute "compensation for a prediction of the current amount of control" even in a case in which the amplitude of the predicted error variation waveform changes with respect to time.

In other words, the controller 300 (model predictive control device) is a model predictive control device predicting an amount of control of the control target 30 corresponding to a command value generated for every control period from a target track using a model of the control target 30. The controller 300 includes: a determination unit 106 that determines presence/absence of periodicity of changes in a predicted error PE, which is an error between an actually-measured value of the amount of control of the control target 30 and a predicted value of the amount of control predicted using the model described above, with respect to time; a deriving unit 202 that derives an equation representing a change in the amplitude with respect to time in the waveform (=predicted error variation waveform) representing a change in the predicted error PE with respect to time (for example, an "amplitude change rate ACR") in a case in which the presence of periodicity is determined by the determination unit 106; and a command value correcting unit 112 (predicted value correcting unit) that corrects the predicted value in the current period using the equation derived by the deriving unit 202 and the predicted error PE of the period previous to the current period in the predicted error variation waveform.

According to the configuration described above, the controller 300 derives an equation representing a change in the amplitude with respect to time in a predicted error variation waveform in a case in which the presence of periodicity of changes in the predicted error PE, which is an error between an actually-measured value of the amount of control and a predicted value, with respect to time is determined. Then, the controller 300 corrects the predicted value in the current period using the derived equation and the predicted error PE of the period previous to the current period in the predicted error variation waveform.

Accordingly, the controller 300 has an effect of ability to apply compensation for an external disturbance to a wide range of machines and devices in a simpler manner without requiring a model of the external disturbance. Particularly, the controller 300 has an effect of ability to accurately predict the amount of control of the control target 30 even when the amplitude of the predicted error variation waveform is not constant with respect to time in a case in which the predicted error PE changes periodically.

Figure 25:
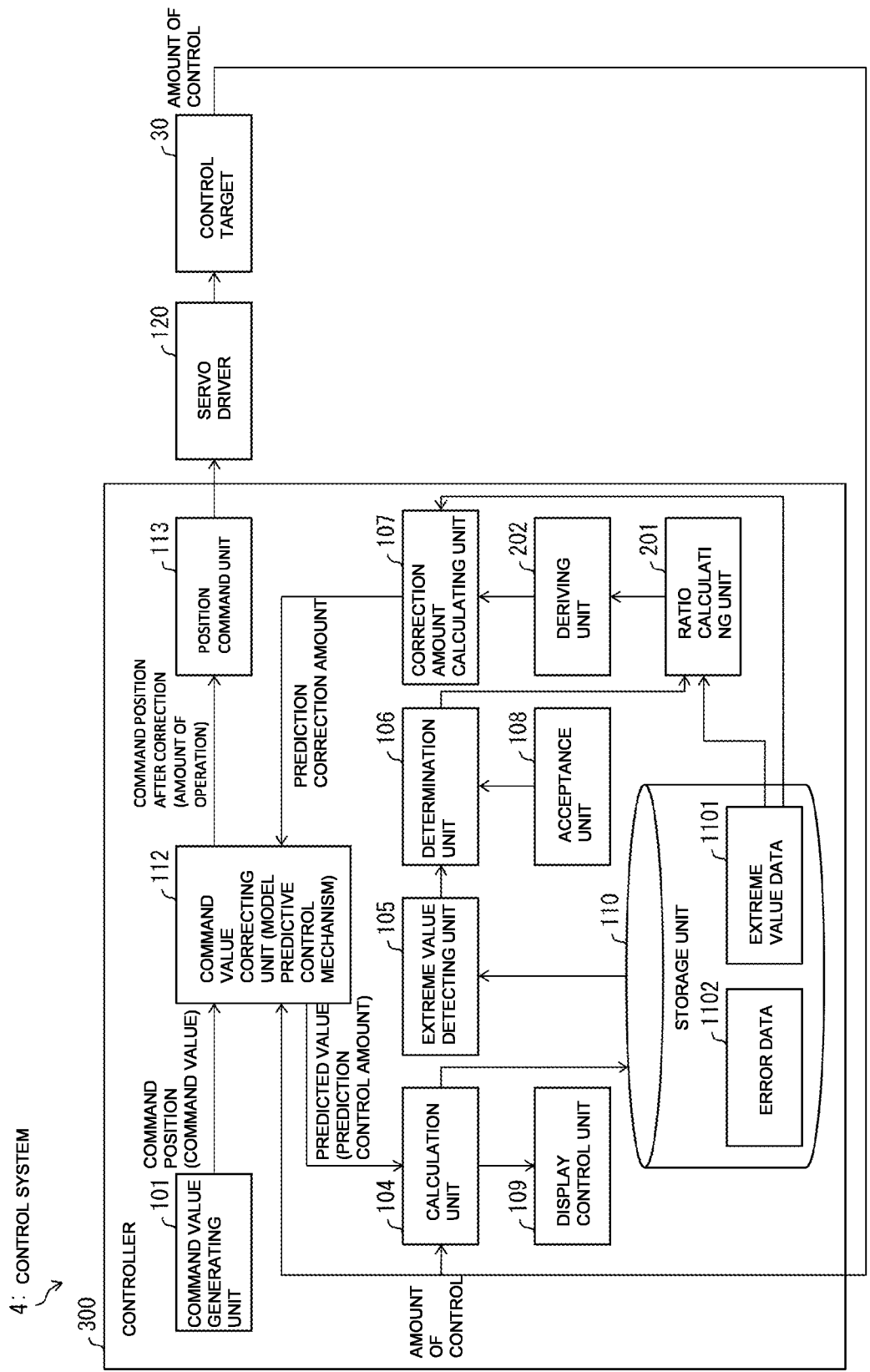
FIG. 25 is a block diagram illustrating the configuration of a main part of a controller according to Embodiment 4 of the disclosure.

FIG. 25 is a block diagram illustrating the configuration of a main part of the controller 300 according to Embodiment 4 of the disclosure. The controller 300 illustrated in FIG. 25 includes a ratio calculating unit 201 and a deriving unit 202 in addition to the components of the controller 100 illustrated in FIG. 12. The controller 300, similar to the controller 200, accurately corrects a predicted value of the amount of control at the current time using the predicted error PE of the previous period even in a case in which the amplitude of the predicted error variation waveform is not constant with respect to time, For example, the controller 300 calculates an equation representing a change in the amplitude with respect to time in the predicted error variation waveform and corrects the predicted value of the amount of control at the current time using this equation and the predicted error PE of the previous period.

The ratio calculating unit 201 and the deriving unit 202 of the controller 300 are similar to the ratio calculating unit 201 and the deriving unit 202 of the controller 200. The ratio calculating unit 201 calculates an amplitude variation ratio for every predetermined period (for example, for every predicted error variation period) in the predicted error variation waveform, The deriving unit 202 derives "an equation representing changes in the amplitude with respect to time in the predicted error variation waveform" using the "amplitude variation ratio for each predetermined period notified from the ratio calculating unit 201, The correction amount calculating unit 107 calculates a prediction correction amount used for correcting the predicted value in the current period using "the equation representing changes in the amplitude with respect to time in the predicted error variation waveform" that has been derived by the deriving unit 202 and the predicted error PE in the period previous to the current period (=predicted error variation period) in the predicted error variation waveform, More specifically, as described above, the correction amount calculating unit 107 calculates amounts of changes in the predicted error PE in the dead time d section and the prediction horizon H section as prediction correction amounts Cd(n) and CH(n), Particularly, the correction amount calculating unit 107 calculates the prediction correction amounts Cd(n) and CH(n) using the amplitude change rate ACR calculated by the deriving unit 202 and the predicted error PE in the period previous to the current period (=the predicted error variation period) in the predicted error variation waveform, Then, the correction amount calculating unit 107 notifies the command value correcting unit 112 of the calculated prediction correction amounts Cd(n) and CH(n).

As is apparent from the description presented above, the controller 300 includes the command value correcting unit 112 and the position command unit 113 instead of the torque calculating unit 102 and the torque command unit 103 of the controller 200 and is similar to the controller 200 in the other points.

The command value correcting unit 112 executes model predictive control and determines an amount of operation (command position) such that the predicted value of the amount of control of the control target 30 is as close as possible to a target value (a command value; in other words, a command position). The command value correcting unit 112, first, predicts an amount of control output by the control target 30 in each control period using the internal model and notifies the calculation unit 104 of the predicted amount of control (=a predicted value of the amount of control; a prediction amount of control), In addition, the command value correcting unit 112 acquires prediction correction amounts (more specifically, prediction correction amounts Cd(n) and CH(n)) from the correction amount calculating unit 107, The command value correcting unit 112 corrects a predicted value of the amount of control (a predicted value of the amount of control) using the acquired prediction correction amounts and calculates a position command (a position command after correction) using the predicted value after the correction (post-correction predicted value) such that the amount of control conforms to a command value (command position). The command value correcting unit 112 notifies the position command unit 113 of the calculated command position after correction as an amount of operation, The position command unit 113 outputs a command position after the correction notified from the command value correcting unit 112 to the servo driver 20 (a control system performing motion control of the control target 30) as a command value relating to the position/speed of the control target 30, The controller 300 can output the command value corrected such that the amount of control of the control target 30 conforms to the command value (a command position after correction) to the servo driver 120 without executing an arithmetic operation for converting a change in the amount of control according to the external disturbance into an amount of operation.

§ 4. Modified Example

Up to now, an example has been described in which the deriving unit 202 derives an equation representing a change in the amplitude with respect to time in the predicted error variation waveform from an amplitude change rate for each predicted error variation period calculated by the ratio calculating unit 201 using an absolute value of a difference between extreme values adjacent to each other in the predicted error variation waveform, However, it is not essential to calculate the amplitude change rate for each predicted error variation period using an absolute value of a difference between extreme values adjacent to each other in the predicted error variation waveform, and the amplitude change rate for each predicted error variation period may be calculated using a known mathematical technique.

[Example of Realization Using Software]

The control blocks (particularly, the command value generating unit 101, the torque calculating unit 102, the torque command unit 103, the calculation unit 104, the extreme value detecting unit 105, the determination unit 106, the correction amount calculating unit 107, the acceptance unit 108, the display control unit 109, the command value correcting unit 112, the position command unit 113, the ratio calculating unit 201, and the deriving unit 202) of the controllers 10, 100, 200, and 300 may be realized by a logic circuit (hardware) formed on an integrated circuit (IC chip) or the like or may be realized by software using a central processing unit (CPU).

In the latter case, each of the controllers 10, 100, 200, and 300 includes: a CPU executing a command of a program that is software realizing each function; a read only memory (ROM) or a storage device (these will be referred to as a recording medium) in which the program and various kinds of data are recorded in a computer (or CPU)-readable manner; a random access memory (RAM) expanding the program; and the like, Then, as the computer (or the CPU) reads the program described above from the recording medium and executes the read program, whereby the objective of the disclosure is achieved, As the recoding medium, a non-transitory type medium such as a tape, a disk, a card, a semiconductor memory, a programmable logic circuit, or the like may be used, In addition, the program described above may be supplied to the computer through an arbitrary transmission medium (a communication network or a broadcast wave, or the like) that can transmit the program, Furthermore, one aspect of the disclosure may be realized in the form of a carrier wave-embedded data signal in which the program described above is implemented through electronic transmission.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A model predictive control device that predicts an amount of control of a control target corresponding to a command value generated for each control period from a target track using a model of the control target, the model predictive control device comprising:
   a logic circuit; and
   a memory, wherein
   the logical circuit determines presence/absence of periodicity of changes in a predicted error, which is an error between an actually-measured value of the amount of control of the control target and a predicted value of the amount of control predicted using the model, with respect to time;
   the logical circuit drives an equation representing changes in an amplitude with respect to time in a waveform representing changes in the predicted error with respect to time when the presence of periodicity is determined by the determination unit; and
   the logical circuit corrects the predicted value in a current period using the equation and the predicted error in a period previous to the current period in the waveform,
   the logical circuit calculates an amplitude variation ratio for each period up to the period previous to the current period in the waveform,
   the logical circuit derives the equation representing changes in the amplitude with respect to time in the waveform as a sum of values respectively acquired by multiplying amplitude variation ratios for periods up to the period previous to the current period by coefficients for the periods.

2. The model predictive control device according to claim 1, wherein the logical circuit calculates the amplitude variation ratio in a certain period using a ratio between
   (1) an absolute value of a difference between a first extreme value that is an extreme value in the certain period in the waveform and a second extreme value that is an extreme value a half period before the first extreme value in the waveform and (2) an absolute value of a difference between a third extreme value that is an extreme value one period before the first extreme value in the waveform and a fourth extreme value that is an extreme value a half period before the third extreme value in the waveform or an absolute value of a difference between the second extreme value and the third extreme value.

3. The model predictive control device according to claim 1, wherein the logical circuit calculates a latest amplitude variation ratio as a ratio between (1) an absolute value of a difference between a latest extreme value in the waveform determined until now and an extreme value a half period before the latest extreme value in the waveform and (2) an absolute value of a difference between an extreme value that is an extreme value one period before the latest extreme value in the waveform and an extreme value that is 1.5 period before the latest extreme value in the waveform or an absolute value of a difference between an extreme value a half period before the latest extreme value in the waveform and an extreme value that is an extreme value one period before the latest extreme value in the waveform, wherein the logical circuit derives the latest amplitude variation ratio as an equation representing a change in the amplitude with respect to time in the waveform.

4. The model predictive control device according to claim 2, wherein the logical circuit calculates a latest amplitude variation ratio as a ratio between (1) an absolute value of a difference between a latest extreme value in the waveform determined until now and an extreme value a half period before the latest extreme value in the waveform and (2) an absolute value of a difference between an extreme value that is an extreme value one period before the latest extreme value in the waveform and an extreme value that is 1.5 period before the latest extreme value in the waveform or an absolute value of a difference between an extreme value a half period before the latest extreme value in the waveform and an extreme value that is an extreme value one period before the latest extreme value in the waveform, wherein the logical circuit derives the latest amplitude variation ratio as an equation representing a change in the amplitude with respect to time in the waveform.

5. A method of controlling a model predictive control device that predicts an amount of control of a control target corresponding to a command value generated for each control period from a target track using a model of the control target, the method comprising:

determining presence/absence of periodicity of changes in a predicted error, which is an error between an actually-measured value of the amount of control of the control target and a predicted value of the amount of control predicted using the model, with respect to time;

deriving an equation representing changes in an amplitude with respect to time in a waveform representing changes in the predicted error with respect to time in a case in which the presence of periodicity is determined in the determination step;

correcting the predicted value in a current period using the equation derived in the deriving step and the predicted error in a period previous to the current period in the waveform;

calculating an amplitude variation ratio for each period up to the period previous to the current period in the waveform; and deriving the equation representing changes in the amplitude with respect to time in the waveform as a sum of values respectively acquired by multiplying amplitude variation ratios for periods up to the period previous to the current period by coefficients for the periods.

6. A non-transitory computer-readable recording medium having information processing program which, when executed, causes a computer to perform the method according to claim 5.

* * * * *